US012598372B2

(12) United States Patent
Wang

(10) Patent No.: US 12,598,372 B2
(45) Date of Patent: Apr. 7, 2026

(54) SHOOTING METHOD AND RELATED DEVICE

(71) Applicant: HONOR DEVICE CO., LTD., Shenzhen (CN)

(72) Inventor: Jianxian Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 94 days.

(21) Appl. No.: 18/699,546

(22) PCT Filed: May 5, 2023

(86) PCT No.: PCT/CN2023/092371
§ 371 (c)(1),
(2) Date: Apr. 8, 2024

(87) PCT Pub. No.: WO2023/231696
PCT Pub. Date: Dec. 7, 2023

(65) Prior Publication Data
US 2024/0414432 A1 Dec. 12, 2024

(30) Foreign Application Priority Data

May 30, 2022 (CN) .......................... 202210603408.2
Jul. 29, 2022 (CN) .......................... 202210910909.5

(51) Int. Cl.
*H04N 23/63* (2023.01)
*H04N 23/611* (2023.01)
*H04N 23/62* (2023.01)

(52) U.S. Cl.
CPC ......... *H04N 23/632* (2023.01); *H04N 23/611* (2023.01); *H04N 23/62* (2023.01)

(58) Field of Classification Search
CPC .... H04N 23/632; H04N 23/611; H04N 23/62; H04N 23/631; H04N 23/675; H04N 23/80; H04N 5/772
See application file for complete search history.

(56) References Cited

U.S. PATENT DOCUMENTS 11,765,463 B2 9/2023 Li et al.
11,832,022 B2 11/2023 Cui
(Continued)

FOREIGN PATENT DOCUMENTS

CN 102378081 A 3/2012
CN 107771314 A 3/2018
(Continued)

*Primary Examiner* — Christopher K Peterson
(74) *Attorney, Agent, or Firm* — Fish & Richardson P.C.

(57) ABSTRACT

This application provides a shooting method and a related device. The shooting method may be applied to an electronic device disposed with a camera. According to the shooting method, in a shooting scene in which a plurality of shooting objects are in a same frame, the electronic device can perform focus tracking on one of the shooting objects, and perform targeted close-up recording on the shooting object, so as to separately generate an original video and a focus-tracking video. Specifically, the electronic device may allocate a flow identifier to each of data flows of a large preview window and a small preview window, associate different video files and encoders according to different flow identifiers, and match different image effects, thereby implementing recording of an original video corresponding to the large preview window and a close-up video corresponding to the small preview window.

15 Claims, 60 Drawing Sheets

(56)              References Cited

U.S. PATENT DOCUMENTS

| | | | |
|---|---|---|---|
| 11,968,447 | B2 | 4/2024 | Li |
| 11,972,550 | B2 | 4/2024 | Horita |
| 2014/0362274 | A1 | 12/2014 | Christie et al. |
| 2017/0013179 | A1 | 1/2017 | Kang et al. |
| 2018/0173393 | A1 | 6/2018 | Verdier et al. |
| 2019/0306456 | A1 | 10/2019 | Liu |
| 2020/0019213 | A1 | 1/2020 | Lee |
| 2022/0159183 | A1* | 5/2022 | Li .......................... H04N 23/635 |
| 2023/0081664 | A1* | 3/2023 | Li .......................... H04N 23/63 |
| | | | 348/333.08 |

FOREIGN PATENT DOCUMENTS

| | | | |
|---|---|---|---|
| CN | 109041111 | A | 12/2018 |
| CN | 109120987 | A | 1/2019 |
| CN | 110072070 | A | 7/2019 |
| CN | 111212235 | A | 5/2020 |
| CN | 111684267 | A | 9/2020 |
| CN | 111757137 | A | 10/2020 |
| CN | 112954219 | A | 6/2021 |
| CN | 113542581 | A | 10/2021 |
| CN | 113810604 | A | 12/2021 |
| CN | 113923391 | A | 1/2022 |
| CN | 114500901 | A | 5/2022 |
| EP | 3116215 | B1 | 3/2020 |
| EP | 3008573 | B1 | 3/2022 |
| WO | 2021147482 | A1 | 7/2021 |

* cited by examiner

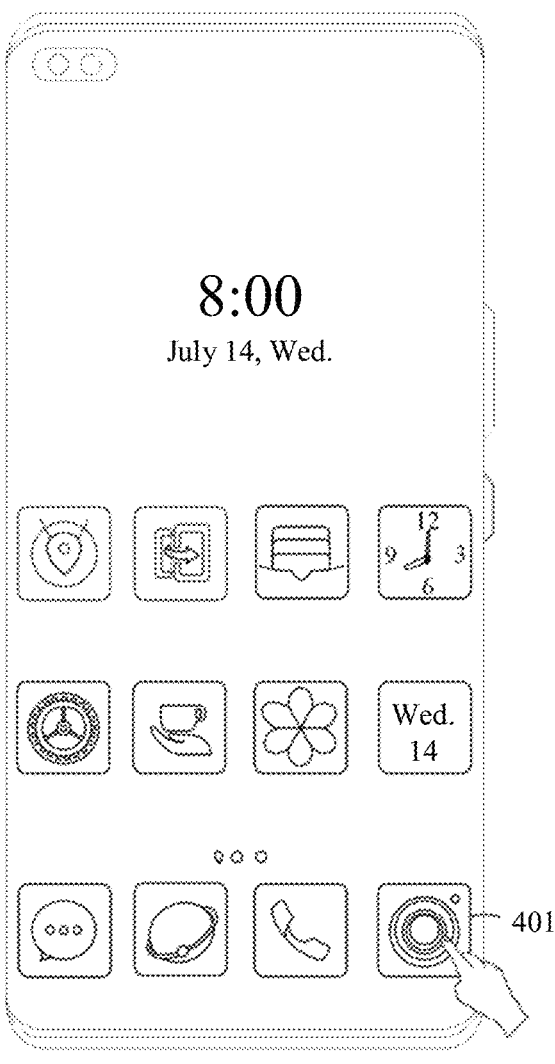
FIG. 2A(1)

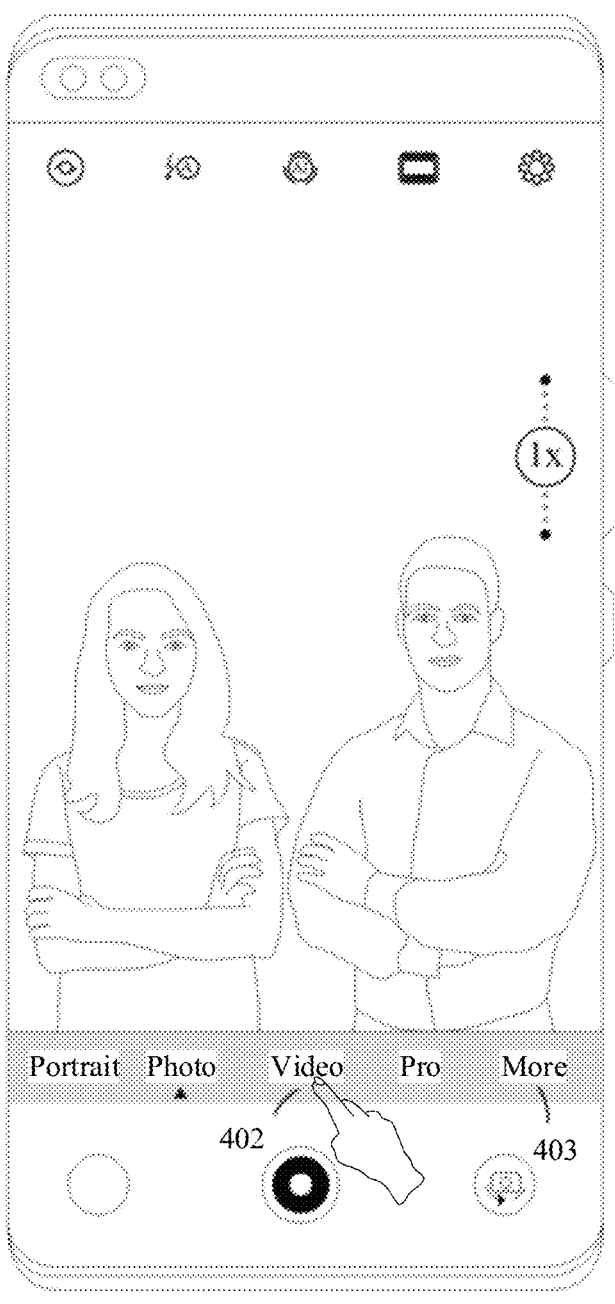
FIG. 2A(2)

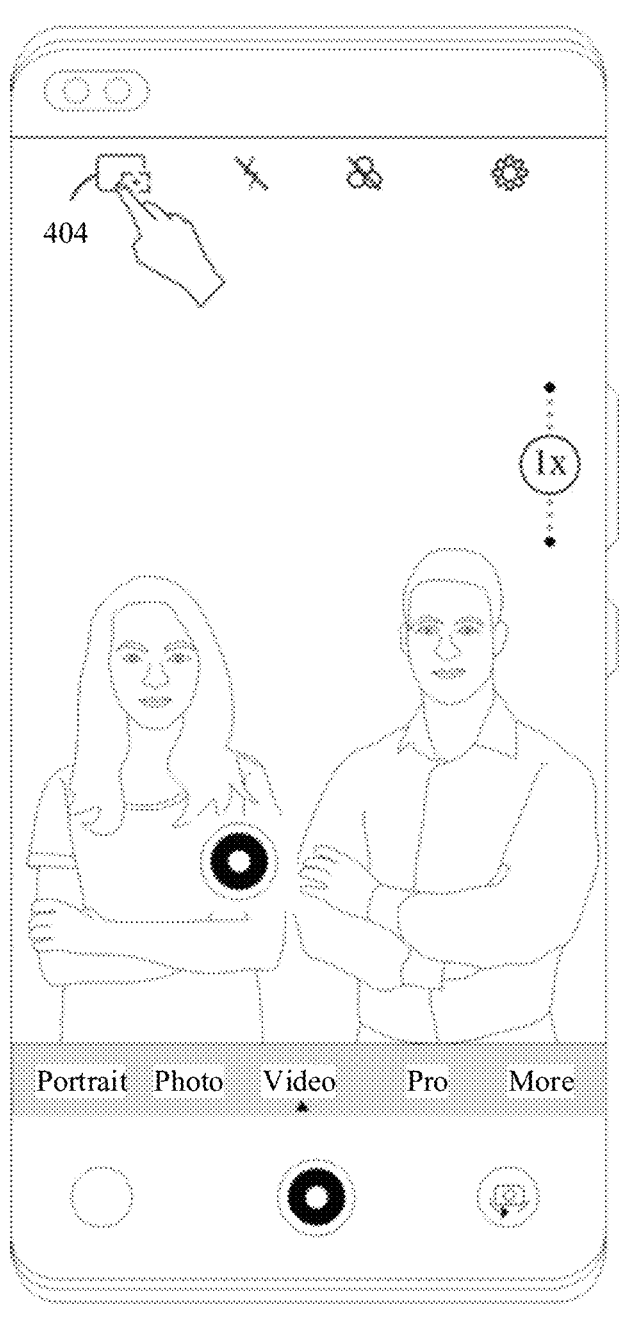
FIG. 2A(3)

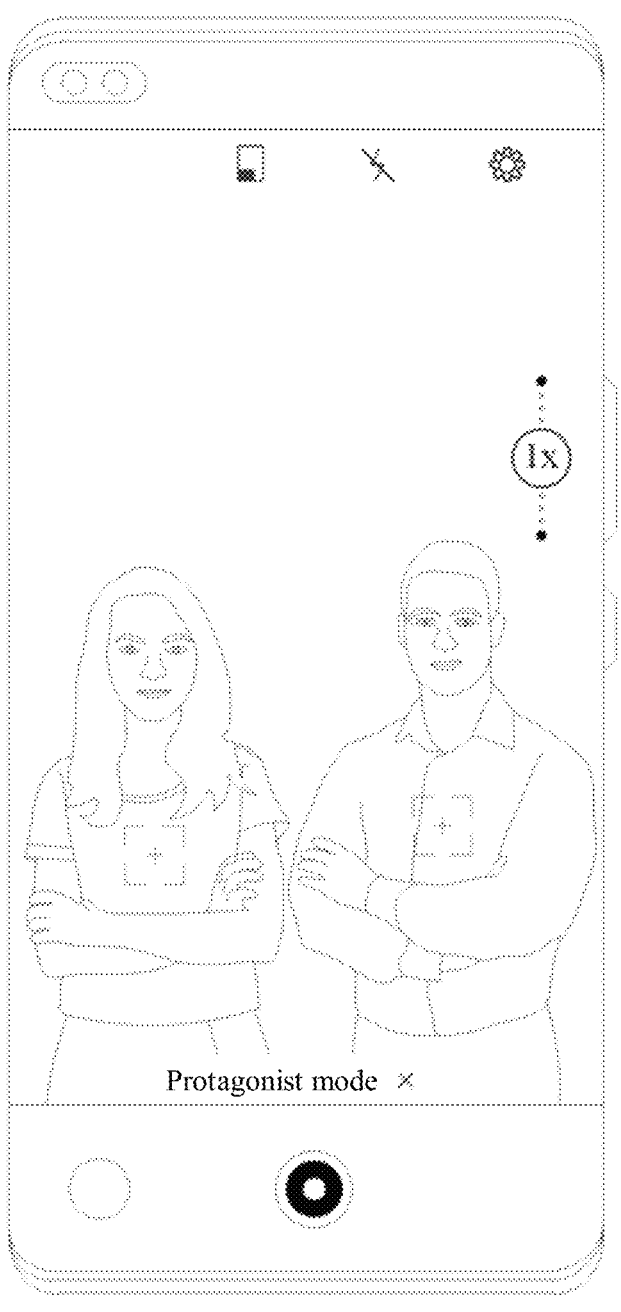
FIG. 2A(4)

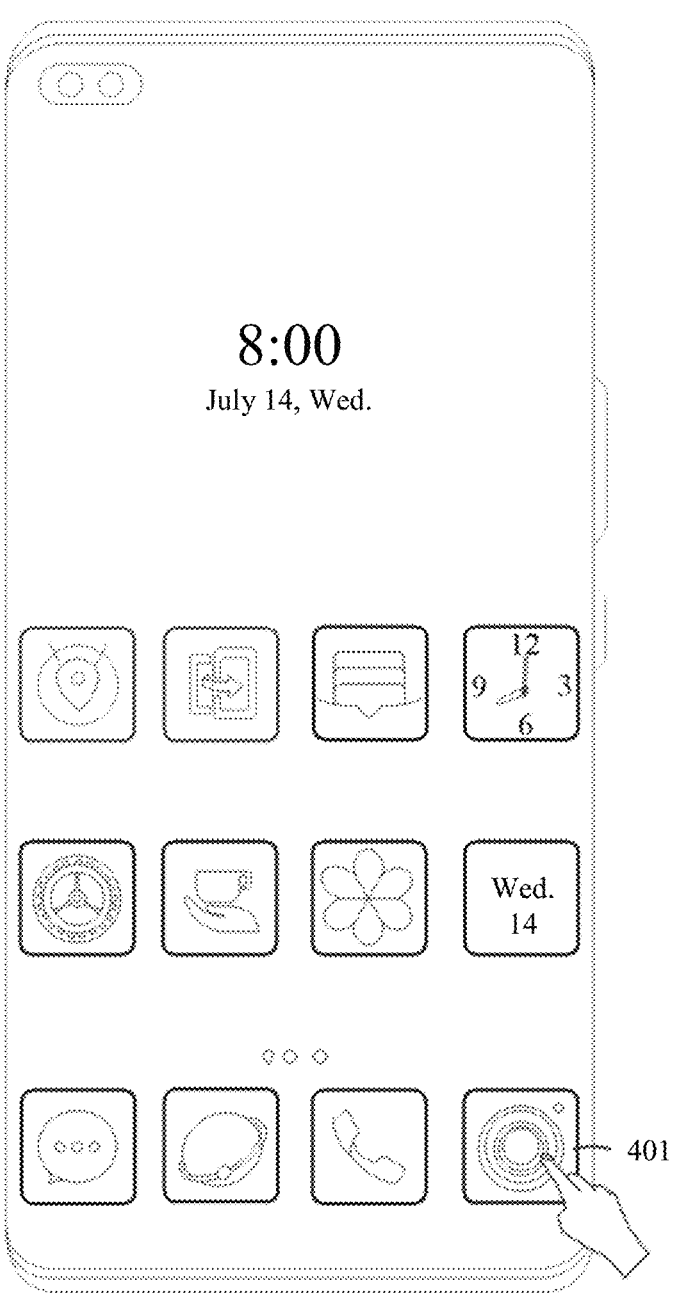
FIG. 2B(1)

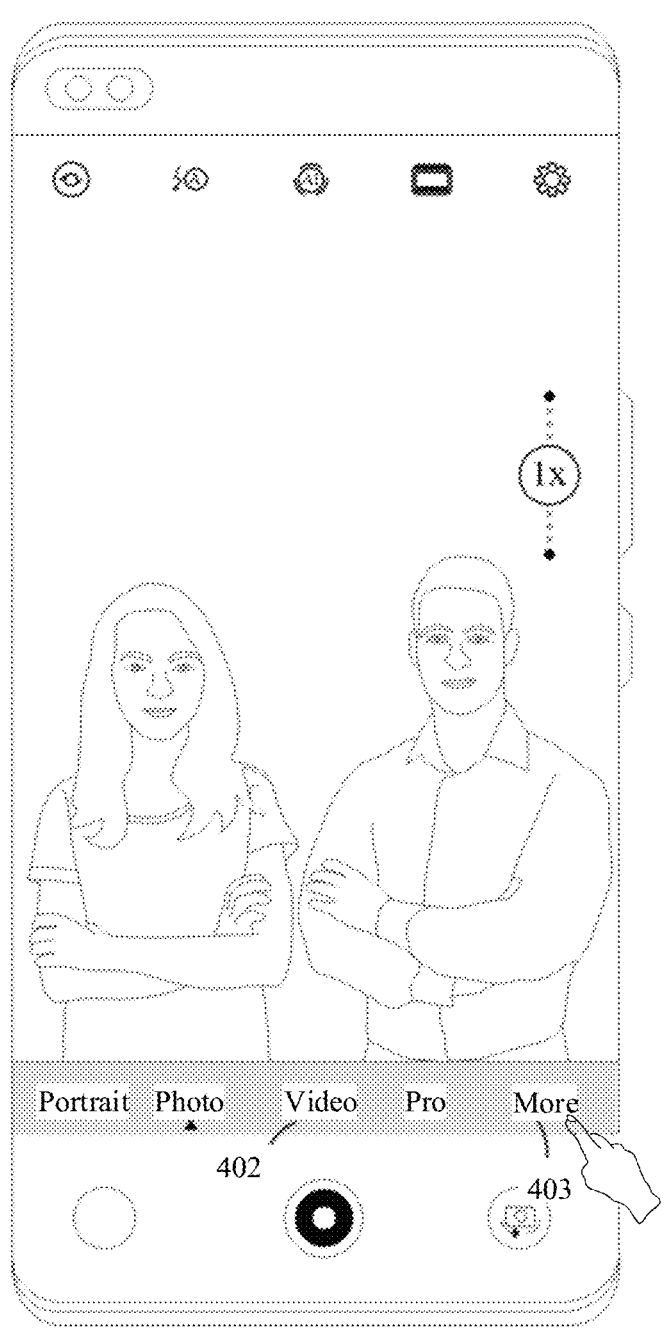
FIG. 2B(2)

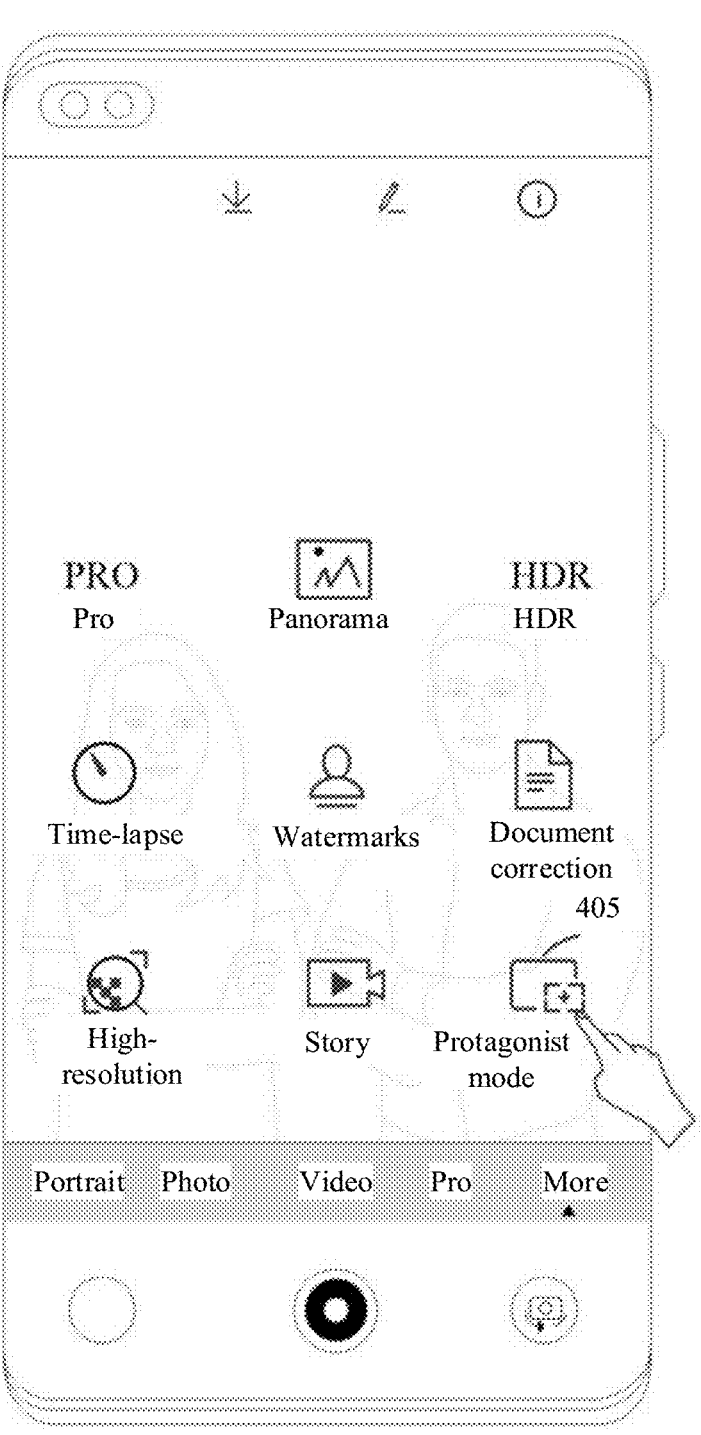
FIG. 2B(3)

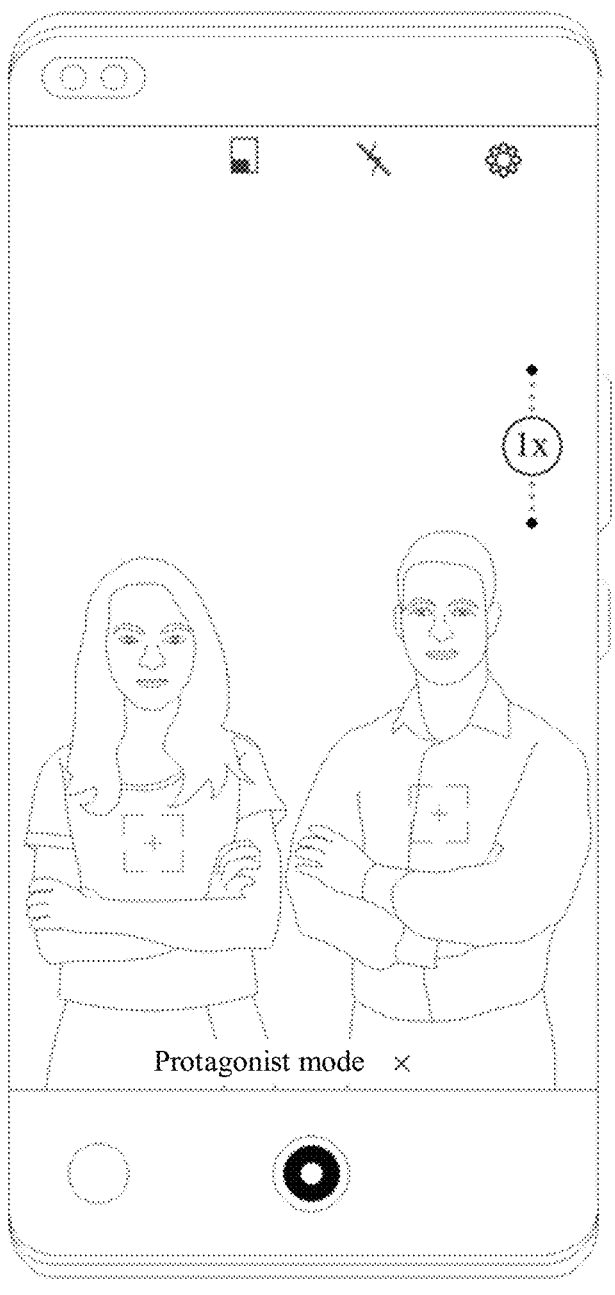
Protagonist mode   ✕
FIG. 2B(4)

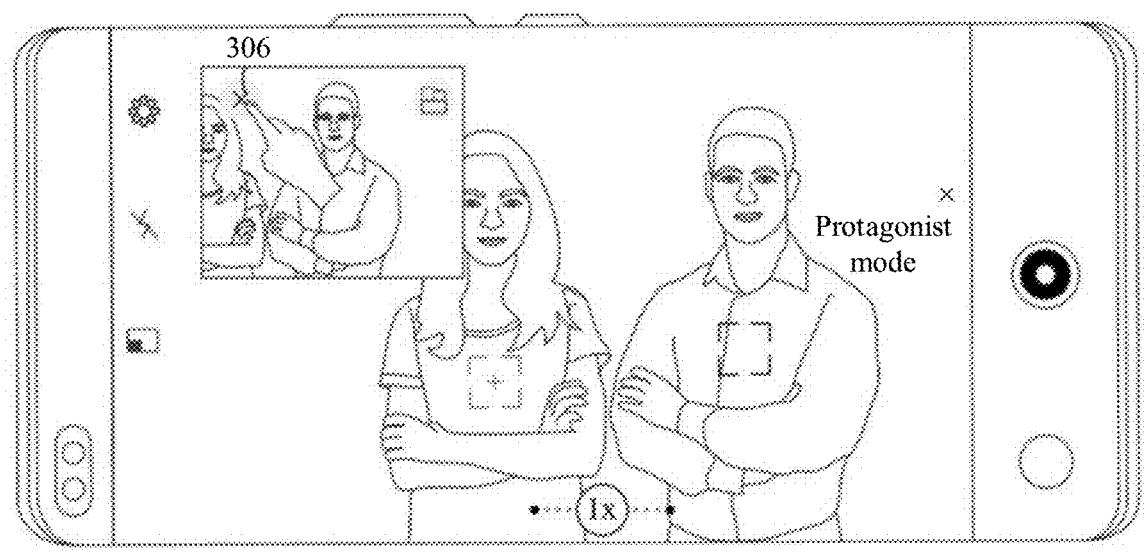
FIG. 2F(1)
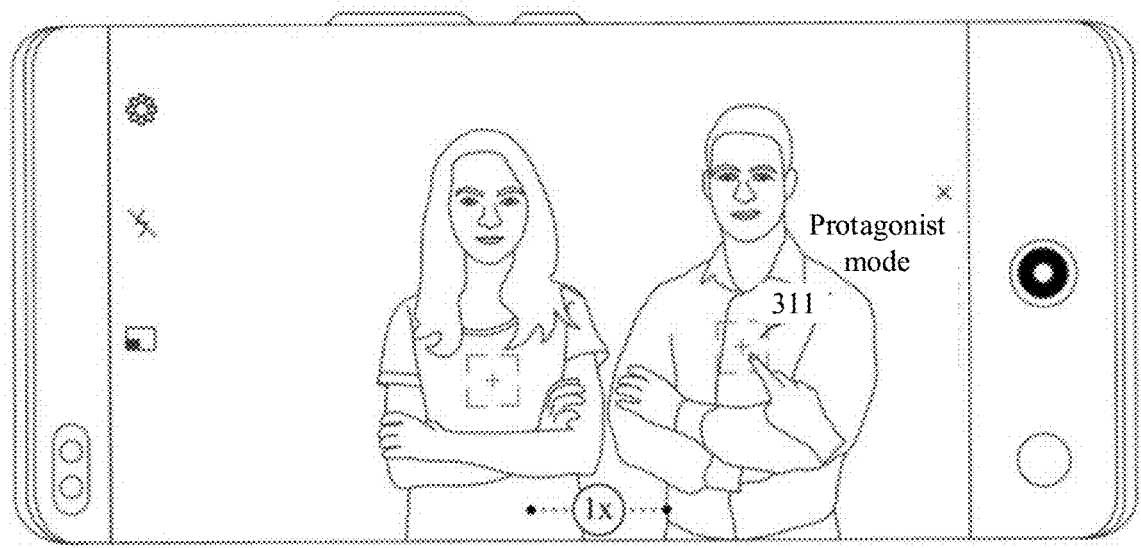
FIG. 2F(2)
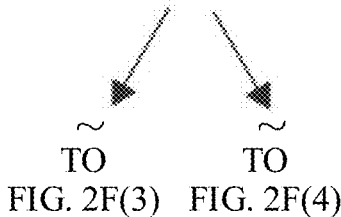
TO      TO
FIG. 2F(3)   FIG. 2F(4)

CONT.
FROM
FIG. 2F(2)
~
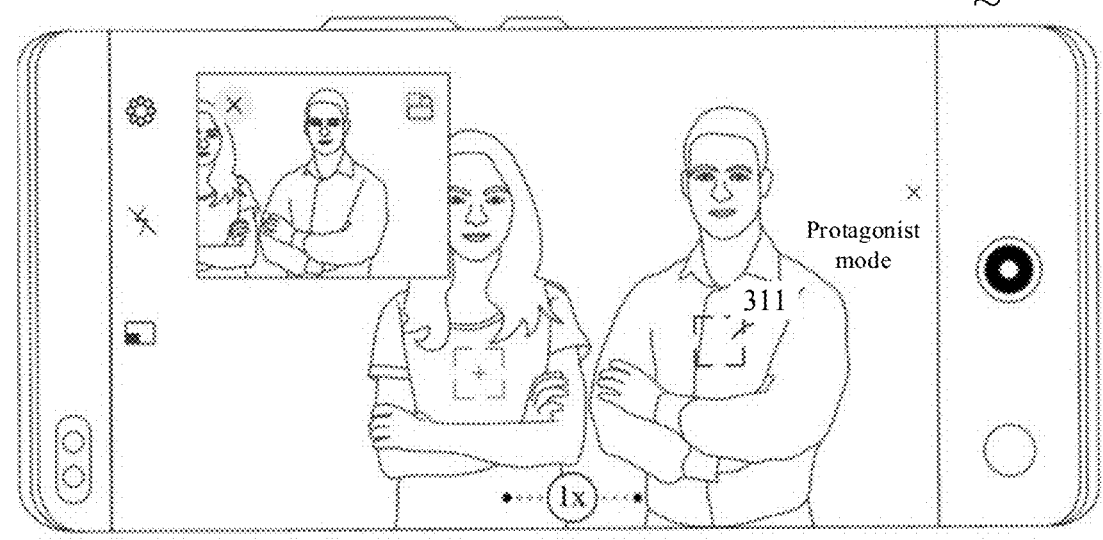
FIG. 2F(3)
CONT.
FROM
FIG. 2F(2)
~
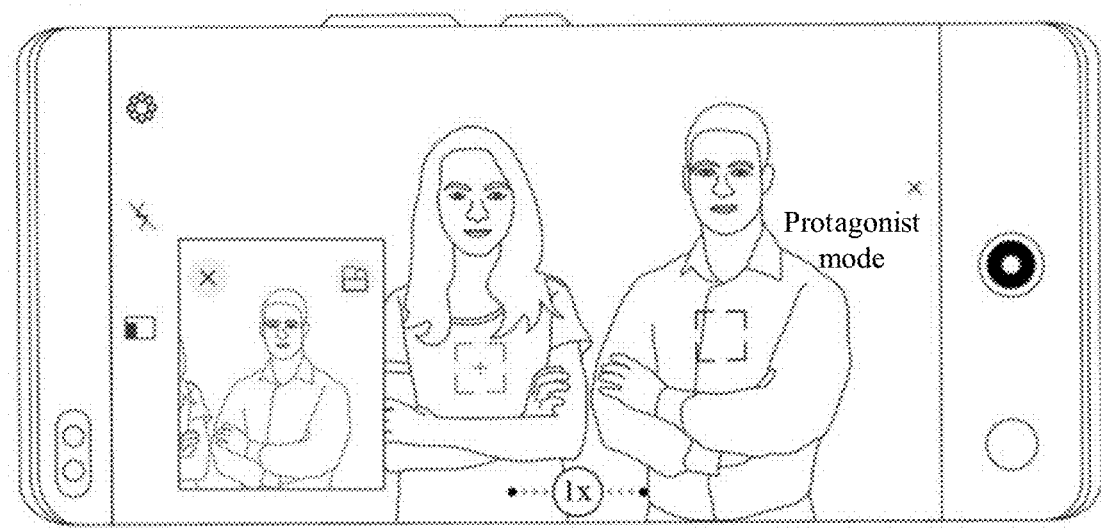
FIG. 2F(4)

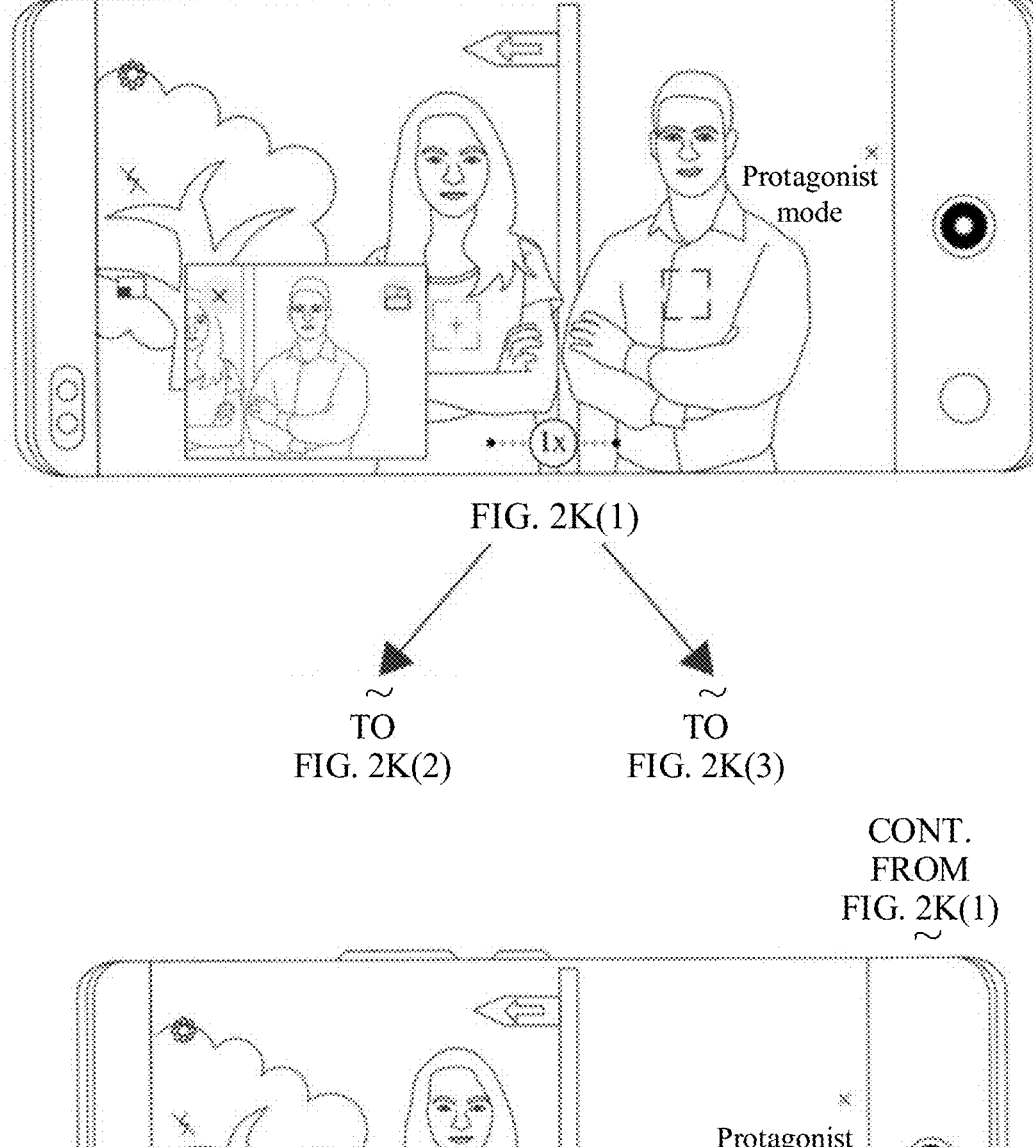
FIG. 2K(1)
TO
FIG. 2K(2)
TO
FIG. 2K(3)
CONT.
FROM
FIG. 2K(1)
FIG. 2K(2)

CONT.
FROM
FIG. 2K(1)
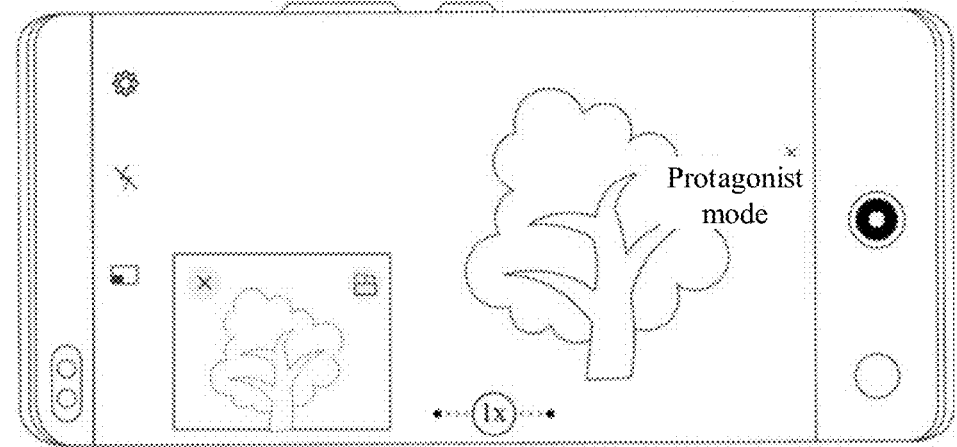
FIG. 2K(3)
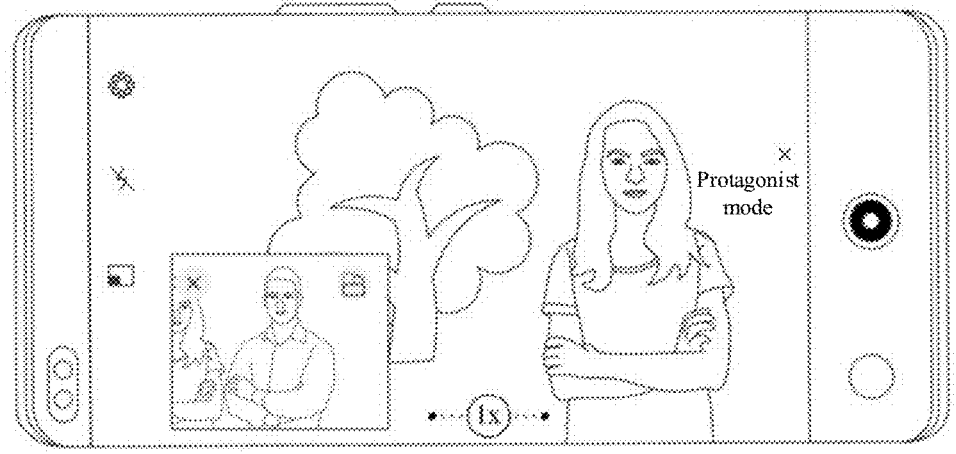
FIG. 2K(4)

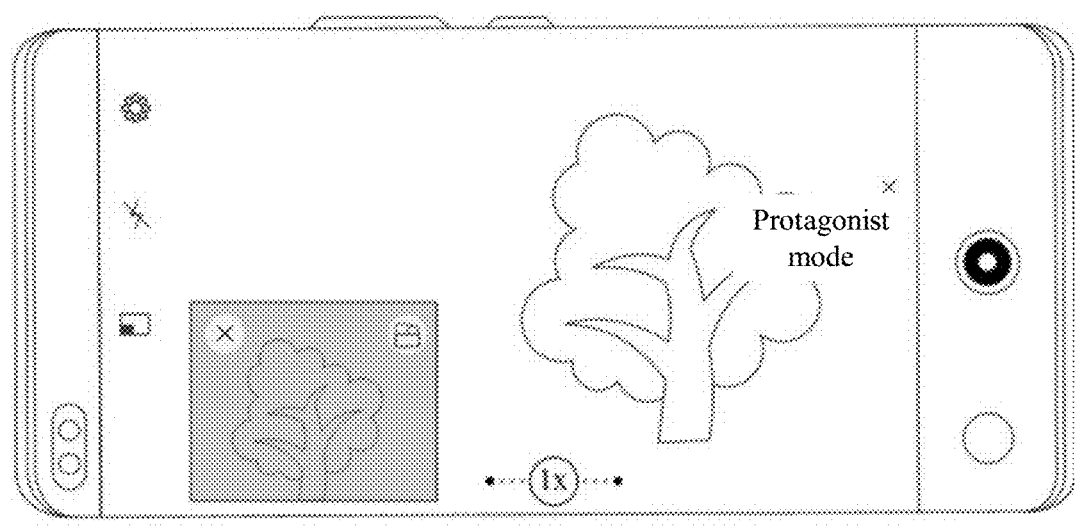
FIG. 2K(5)
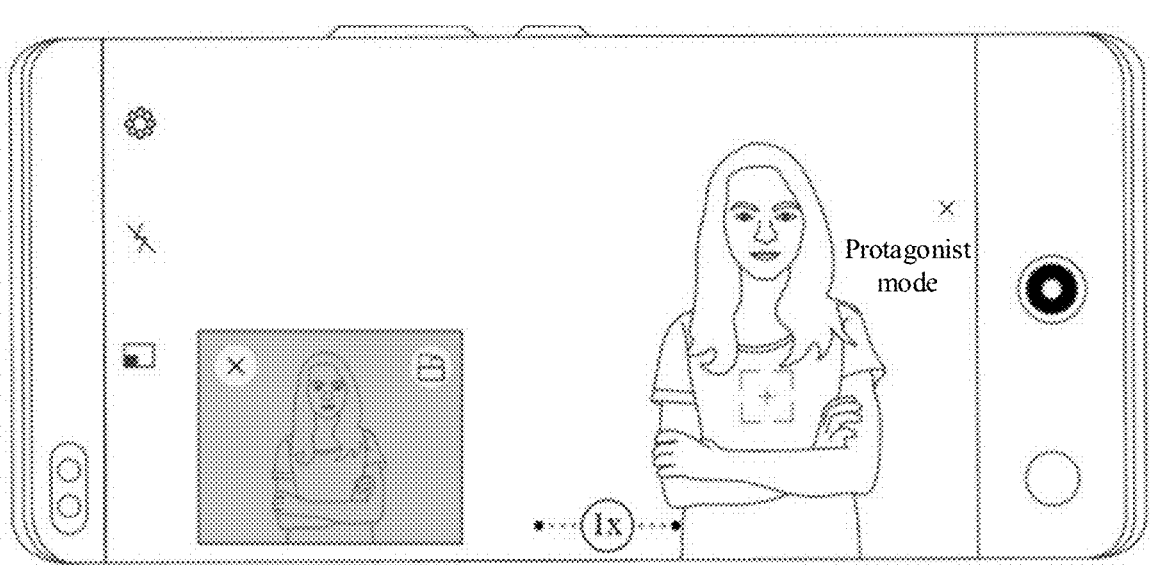
FIG. 2L(1)
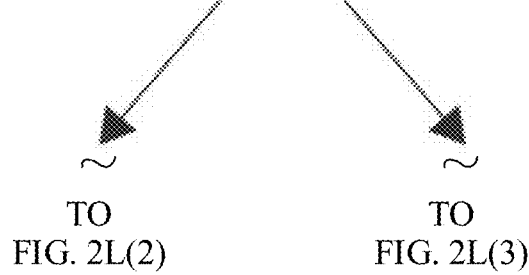
TO
FIG. 2L(2)
TO
FIG. 2L(3)

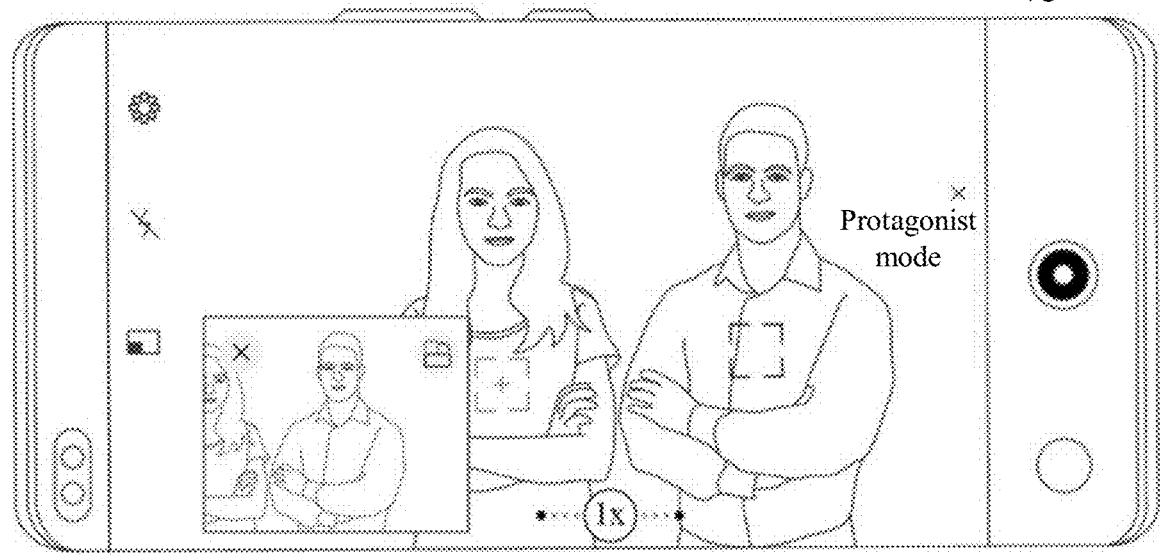
FIG. 2L(2)
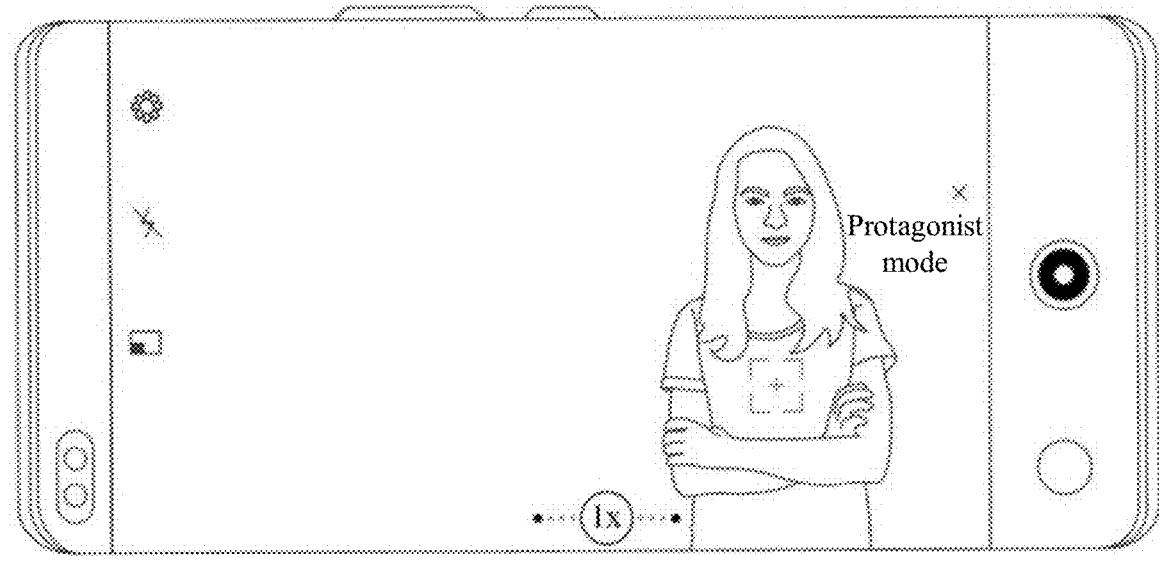
FIG. 2L(3)

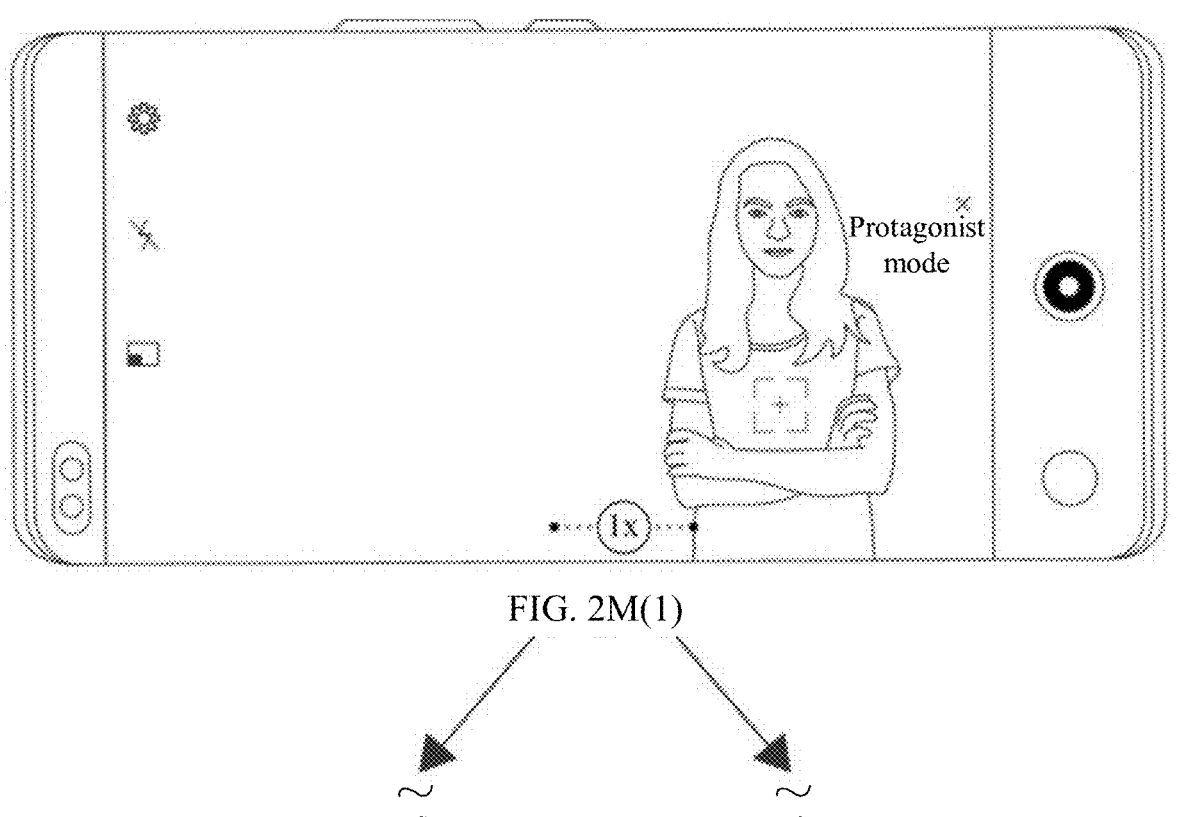
FIG. 2M(1)
~
TO
FIG. 2M(2)
~
TO
FIG. 2M(3)

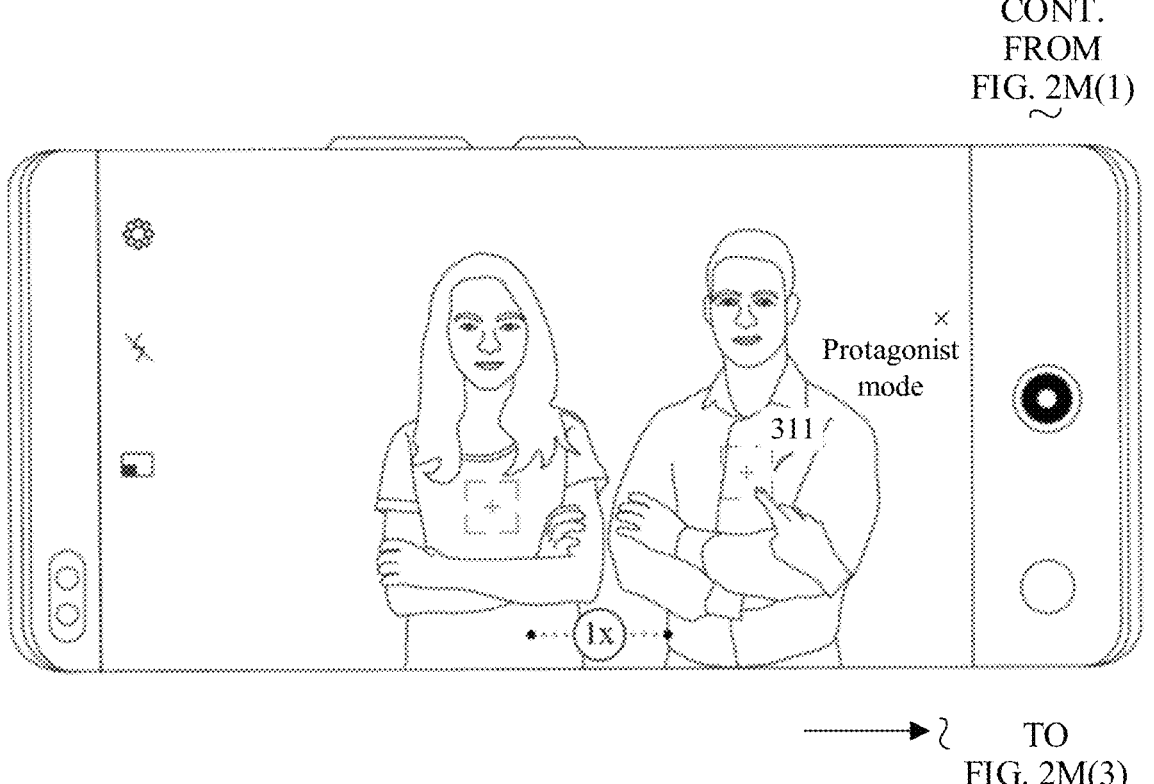
FIG. 2M(2)

CONT.
FROM
FIG. 2M(1)
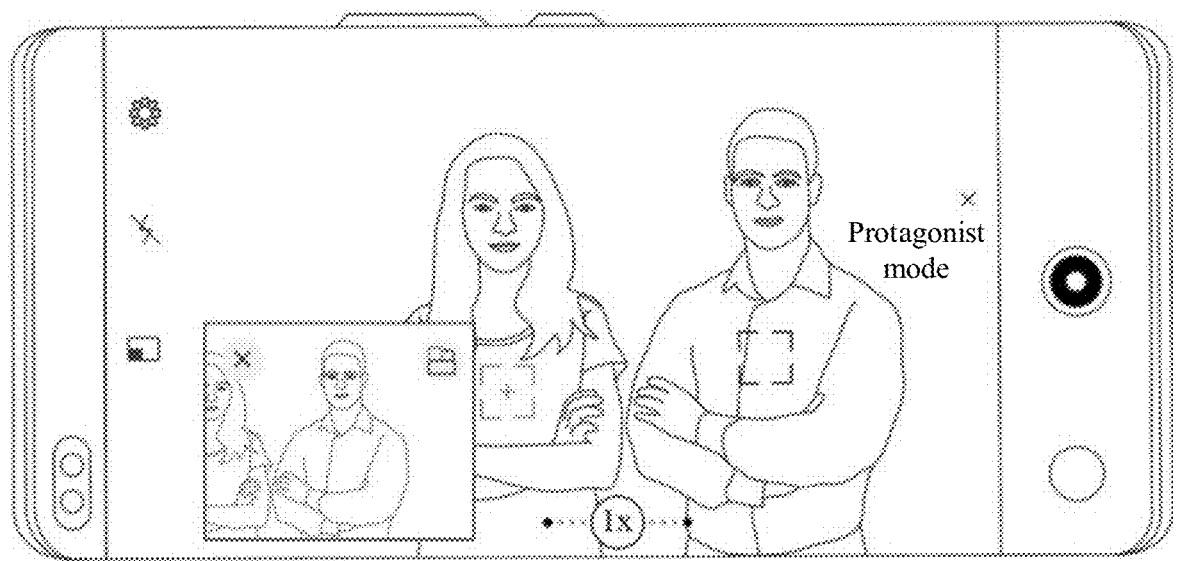
CONT.
FROM
FIG. 2M(2)
FIG. 2M(3)

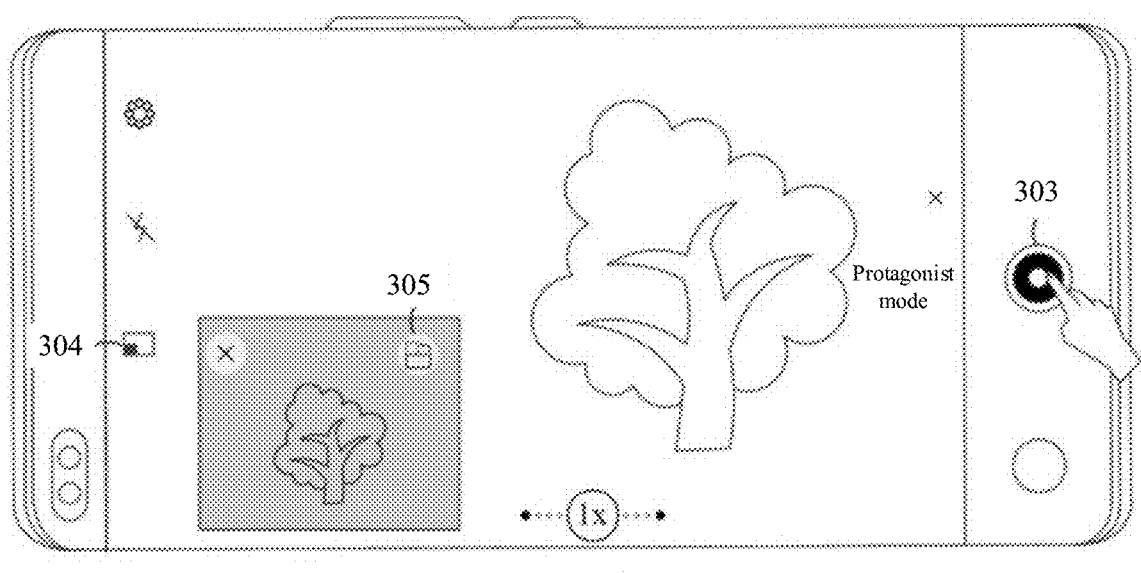
FIG. 2N(1)
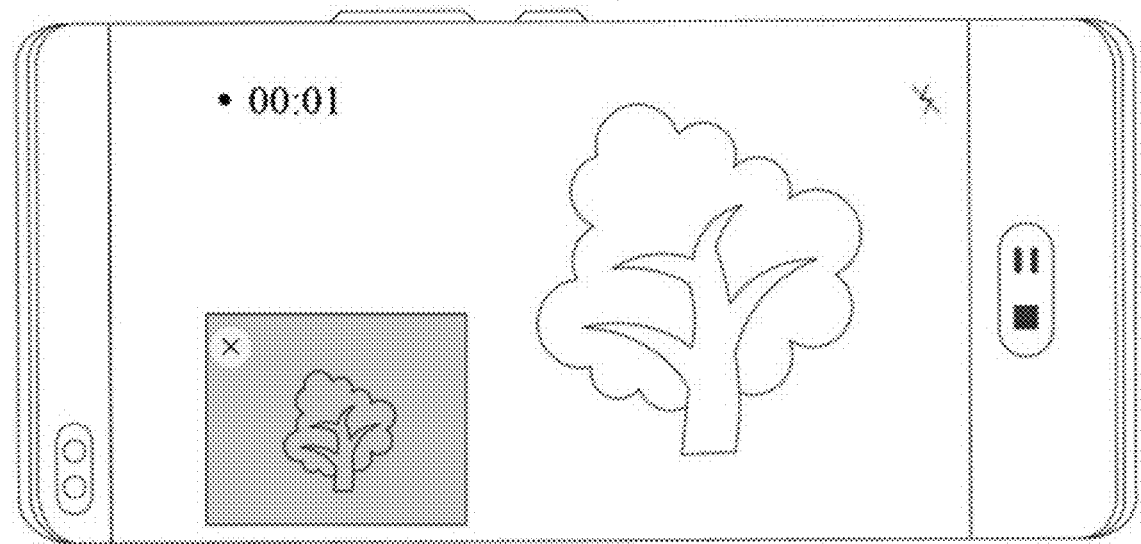
FIG. 2N(2)
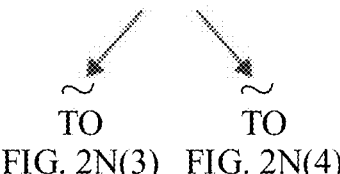
TO          TO
FIG. 2N(3)   FIG. 2N(4)

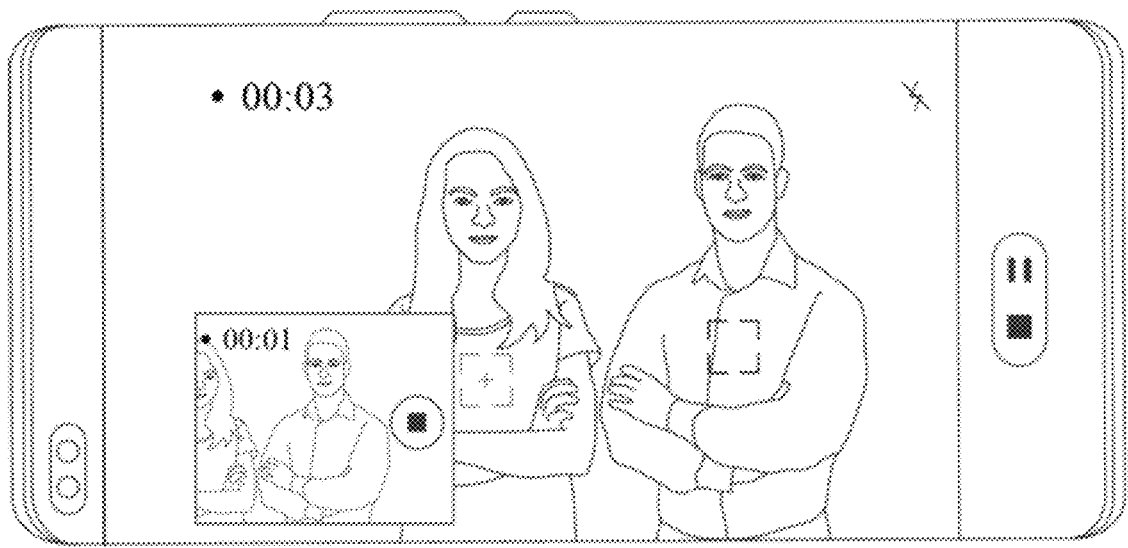
FIG. 2N(3)
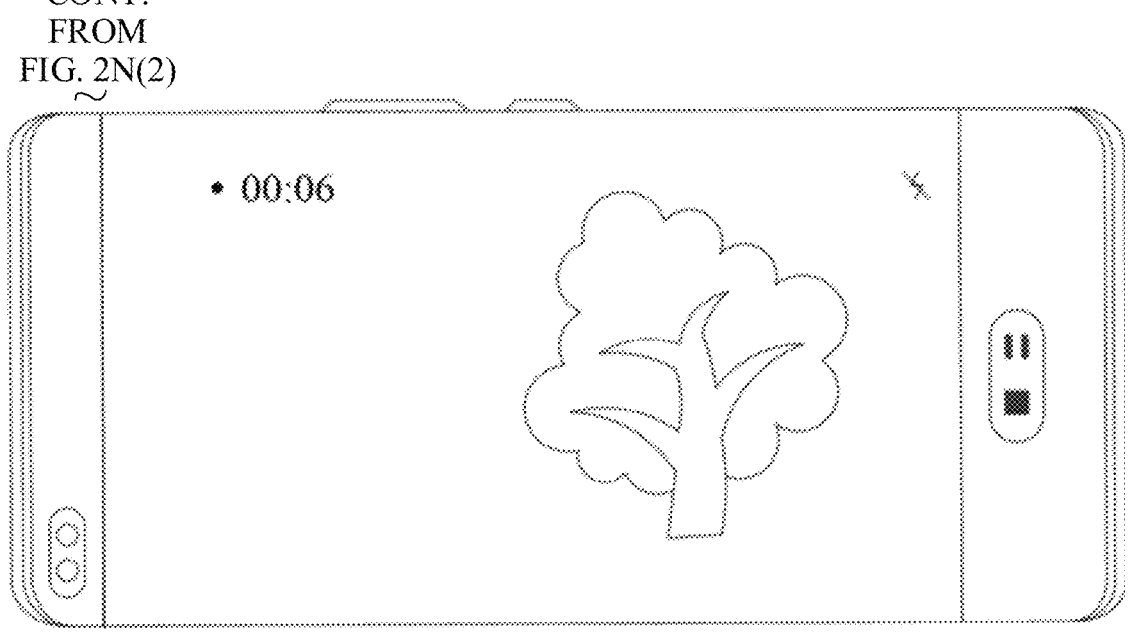
FIG. 2N(4)

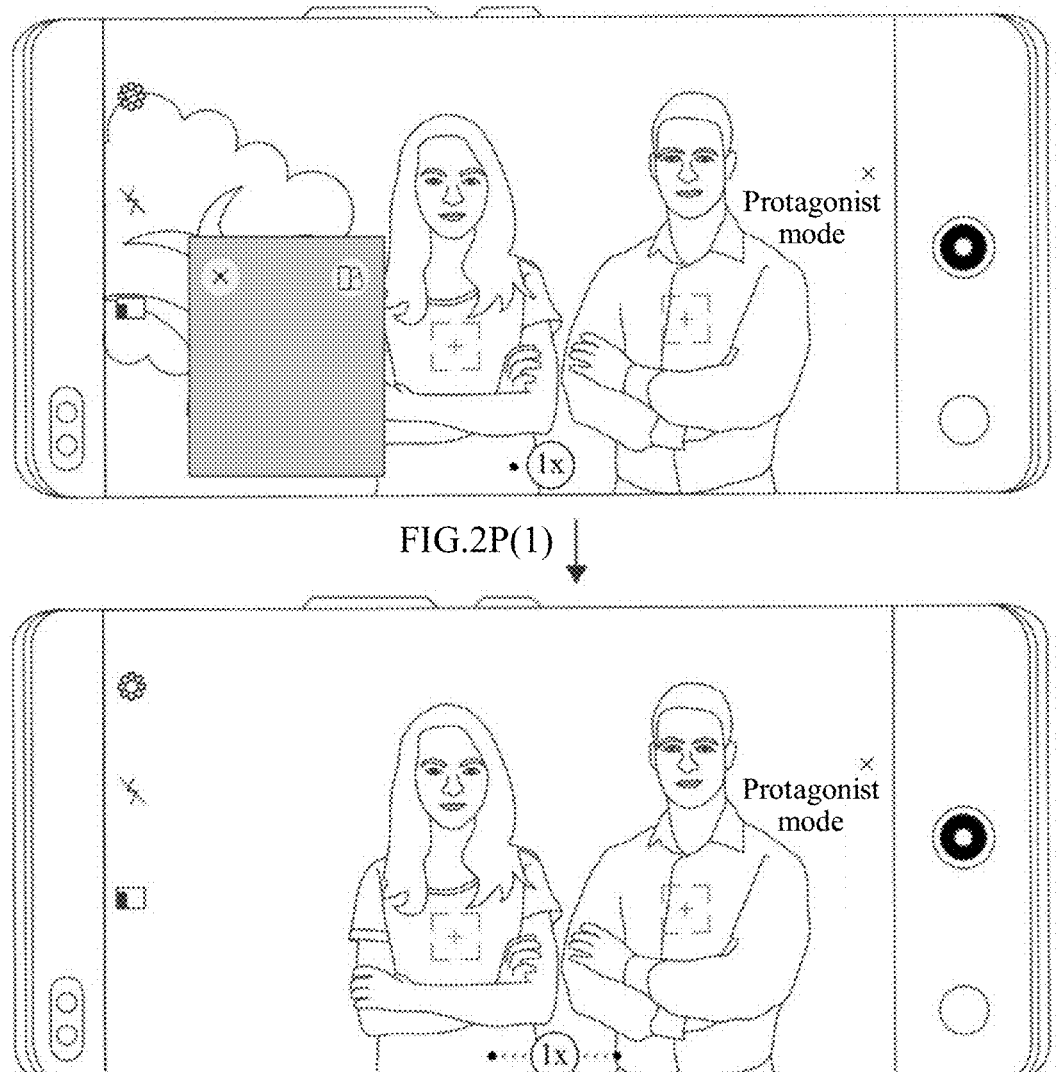
FIG.2P(1)
FIG.2P(2)

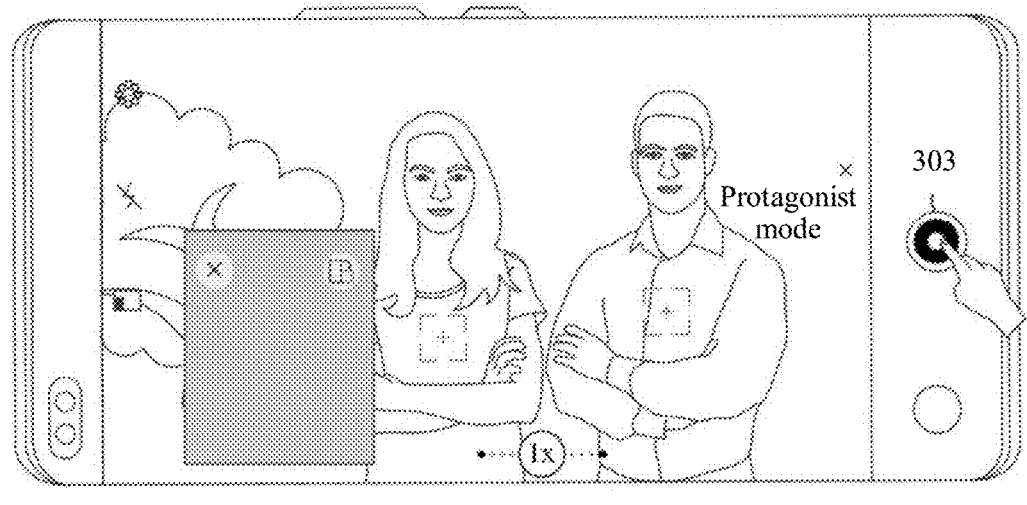
FIG. 2P(3)
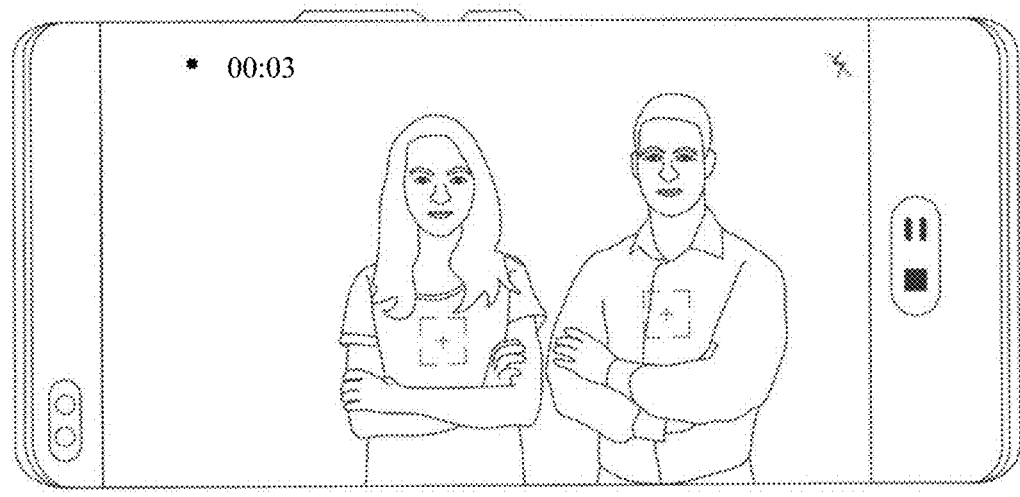
FIG. 2P(4)

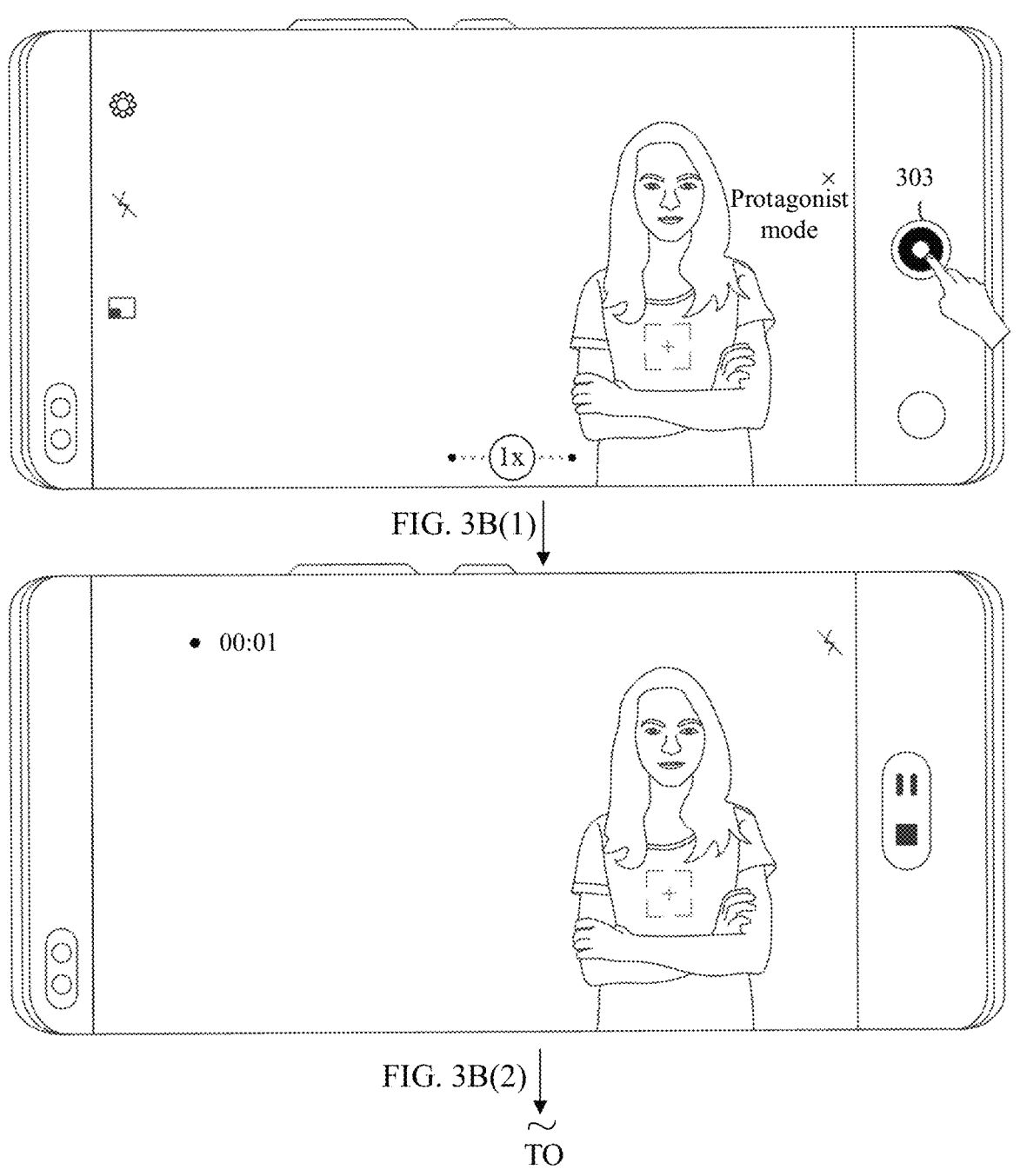
FIG. 3B(1)
FIG. 3B(2)
TO
FIG. 3B(3)

CONT.
FROM
FIG. 3B(2)

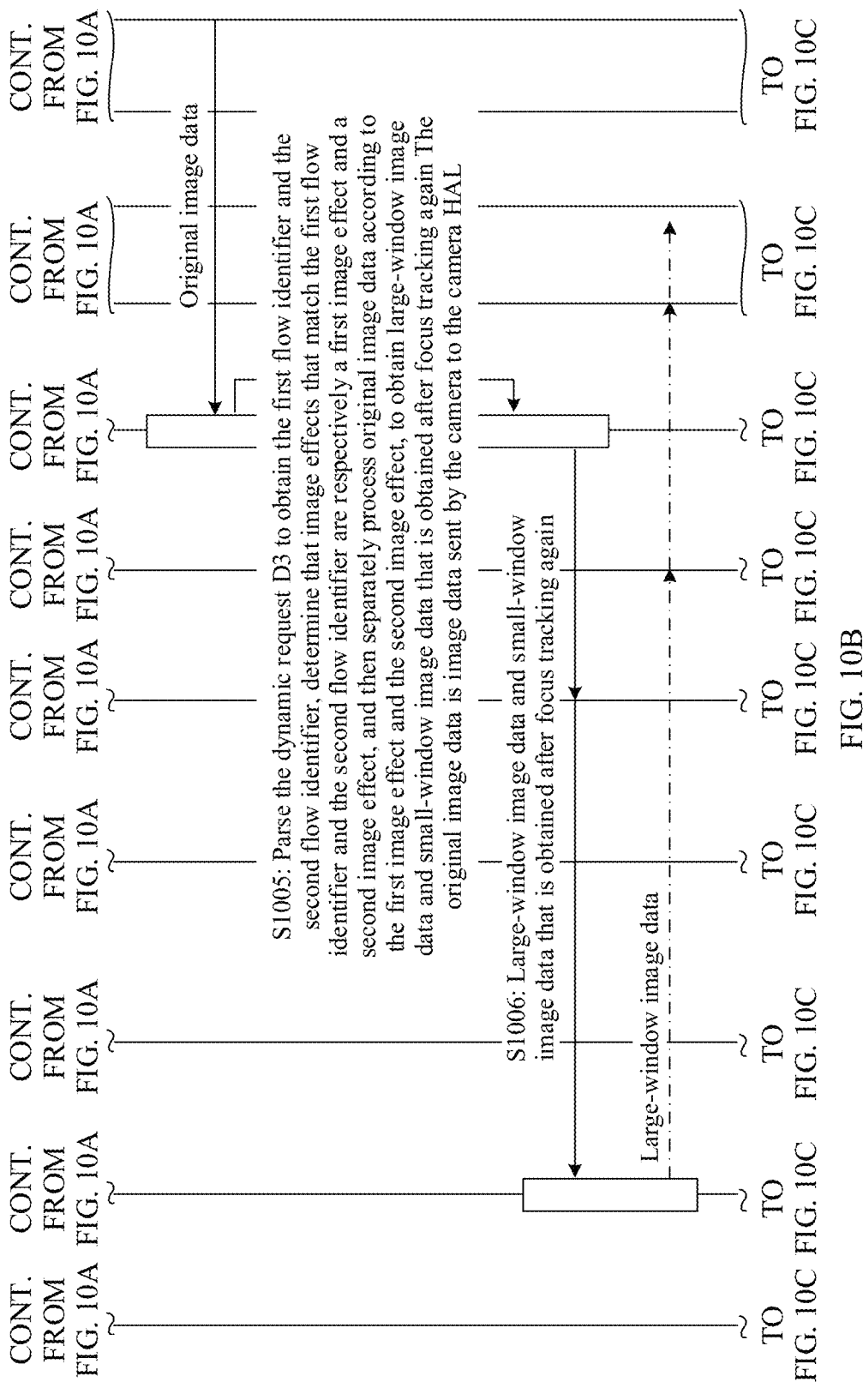

S1005: Parse the dynamic request D3 to obtain the first flow identifier and the second flow identifier, determine that image effects that match the first flow identifier and the second flow identifier are respectively a first image effect and a second image effect, and then separately process original image data according to the first image effect and the second image effect, to obtain large-window image data and small-window image data that is obtained after focus tracking again The original image data is image data sent by the camera to the camera HAL S1006: Large-window image data and small-window image data that is obtained after focus tracking again

FIG. 10B

SHOOTING METHOD AND RELATED DEVICE

CROSS-REFERENCE TO RELATED APPLICATIONS

This application is a national stage of International Application No. PCT/CN2023/092371, filed on May 5, 2023, which claims priority to Chinese Patent Application No. 202210603408.2, filed on May 30, 2022, and Chinese Patent Application No. 202210910909.5, filed on Jul. 29, 2022. The disclosures of the aforementioned applications are hereby incorporated by reference in their entireties.

TECHNICAL FIELD

This application relates to the field of terminal technologies, and in particular to a shooting method and a related device.

BACKGROUND

With development of terminal technologies, video shooting has more possibilities. For example, an electronic device such as a mobile phone may be used by a person to implement automatic focus tracking on an object such as a face, a person, or a pet, so as to resolve a problem such as defocus or a focus shift caused when the object cannot be automatically focused on as the object moves.

SUMMARY

This application provides a shooting method and a related device. The shooting method may be applied to an electronic device disposed with a camera. According to the shooting method, after entering a focus tracking mode, the electronic device may configure two data flows, and differentiate the two data flows by using flow identifiers. In a shooting scene in which a plurality of shooting objects are in a same frame, the electronic device may perform targeted close-up recording on one of the shooting objects. After a user selects a shooting object that needs close-up recording, a small window of the electronic device may display the shooting object. In addition, after the user triggers recording, the electronic device may record an original video based on a large window displayed by the electronic device, and record a close-up video based on the small window displayed by the electronic device. In this process, an encoder in the electronic device may obtain image data in a small-window data flow by using a flow identifier corresponding to the small-window data flow, and encode the image data to obtain the close-up video; and obtain image data in a large-window data flow by using a flow identifier corresponding to the large-window data flow, and encode the image data to obtain the original video. In some embodiments of this application, the electronic device may shoot one original video and a plurality of close-up videos. In this manner, the electronic device can distinguish the data flow (that is, the small-window data flow) corresponding to the small window used to record the close-up video from the data flow (that is, the large-window data flow) corresponding to the large window used to record the original video, and simultaneously record the original video and the close-up video, which greatly meets a shooting requirement of the user and improves user experience.

According to a first aspect, this application provides a shooting method. The shooting method may be applied to an electronic device disposed with a camera. According to the method, the electronic device may display a first interface, where the first interface includes a first window and a first control, and the first window displays a first image collected by the camera. The electronic device may detect a first operation acting on the first control. In response to the first operation, the electronic device may configure a first data flow corresponding to the first window and a second data flow corresponding to a second window, and display a second interface. The second interface includes the first window and a second control. The first window displays the first image collected by the camera and a mark displayed on a subject in the first image. The first data flow is corresponding to a first flow identifier, and the second data flow is corresponding to a second flow identifier. The electronic device may further detect a second operation acting on a mark, and display the second window in response to the second operation. The second window is smaller than the first window. The second window displays a close-up image of a first subject. The first subject is a subject corresponding to the mark on which the second operation acts. In response to an operation acting on the second control, the electronic device may separately record a picture in the first window and a picture in the second window. An encoder in the electronic device may obtain image data in the first data flow based on the first flow identifier, and encode the image data in the first data flow to obtain a first video; and the encoder in the electronic device may obtain image data in the second data flow based on the second flow identifier, and encode the image data in the second data flow to obtain a second video.

In the solution provided in this application, the electronic device may configure the first data flow and the second data flow when entering a focus tracking mode, and allocate different flow identifiers (that is, the first flow identifier and the second flow identifier) to the first data flow and the second data flow. In a subsequent process, once simultaneous video recording of a large window and a small window is triggered, the encoder in the electronic device may obtain the image data in the first data flow based on the first flow identifier, and encode the image data to obtain an original video. The encoder in the electronic device may further obtain the image data in the second data flow based on the second flow identifier, and encode the image data to obtain a close-up video. In this shooting method, shooting needs of a user on the original video and the close-up video can be met within a same time, thereby improving user experience.

It may be understood that, when the electronic device separately records the picture in the first window and the picture in the second window, the encoder in the electronic device may obtain the image data in the first data flow based on the first flow identifier, and encode the image data in the first data flow to obtain the first video; and the encoder in the electronic device may obtain the image data in the second data flow based on the second flow identifier, and encode the image data in the second data flow to obtain the second video.

In some embodiments of this application, the first window is a large window/a large preview window mentioned later, and the second window is a small window/a small preview window mentioned later. For example, the first window may be a large window 301, and the small window may be a small window 302. For details, refer to accompanying drawings such as FIG. 1A to FIG. 1D.

In some embodiments of this application, the first control is a control used to trigger entry into the focus tracking mode (that is, a protagonist mode). For example, the first control may be a protagonist mode button 404 (as shown in FIG.

2A(1) to FIG. 2A(4)). For another example, the first control may be a protagonist mode button 405 (as shown in FIG. 2B(1) to FIG. 2B(4)). It may be understood that the first operation acting on the first control may be a tap operation, or may be an operation such as a gesture or voice control, which is not limited in this application.

In some embodiments of this application, the first data flow is a large-window data flow mentioned later, and the second data flow is a small-window data flow mentioned later.

It may be understood that the first interface may be a preview interface after the electronic device enters the focus tracking mode. For example, the first interface may be a preview interface shown in FIG. 2A(4). For another example, the first interface may be a preview interface shown in FIG. 2B(4). It may be understood that, when the electronic device displays the first interface, a camera mode of the electronic device is a video preview mode in the focus tracking mode.

In some embodiments of this application, the second control is a control used to trigger large-window recording and small-window recording. For example, the second control may be a start recording button 303 (as shown in FIG. TA to FIG. 1D). It may be understood that the operation acting on the second control may be a tap operation, or may be an operation such as a gesture or voice control, which is not limited in this application.

It may be understood that the first image is an image collected by the camera of the electronic device and displayed in the first window. The subject in the first image refers to a shooting object, or may be understood as a focus tracking object in a preview interface. For example, the first image may be an image displayed on an interface a in FIG. 2C. The subject in the first image may be a male person (that is, a person marked by a tracking box 311) and a female person (that is, a person marked by a tracking box 312) displayed on the interface a in FIG. 2C.

It may be understood that the mark may be a tracking box, for example, a tracking box 311 and a tracking box 312 shown in FIG. 2C. Certainly, the mark may alternatively have another representation form, which is not limited in this application. For example, the mark may be represented as a triangle, an arrow, or another pattern, and a color of the mark may alternatively be set to another color.

For example, when the mark on which the second operation acts is the tracking box 311 shown in FIG. 2C, the first subject is a male person corresponding to the tracking box 311. For another example, when the mark on which the second operation acts is the tracking box 312 shown in FIG. 2C, the first subject is a female person corresponding to the tracking box 312.

It may be understood that, similar to the first operation, the second operation may also be a tap operation, or may be an operation such as a gesture or voice control, which is not limited in this application.

It may be understood that the first video is an original video, and the second video is a close-up video. In some embodiments of this application, the second video is a close-up video of the first subject.

With reference to the first aspect, in a possible implementation, the shooting method may further include: The electronic device may display a third interface in response to an operation acting on the second control. The third interface may include the first window, the second window, and a third control. After the picture in the first window and the picture in the second window are separately recorded, the shooting method may further include: The electronic device may save the first video and the second video in response to an operation acting on the third control.

In the solution provided in this application, after starting large-window recording and small-window recording, the electronic device may save the original video corresponding to the large window and the close-up video corresponding to the small window in response to a user operation acting on an end recording control. In this shooting method, shooting needs of a user on the original video and the close-up video can be met within a same time, thereby improving user experience.

In some embodiments of this application, the third control may be used to end video recording. It may be understood that when the electronic device displays the third interface, the third interface includes the first window, the second window, and the third control. That is, the electronic device simultaneously displays the first window and the second window. In this case, the third control may be used to simultaneously end recording of the first window and the second window. It may be understood that the operation acting on the third control may be a tap operation, or may be an operation such as a gesture or voice control, which is not limited in this application.

For example, the third control may be an end recording button 314, and the third interface may be an interface a shown in FIG. 3M. It may be understood that, as shown in FIG. 3M, when the electronic device receives a tap operation on the end recording button 314, the electronic device may simultaneously end recording of the large window (that is, the first window) and recording of the small window (that is, the second window), and enter an interface b in FIG. 3M.

With reference to the first aspect, in a possible implementation, before the electronic device saves the first video and the second video, the shooting method may further include: The electronic device detects a fourth operation acting on a mark, where in response to the fourth operation, the second window displays a close-up image of a second subject, and the second subject is a subject corresponding to the mark on which the fourth operation acts.

In the solution provided in this application, when the electronic device displays a video preview interface (the interface b shown in FIG. 2C) including the first window and the second window, the electronic device may replace a focus tracking object (as shown in FIG. 2C) for an operation performed by the user on another mark. In this manner, the user may freely select a focus tracking object and prepare for recording of a subsequent close-up video. Similarly, when the electronic device displays a recording interface (for example, an interface a shown in FIG. 3I) including the first window and the second window, the electronic device may replace a focus tracking object (as shown in FIG. 3I) for an operation performed by the user on another mark. In this manner, the user may switch a focus tracking object in a recording process, so as to meet different shooting requirements of the user and improve user experience.

It may be understood that the first subject and the second subject may be the same, or may be different.

It may be understood that the fourth operation may be a tap operation, or may be an operation such as a gesture or voice control, which is not limited in this application.

With reference to the first aspect, in a possible implementation, the second window includes a fourth control. After the electronic device separately records the picture in the first window and the picture in the second window, the shooting method may further include: stopping recording the picture in the second window and saving the second video, in response to an operation acting on the fourth control.

In the solution provided in this application, the user may end recording of the second window by triggering the fourth control on the second window. It may be understood that after recording of the second window is completed, recording of the first window is not affected, and the electronic device may continue recording of the first window (as shown in FIG. 3E).

In some embodiments of this application, the fourth control may be used to end recording of the second window without affecting recording of the first window. For example, the fourth control may be an end small-window recording button 315. The electronic device may end recording of the small window (that is, the second window) based on the end small-window recording button 315, and recording of the large window (that is, the first window) is not affected.

With reference to the first aspect, in a possible implementation, after the electronic device saves the second video, the shooting method may include: The electronic device stops recording the picture in the first window and saves the first video, in response to an operation acting on the third control.

It may be understood that when the recording interface does not include the second window, the electronic device may end only recording of the first window by using the third control. In the solution provided in this application, the electronic device may save the second video and then save the first video. In this case, duration of the first video is longer than duration of the second video.

With reference to the first aspect, in a possible implementation, after the electronic device saves the second video, the shooting method may further include: The electronic device may detect a fifth operation acting on a mark; and the electronic device may re-display the second window and record the picture in the second window, in response to the fifth operation, where the second window displays a close-up image of a third subject, and the third subject is a subject corresponding to the mark on which the fifth operation acts. The encoder in the electronic device obtains the image data in the second data flow based on the second flow identifier, and encodes the image data in the second data flow to obtain a third video.

In the solution provided in this application, after the electronic device first ends recording of the second window, the electronic device may re-select a focus tracking object, and record a close-up video of the focus tracking object. In this case, the electronic device may obtain one original video and several close-up videos in one shooting process. In addition, in some embodiments of this application, the several close-up videos may be close-up videos of different focus tracking objects. In this shooting method, shooting needs of the user on the original video and the close-up videos of different focus tracking objects can be met within a same time, thereby improving user experience.

It may be understood that, when the electronic device re-displays the second window and records the picture in the second window, the encoder in the electronic device obtains the image data in the second data flow based on the second flow identifier, and encodes the image data in the second data flow to obtain the third video.

It may be understood that the third subject and the first subject may be the same, or may be different.

With reference to the first aspect, in a possible implementation, the shooting method may further include: The electronic device displays a fourth interface in response to the fifth operation, where the fourth interface includes the first window, the second window, and a third control. After the electronic device re-displays the second window and records the picture in the second window, the shooting method may further include: saving the first video and the third video in response to an operation acting on the third control.

In the solution provided in this application, after starting recording of the second window again, the electronic device may simultaneously end recording of the first window and the second window. In this shooting method, the user may obtain a plurality of close-up videos in different time periods in a process of recording the original video, so that the user can record brilliant moments at different moments.

It may be understood that the fourth interface may be displayed when the electronic device ends recording of the second window and starts recording of the second window again. For example, the fourth interface may be an interface d shown in FIG. 3E.

It may be understood that the third video is a close-up video. The second video and the third video may be close-up videos of a same focus tracking object, or may be close-up videos of different focus tracking objects.

With reference to the first aspect, in a possible implementation, after the electronic device detects the first operation acting on the first control, the shooting method may further include: The electronic device may separately generate a first-window video file and a second-window video file based on a current system time in response to the first operation; the electronic device may associate a first encoder with the first data flow based on the first flow identifier, and associate a second encoder with the second data flow based on the second flow identifier; the electronic device may associate the first encoder with the first-window video file based on a file identifier of the first-window video file, and associate the second encoder with the second-window video file based on a file identifier of the second-window video file; and the electronic device may respectively match the first flow identifier and the second flow identifier with a first image effect and a second image effect. The first encoder is configured to encode the image data in the first data flow, and the second encoder is configured to encode the image data in the second data flow. The first-window video file is used to store a video obtained by encoding the image data in the first data flow; and the second-window video file is used to store a video obtained by encoding the image data in the second data flow. The first image effect is an image effect corresponding to the image data in the first data flow; and the second image effect is an image effect corresponding to the second image data.

In the solution provided in this application, the electronic device may allocate a flow identifier to each of data flows of a large preview window and a small preview window, associate different video files and encoders according to different flow identifiers, and match different image effects, thereby implementing recording of an original video corresponding to the large preview window and a close-up video corresponding to the small preview window. In this shooting method, needs of a user for videos in different framing ranges can be met within a same time, thereby improving user experience.

In some embodiments of this application, the first-window video file may be a large-window video file, and the second-window video file may be a small-window video file.

It may be understood that for related descriptions of the foregoing content, references may be made to FIG. 7A and FIG. 7B and the following descriptions of steps S701-S709.

With reference to the first aspect, in a possible implementation, after the electronic device configures the first data flow corresponding to the first window and the second data flow corresponding to the second window, the shooting method may further include: A flow management module in the electronic device may send first flow identifier parameter information to a coding control module in the electronic device and a camera HAL in the electronic device, where the first flow identifier parameter information includes the first flow identifier and the second flow identifier. After the electronic device separately generates the first-window video file and the second-window video file based on the current system time, the shooting method may further include: A storage module in the electronic device sends first file information to the coding control module, where the first file information includes the file identifier of the first-window video file and the file identifier of the second-window video file; and That the electronic device associates the first encoder with the first data flow based on the first flow identifier, associates the second encoder with the second data flow based on the second flow identifier, associates the first encoder with the first-window video file based on the file identifier of the first-window video file, and associates the second encoder with the second-window video file based on the file identifier of the second-window video file may specifically include: The coding control module parses the first flow identifier parameter information and the first file information to obtain the first flow identifier and the second flow identifier, the file identifier of the first-window video file, and the file identifier of the second-window video file; the coding control module creates the first encoder and the second encoder; the coding control module determines, based on the first flow identifier and the file identifier of the first-window video file, that an input to the first encoder is the image data in the first data flow, and determines that a storage region of image data encoded by the first encoder is the first-window video file; and the coding control module determines, based on the second flow identifier and the file identifier of the second-window video file, that an input to the second encoder is the image data in the second data flow, and determines that a storage region of image data encoded by the second encoder is the second-window video file. That the electronic device respectively matches the first flow identifier and the second flow identifier with the first image effect and the second image effect may specifically include: The camera HAL parses the first flow identifier parameter information to obtain the first flow identifier and the second flow identifier; and the camera HAL determines, based on the first flow identifier, that a data flow that matches the first image effect is the first data flow, and determines, based on the second flow identifier, that a data flow that matches the second image effect is the second data flow.

In some embodiments of this application, the first flow identifier parameter information may be flow identifier information shown in FIG. 7A and FIG. 7B. For details, refer to related descriptions of step S703 and step S708. The first file information may be file information W1. For details, refer to related descriptions of step S705.

It may be understood that the file identifier of the first-window video file is used to mark the first-window video file. The file identifier of the first-window video file may include a time stamp of the first-window video file, and may further include a file name of the first-window video file. The file identifier of the second-window video file is used to mark the second-window video file. The file identifier of the second-window video file may include a time stamp of the second-window video file, and may further include a file name of the second-window video file. Certainly, the file identifier of the first-window video file and the file identifier of the second-window video file may further include other content, which is not limited in this application.

In some embodiments of this application, the image data in the first data flow may be large-window image data, and the image data in the second data flow may be small-window image data.

It may be understood that for related descriptions of the foregoing content, references may be made to FIG. 7A and FIG. 7B and the following descriptions of steps S701-S709.

With reference to the first aspect, in a possible implementation, the shooting method may further include: The coding control module in the electronic device sends a first encoder command to the encoder in the electronic device in response to an operation acting on the second control, where the first encoder command is used to start the first encoder and the second encoder; and the flow management module in the electronic device sends a first dynamic request to the camera HAL in the electronic device, where the first dynamic request includes the first flow identifier and the second flow identifier. That the electronic device separately records the picture in the first window and the picture in the second window may specifically include: The camera HAL parses the first dynamic request to obtain the first flow identifier and the second flow identifier; the camera HAL processes original image data separately based on the first image effect that matches the first flow identifier and the second image effect that matches the second flow identifier, to obtain first-window image data and second-window image data; the first encoder obtains the first-window image data, encodes the first-window image data, and writes encoded image data into the first-window video file; and the second encoder obtains the second-window image data, encodes the second-window image data, and writes encoded image data into the second-window video file.

In some embodiments of this application, the first encoder command may be an encoder command B1. The first dynamic request may be a dynamic request D1. The first-window image data is the image data in the first data flow, and the first-window image data may be large-window image data. The second-window image data is the image data in the second data flow, and the second-window image data may be small-window image data.

It may be understood that for related descriptions of the foregoing content, references may be made to FIG. 8A and FIG. 8B and the following descriptions of steps S801-S807.

With reference to the first aspect, in a possible implementation, that the electronic device stops recording the picture in the second window and saves the second video, in response to an operation acting on the fourth control may specifically include: The encoder in the electronic device stops encoding the image data of the second data flow in response to the operation acting on the fourth control; a flow management module in the electronic device deletes the second flow identifier in a first dynamic request to obtain a second dynamic request, and sends the second dynamic request to a camera HAL in the electronic device, where the second dynamic request includes the first flow identifier; and a storage module in the electronic device saves the second video in a second-window video file.

In the solution provided in this application, the electronic device may stop recording of the second window by deleting the flow identifier of the second data flow in the dynamic request. Correspondingly, the electronic device may save a close-up video in the second-window video file. In this shooting method, shooting of the original video and shooting of the close-up video can be flexibly implemented, thereby improving user experience.

In some embodiments of this application, the second dynamic request may be a dynamic request D2.

In some embodiments of this application, that the encoder in the electronic device stops encoding the image data in the second data flow may specifically include: The coding control module in the electronic device may send an encoder command B2 to the second encoder, and after receiving the encoder command B2, the second encoder may stop encoding the image data in the second data flow.

It may be understood that for related descriptions of the foregoing content, references may be made to FIG. 9A and FIG. 9B and the following descriptions of steps S901-S909.

With reference to the first aspect, in a possible implementation, after the electronic device stops recording the picture in the second window, the shooting method may further include: The flow management module sends second flow identifier parameter information to a coding control module in the electronic device, where the second flow identifier parameter information includes the second flow identifier; the storage module recreates a second-window video file based on a current system time, and sends second file information to the coding control module, where the second file information includes a file identifier of the recreated second-window video file; and the coding control module creates a third encoder based on the second flow identifier parameter information and the second file information, and associates the second data flow and the recreated second-window video file with the third encoder.

In some embodiments of this application, after the electronic device stops recording the picture in the second window, the flow management module may directly send the second flow identifier to the coding control module in the electronic device. For details, refer to step S911. Details are not described herein.

In some embodiments of this application, the second file information may be file information W2.

It may be understood that the file identifier of the recreated second-window video file may include a file name of the recreated second-window video file, and may further include a time stamp of the recreated second-window video file. Certainly, the file identifier of the recreated second-window video file may further include other content used to mark the recreated second-window video file. This is not limited in this application.

It may be understood that for related descriptions of the foregoing content, references may be made to descriptions of steps S910-S912 in FIG. 9B.

With reference to the first aspect, in a possible implementation, after the electronic device detects a fifth operation acting on a mark, the shooting method may further include: A flow management module in the electronic device may add the second flow identifier to a second dynamic request in response to the fifth operation to obtain a third dynamic request, and send the third dynamic request to a camera HAL in the electronic device, where the third dynamic request includes the first flow identifier and the second flow identifier; the camera HAL parses the third dynamic request to obtain the first flow identifier and the second flow identifier; the camera HAL determines that image effects corresponding to the first flow identifier and the second flow identifier are respectively a first image effect and a second image effect, and processes original image data separately based on the first image effect and the second image effect, to obtain first-window image data and second-window image data; and a coding control module in the electronic device controls a first encoder and a third encoder to respectively encode the first-window image data and the second-window image data, and respectively writes encoded image data into a first-window video file and a recreated second-window video file.

In the solution provided in this application, the electronic device may record the second window by adding the second flow identifier corresponding to the second data flow to the dynamic request. It may be understood that, when recording the original video, the electronic device may record a plurality of close-up videos. This shooting manner can meet shooting needs of the user on close-up videos at different moments, improving user experience.

In some embodiments of this application, the third dynamic request may be a dynamic request D3.

In some embodiments of this application, in response to the fifth operation, the coding control module in the electronic device may further send an encoder command B3 to the third encoder. After receiving the encoder command B3, the third encoder may start to encode the image data in the second data flow. For details, refer to step S1002. Details are not described herein.

It may be understood that for related descriptions of the foregoing content, references may be made to FIG. 10A to FIG. 10C and the following descriptions of steps S1001-S1008.

According to a second aspect, this application provides an electronic device. The electronic device may include a display screen, a camera, a memory, and one or more processors. The memory is configured to store a computer program. The display screen may be configured to display a first interface, where the first interface includes a first window and a first control, and the first window displays a first image collected by the camera. The processor may be configured to detect a first operation acting on the first control; and configure a first data flow corresponding to the first window and a second data flow corresponding to a second window in response to the first operation. The display screen is further configured to display a second interface in response to the first operation, where the second interface includes the first window and a second control, the first window displays the first image collected by the camera and a mark displayed on a subject in the first image, the first data flow is corresponding to a first flow identifier, and the second data flow is corresponding to a second flow identifier. The processor may be further configured to detect a second operation acting on a mark. The display screen may be further configured to: display the second window in response to the second operation, where the second window is smaller than the first window, the second window displays a close-up image of a first subject, and the first subject is a subject corresponding to the mark on which the second operation acts. The processor may be further configured to separately record a picture in the first window and a picture in the second window in response to an operation acting on the second control. It may be understood that the electronic device may further include an encoder. The encoder may be configured to: obtain image data in the first data flow based on the first flow identifier, and encode the image data in the first data flow to obtain a first video; and obtain image data in the second data flow based on the second flow identifier, and encode the image data in the second data flow to obtain a second video.

With reference to the second aspect, in a possible implementation, the display screen may be further configured to display a third interface in response to an operation acting on the second control, where the third interface includes the first window, the second window, and a third control. After being configured to separately record the picture in the first window and the picture in the second window, the processor may be further configured to: save the first video and the second video in response to an operation acting on the third control.

With reference to the second aspect, in a possible implementation, before being configured to save the first video and the second video, the processor may be further configured to detect a fourth operation acting on a mark. The display screen may be further configured to: display, by using the second window, a close-up image of a second subject in response to the fourth operation, where the second subject is a subject corresponding to the mark on which the fourth operation acts.

With reference to the second aspect, in a possible implementation, the second window includes a fourth control. After being configured to separately record the picture in the first window and the picture in the second window, the processor may be further configured to: stop recording the picture in the second window and saving the second video, in response to an operation acting on the fourth control.

With reference to the second aspect, in a possible implementation, after being configured to save the second video, the processor may be further configured to detect a fifth operation acting on a mark. The display screen may be configured to: re-display the second window in response to the fifth operation, where the second window displays a close-up image of a third subject, and the third subject is a subject corresponding to the mark on which the fifth operation acts. The processor may be further configured to record the picture in the second window in response to the fifth operation. The encoder may be further configured to: obtain the image data in the second data flow based on the second flow identifier, and encode the image data in the second data flow to obtain a third video.

With reference to the second aspect, in a possible implementation, the display screen may be further configured to display a fourth interface in response to the fifth operation, where the fourth interface includes the first window, the second window, and a third control. After being configured to record the picture in the second window, the processor may be further configured to save the first video and the third video in response to an operation acting on the third control.

With reference to the second aspect, in a possible implementation, after being configured to detect the first operation acting on the first control, the processor may be further configured to: separately generate a first-window video file and a second-window video file based on a current system time in response to the first operation; associate a first encoder with the first data flow based on the first flow identifier, and associate a second encoder with the second data flow based on the second flow identifier; associate the first encoder with the first-window video file based on a file identifier of the first-window video file, and associate the second encoder with the second-window video file based on a file identifier of the second-window video file; and respectively match the first flow identifier and the second flow identifier with a first image effect and a second image effect. The first encoder is configured to encode the image data in the first data flow, and the second encoder is configured to encode the image data in the second data flow. The first-window video file is used to store a video obtained by encoding the image data in the first data flow; and the second-window video file is used to store a video obtained by encoding the image data in the second data flow. The first image effect is an image effect corresponding to the image data in the first data flow; and the second image effect is an image effect corresponding to the second image data.

With reference to the second aspect, in a possible implementation, the electronic device may further include a flow management module, a coding control module, and a camera HAL. After the processor is configured to configure the first data flow corresponding to the first window and the second data flow corresponding to the second window, the flow management module may be configured to send first flow identifier parameter information to the coding control module and the camera HAL, where the first flow identifier parameter information includes the first flow identifier and the second flow identifier. The electronic device may further include a storage module. After the processor separately generates the first-window video file and the second-window video file based on the current system time, the storage module may be configured to send first file information to the coding control module, where the first file information includes the file identifier of the first-window video file and the file identifier of the second-window video file. When associating the first encoder with the first data flow based on the first flow identifier, associating the second encoder with the second data flow based on the second flow identifier, associating the first encoder with the first-window video file based on the file identifier of the first-window video file, and associating the second encoder with the second-window video file based on the file identifier of the second-window video file, the processor may be specifically configured to: control the coding control module to parse the first flow identifier parameter information and the first file information to obtain the first flow identifier and the second flow identifier, the file identifier of the first-window video file, and the file identifier of the second-window video file; control the coding control module to create the first encoder and the second encoder; control the coding control module to determine, based on the first flow identifier and the file identifier of the first-window video file, that an input to the first encoder is the image data in the first data flow, and determine that a storage region of image data encoded by the first encoder is the first-window video file; and control the coding control module to determine, based on the second flow identifier and the file identifier of the second-window video file, that an input to the second encoder is the image data in the second data flow, and determine that a storage region of image data encoded by the second encoder is the second-window video file. When being configured to: respectively match the first flow identifier and the second flow identifier with the first image effect and the second image effect, the processor may be specifically configured to: control the camera HAL to parse the first flow identifier parameter information to obtain the first flow identifier and the second flow identifier; and control the camera HAL to determine, based on the first flow identifier, that a data flow that matches the first image effect is the first data flow, and determine, based on the second flow identifier, that a data flow that matches the second image effect is the second data flow.

With reference to the second aspect, in a possible implementation, the coding control module may be configured to: send a first encoder command to the encoder in the electronic device in response to an operation acting on the second control, where the first encoder command is used to start the first encoder and the second encoder. The flow management module may be configured to send a first dynamic request to the camera HAL in the electronic device, where the first dynamic request includes the first flow identifier and the second flow identifier. When being configured to separately record the picture in the first window and the picture in the second window, the processor may be specifically configured to: control the camera HAL to parse the first dynamic request to obtain the first flow identifier and the second flow identifier; control the camera HAL to process original image data separately based on the first image effect that matches the first flow identifier and the second image effect that matches the second flow identifier, to obtain first-window image data and second-window image data; control the first encoder to obtain the first-window image data, encode the first-window image data, and write encoded image data into the first-window video file; and control the second encoder to obtain the second-window image data, encode the second-window image data, and write encoded image data into the second-window video file.

With reference to the second aspect, in a possible implementation, when being configured to: stop recording the picture in the second window and save the second video, in response to an operation acting on the fourth control, the processor may be specifically configured to: control the encoder to stop encoding the image data of the second data flow in response to the operation acting on the fourth control; control the flow management module to delete the second flow identifier in a first dynamic request to obtain a second dynamic request, and send the second dynamic request to a camera HAL in the electronic device, where the second dynamic request includes the first flow identifier; and control the storage module to save the second video in a second-window video file.

With reference to the second aspect, in a possible implementation, after the processor is configured to stop recording the picture in the second window, the flow management module may be configured to: send second flow identifier parameter information to the coding control module in the electronic device, where the second flow identifier parameter information includes the second flow identifier. The storage module may be configured to: recreate a second-window video file based on a current system time, and send second file information to the coding control module, where the second file information includes a file identifier of the recreated second-window video file. The coding control module may be configured to: create a third encoder based on the second flow identifier parameter information and the second file information, and associate the second data flow and the recreated second-window video file with the third encoder.

With reference to the second aspect, in a possible implementation, after the processor is configured to detect a fifth operation acting on a mark, the flow management module may be configured to: add the second flow identifier to a second dynamic request in response to the fifth operation to obtain a third dynamic request, and send the third dynamic request to the camera HAL in the electronic device, where the third dynamic request includes the first flow identifier and the second flow identifier. The camera HAL may be configured to: parse the third dynamic request to obtain the first flow identifier and the second flow identifier; and determine that image effects corresponding to the first flow identifier and the second flow identifier are respectively a first image effect and a second image effect, and process original image data separately based on the first image effect and the second image effect, to obtain first-window image data and second-window image data. The coding control module may be configured to: control a first encoder and a third encoder to respectively encode the first-window image data and the second-window image data, and respectively write encoded image data into a first-window video file and a recreated second-window video file.

According to a third aspect, this application provides a computer storage medium. The computer storage medium includes computer instructions. When the computer instructions are run on an electronic device, the electronic device is enabled to perform any of the possible implementations in the first aspect described above.

According to a fourth aspect, an embodiment of this application provides a chip. The chip may be used in an electronic device. The chip includes one or more processors. The processor is configured to invoke computer instructions to enable the electronic device to perform any one of the possible implementations in the first aspect.

According to a fifth aspect, an embodiment of this application provides a computer program product including instructions. When the computer program product is run on an electronic device, the electronic device is enabled to perform any of the possible implementations in the first aspect described above.

It may be understood that, the electronic device provided in the second aspect, the computer storage medium provided in the third aspect, the chip provided in the fourth aspect, and the computer program product provided in the fifth aspect are all used to perform any of the possible implementations in the first aspect described above. Therefore, for beneficial effects that can be achieved by the electronic device, the computer storage medium, and the chip, refer to the beneficial effects of any of the possible implementations of the first aspect. Details are not described herein.

BRIEF DESCRIPTION OF DRAWINGS

FIG. 10A to FIG. 10C are a flowchart of another shooting method according to an embodiment of this application.

DESCRIPTION OF EMBODIMENTS

Figures 1A, 1B:
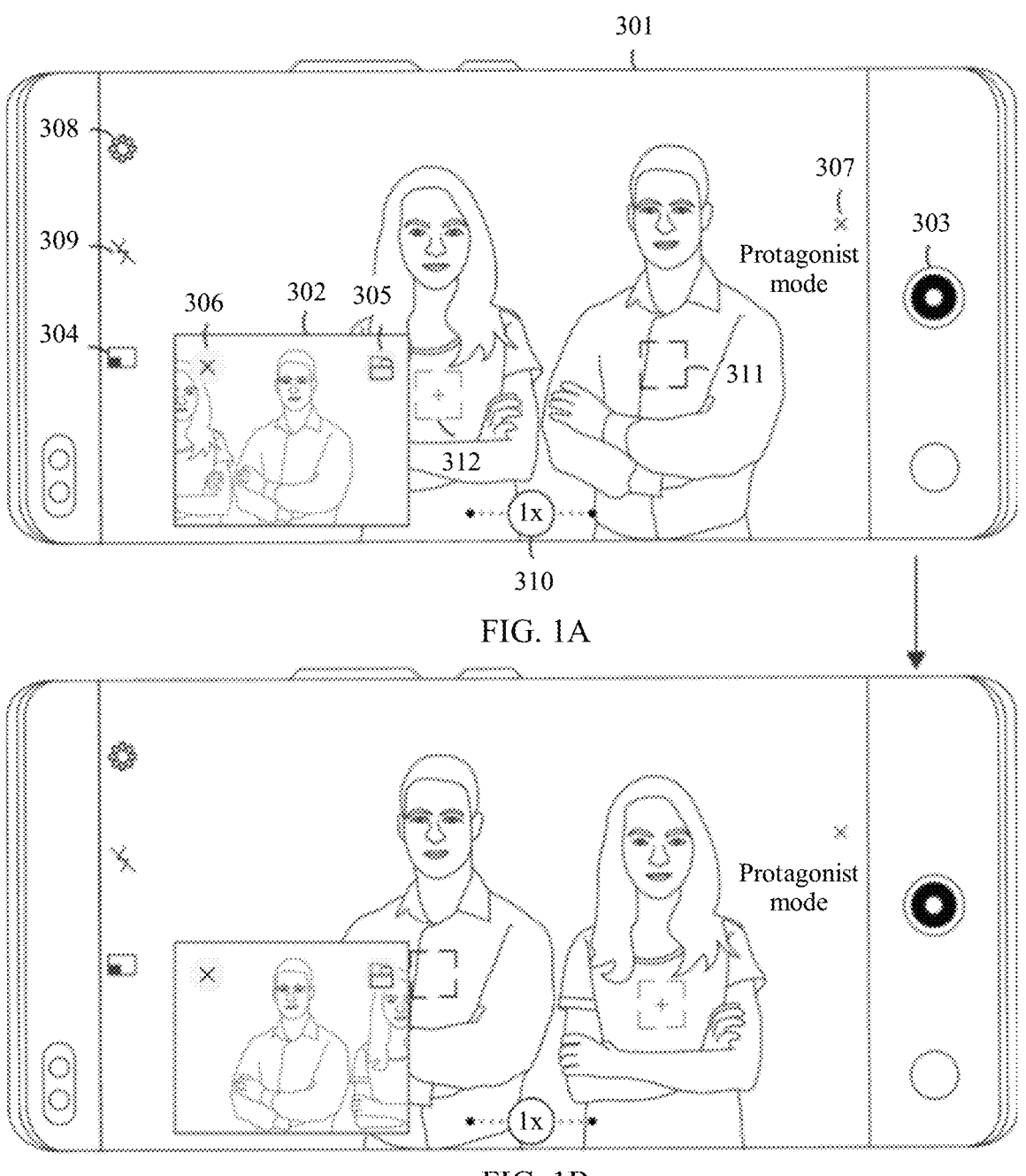
FIG. 1A to FIG. 1D are a schematic diagram of a shooting scene according to an embodiment of this application.

The following clearly describes the technical solutions in the embodiments of this application with reference to the accompanying drawings in the embodiments of this application. In descriptions of the embodiments of this application, unless otherwise specified, "/" indicates "or". For example, A/B may indicate A or B. The term "and/or" in this specification describes only an association relationship between associated objects, and represents that three relationships may exist. For example, A and/or B may represent the following three cases: Only A exists, both A and B exist, and only B exists. In addition, in the descriptions of the embodiments of this application, "a plurality of" means "two or more".

It should be understood that the terms "first", "second", and the like in the specification, claims, and accompanying drawings of this application are used to distinguish between different objects, and are not used to describe a specific sequence. In addition, the terms "include" and "have" and any variations thereof are intended to cover a non-exclusive inclusion. For example, a process, method, system, product, or device that includes a series of steps or units is not limited to a listed step or unit, but optionally further includes an unlisted step or unit, or optionally further includes another step or unit inherent to the process, method, product, or device.

An "embodiment" in this application means that a specific feature, structure, or characteristic described with reference to the embodiment may be included in at least one embodiment of this application. The term appearing at various positions in this specification does not necessarily refer to a same embodiment, or an independent or alternative embodiment mutually exclusive with another embodiment. A person skilled in the art explicitly and implicitly understands that the described embodiments in this application may be combined with another embodiment.

This application provides a shooting method. The shooting method may be applied to an electronic device disposed with a camera. According to the shooting method, in a shooting scene in which a plurality of shooting objects are in a same frame, the electronic device can perform focus tracking on one of the shooting objects, and perform targeted close-up recording on the shooting object, so as to separately generate an original video and a close-up video. In some embodiments of this application, the electronic device may shoot one original video and a plurality of close-up videos.

It may be understood that the original video is a video formed by an original image displayed in a large preview window. The close-up video is a video formed by a close-up image of a focus tracking target displayed in a small preview window.

It may be understood that a shooting subject mentioned in this application refers to a main shooting object when a user performs shooting by using the electronic device. A framing range is related to a camera parameter (for example, a field of view and a focal length) of the electronic device.

It may be understood that the electronic device may be specifically a mobile phone, a tablet computer, a wearable device, an in-vehicle device, an augmented reality (Augmented Reality, AR) device/a virtual reality (Virtual Reality, VR) device, a notebook computer, an ultra-mobile personal computer (Ultra-Mobile Personal Computer, UMPC), a netbook, a personal digital assistant (Personal Digital Assistant, PDA), a dedicated camera (for example, a digital single lens reflex or a cube camera), or the like. A specific type of the electronic device is not limited in the embodiments of this application.

A shooting scene provided in this application is described below in detail with reference to schematic diagrams of a group of user interfaces.

It may be understood that the terms "interface" and "user interface" in this specification, claims, and accompanying drawings of this application are medium interfaces that are used for interaction and information exchange between an application or an operating system and a user, and implement conversion between an internal form of information and a form that can be accepted by the user. The user interface is generally represented in a form of a graphical user interface (graphic user interface, GUI), and is a user interface that is related to a computer operation and that is displayed in a graphic manner. The graphical user interface may be an interface element such as an icon, a window, or a control that is displayed on a display screen of an electronic device. The control may include visible interface elements such as an icon, a button, a menu, a tab, a text box, a dialog box, a status bar, a navigation bar, and a Widget.

The following describes, with reference to FIG. 1A to FIG. 1D, a protagonist mode involved in an embodiment of this application.

For ease of describing the shooting method provided in the embodiments of this application, the following describes noun definitions in the embodiments of this application. The protagonist mode may be understood as a mode in which an additional human image tracking video can be generated when an electronic device records a video. A human image in the human image tracking video may be understood as a "protagonist" to which a user pays attention, and a manner of generating a video corresponding to the "protagonist" may be: clipping video content corresponding to the "protagonist" from a normally recorded video of the electronic device. It may be understood that the protagonist mode of the electronic device may provide a preview mode and a recording mode. In the preview mode, a preview interface may be displayed on a display screen of the electronic device. In the recording mode, a recording interface may be displayed on the display screen of the electronic device.

It should be noted that interfaces displayed by the electronic device in both the preview mode (before recording) and the recording mode (in a recording process) may be referred to as preview interfaces. For a picture displayed in the preview interface in the preview mode (before recording), a video is not to be generated and saved. For a picture displayed on the preview interface in the recording mode (during recording), a video can be generated and saved. For ease of distinguishing, in the following, the preview interface in the preview mode (before recording) is referred to as a preview interface. The preview interface in the recording mode (during recording) is referred to as a recording interface.

The preview interface may include a large window and a small window. The large window may be a window whose specification is equal to or slightly less than the display screen, the large window may display an image obtained by a camera, and an image displayed in the large window in the preview mode may be defined as a preview picture of the large window. The small window may be a window whose specification is less than that of the large window, and the small window may display an image of a focus tracking object selected by a user. The electronic device may select a focus tracking object based on a tracking identifier associated with the focus tracking object. An image displayed in the small window in the preview mode may be defined as a preview picture of the small window. It may be understood that, in the preview mode, the electronic device may display, based on the large window, the image obtained by the camera, and the small window displays an image of a focus tracking object. However, the electronic device may not generate a video, and may not save content displayed in the large window and the small window.

The recording interface may include a large window and a small window. The large window may be a window whose specification is equal to or slightly less than the display screen, the large window may display an image obtained by a camera, and an image displayed in the large window in the recording mode may be defined as a recording picture of the large window. The small window may be a window whose specification is less than that of the large window, the small window may display an image of a focus tracking object selected by a user, and an image displayed in the small window in the recording mode may be defined as a recording picture of the small window. It may be understood that, in the recording mode, the electronic device may not only display the recording picture of the large window and the recording picture of the small window, but also generate a large-window video and a small-window video that are recorded after the recording mode is started, and may save a video generated in the large window when large-window recording ends, and save a video generated in the small window when small-window recording ends. The embodiments of this application impose no limitations on naming of the preview mode and the recording mode.

It should be noted that the preview interface described in the embodiments of this application may be understood as a preview mode in which a camera application of the electronic device is in the protagonist mode. The recording interface may be understood as a recording mode in which the camera application of the electronic device is in the protagonist mode. Details are not further described later.

For example, a function of the protagonist mode may be set in the camera application (which may also be referred to as a camera or a camera APP). For example, in a preview scenario, the preview interface of the protagonist mode in the electronic device may be shown in FIG. 1A. The preview interface may include a large window 301, a small window 302, and a plurality of buttons. The buttons may include a start recording button 303, a first landscape and portrait switch button 304, a second landscape and portrait switch button 305, a small window close button 306, and an exit protagonist mode button 307. Optionally, the buttons may further include a video setting button 308, a flash button 309, a zoom button 310, and the like.

The electronic device may display a preview picture in the large window 301, and the preview picture may include a plurality of persons. When the electronic device detects that a person exists in the preview picture of the large window, the preview picture may display a tracking identifier associated with the person. For example, the tracking identifier may be a tracking box (for example, a tracking box 311 and a tracking box 312) displayed at a corresponding position of the person. For example, a male person in the preview picture may be corresponding to the tracking box 311, and a female person may be corresponding to the tracking box 312. The tracking box may prompt the user that a corresponding person may be set as a focus tracking object or may be switched to a focus tracking object. When the electronic device recognizes N persons, M (M≤N) tracking boxes may be displayed in the large window. The electronic device may set any person as a focus tracking object, so as to generate video content of the focus tracking object. The embodiments of this application impose no limitations on the "protagonist", where the "protagonist" may be a life entity such as a person or an animal, or may be a non-life entity such as a vehicle. It may be understood that any article that can be identified based on an algorithm model may be used as the "protagonist" in the embodiments of this application. In the embodiments of this application, the "protagonist" may be defined as a focus tracking object, and the focus tracking object may also be referred to as a protagonist object, a tracking target, a tracking object, a focus tracking target, or the like. In the embodiments of this application, a person is used as the "protagonist" as an example for description, but a concept of the "protagonist" is not limited in the embodiments of this application.

In some embodiments, the tracking identifier may alternatively be a tracking identifier in another form. For example, when the electronic device recognizes a plurality of focus trackable objects, the large window displays, near the focus trackable object, a tracking identifier corresponding to the focus trackable objects, where the tracking identifier may be a number, a letter, a graph, or the like. The user taps the tracking identifier, and the electronic device responds to the tap operation to select a focus tracking object. For another example, a plurality of focus trackable objects of the large window are marked with numbers, graphs, user images, or other tracking identifiers. The electronic device may arrange a plurality of tracking identifiers at an edge or another position of a large window display region, and the user may select a focus tracking object by tapping the tracking identifier in the large window. In the embodiments of this application, a tracking box is used as an example to describe a video recording method. However, a form of the tracking identifier is not limited in the embodiments of this application.

It should be noted that when recognizing two or more persons, the electronic device in the embodiments of this application may mark the person with a corresponding tracking box. When recognizing a single person, the electronic device may also mark the single person with a corresponding tracking box, or may not mark the single person with a tracking box, which is not limited herein.

Optionally, N persons displayed in the large window may be focus trackable objects, a selected "protagonist" is a focus tracking object, and a person that is not selected as the "protagonist" is another object. A tracking box of the focus tracking object (for example, the tracking box 311) may display a different style from a tracking box of the another object (for example, the tracking box 312). In this way, it is convenient for the user to distinguish between tracked persons.

In some embodiments, a shape, a color, a size and a position of the tracking box are adjustable. For example, a style of the tracking box 311 of the focus tracking object may be a dashed box. A style of the tracking box 312 of the another object may be a combination of a dashed box and "+". In addition to a different shape of the tracking box, the color of the tracking box may be set in the embodiments of this application, for example, a color of the tracking box 311 is different from a color of the tracking box 312. In this way, the focus tracking object and the another object can be intuitively distinguished. It may be understood that the tracking box may alternatively be in another display form, provided that the tracking box can be triggered by the user to implement tracking of a focus trackable object.

The tracking box may be marked at any position of the focus trackable object, and the embodiments of this application impose no specific limitations thereto. In a possible implementation, in order not to cause visual interference to preview of a focus trackable object in the large window, a tracking box may avoid a face of the focus trackable object, for example, the tracking box may be marked at a relatively centered position in the body of the focus trackable object. The electronic device may perform face recognition and human body recognition. When the electronic device recognizes a face, the electronic device may display a tracking box. The electronic device may determine a display position of the tracking box according to face recognition and human body recognition, and the tracking box is displayed at a centered position of the human body.

It should be noted that, in some embodiments, the following scenario may appear. The preview picture of the large window includes N persons, where there are M (M≤N) focus trackable objects marked with tracking boxes and N-M persons unidentified by the electronic device. In actual shooting, the electronic device may display a tracking box based on a face technology. When the electronic device cannot capture a face of a person (for example, a back view of a person), the electronic device does not mark the person with a tracking box. The embodiments of this application impose no limitations on a method for implementing display of a tracking box.

In a preview scenario, the small window 302 displays a preview picture of a focus tracking object. The preview picture of the small window may be a part of the preview picture of the large window. In a possible implementation, the preview picture of the small window is obtained by clipping the preview picture of the large window according to a specific proportion based on the focus tracking object. The electronic device may clip an image in the large window according to an algorithm, and the small window obtains a part of the image in the large window. In some embodiments, in a case of long clipping calculation time, the small window may display in real time clipped images of the first several frames of images displayed in real time in the large window. The embodiments of this application set no specific limitations on the picture displayed in the small window.

When a focus tracking object is switched, a person in the preview picture displayed in the small window 302 is correspondingly switched. For example, if the focus tracking object is switched from a male person to a female role, the preview picture displayed in the small window 302 also changes accordingly. A scenario in which the electronic device selects or switches the focus tracking object is described in detail in the following with reference to FIG. 2C. Details are not described herein.

In some embodiments, a specification, a position, a landscape and portrait display manner, and the like of the small window are adjustable. The user may adjust a style of the small window according to a recording habit. Later, a detailed description of style adjustment of the small window is provided with reference to FIG. 2D to FIG. 2J, and details are not described herein.

The preview interface further includes a plurality of buttons. The following describes functions of each button.

The start recording button 303 is configured to control the electronic device to start recording of the large window and recording of the small window.

The first landscape and portrait switch button 304 may be displayed in the large window, and is configured to adjust landscape and portrait display of the small window.

The second landscape and portrait switch button 305 may be displayed in the small window, and is also configured to adjust landscape and portrait display of the small window.

The small window close button 306 is used by the electronic device to close the small window.

The exit protagonist mode button 307 is used by the electronic device to exit the protagonist mode and enter a normal video mode.

Optionally, the buttons of the preview interface may further include:

the video setting button 308, configured to enable the electronic device to display a camera setting interface, in which the user adjusts a plurality of shooting parameters of the camera;

the flash button 309, configured to set a flash effect, where the flash button may be expanded into buttons of various flash functions, and the buttons may be used to control the flash to be forcibly turned on, forcibly turned off, turned on during shooting, and adaptively turned on according to an environment; and the zoom button 310 is configured to adjust zoom of the preview interface. The zoom button may provide zoom functions such as wide angle, 1×, and 2×. The zoom button may be configured to adjust a size of a preview scenario in the large window, and a preview scenario in the small window may be scaled in an equal proportion following scaling of the large window.

It may be understood that, in the preview scenario, the preview interface may include the large window and the small window. The preview picture of the large window includes a focus trackable object. When the electronic device selects the focus tracking object, the preview picture of the small window may display the focus tracking object at the center. In some scenarios, the focus tracking object may be in a moving state. When the focus tracking object moves but does not leave a lens, the preview picture of the small window may continuously display the focus tracking object at the center. For example, trackable objects in the preview interface include a male person and a female person. In response to a tap operation performed by the user on a tracking box of the male person, the electronic device selects the male person as a focus tracking object, and enters the interface shown in FIG. TA. In the interface in FIG. TA, a male person is displayed at the center of the preview picture of the small window, and the male person is located on the right side of a female person. When the male person moves, the electronic device may continuously perform focus tracking on the male person, and display the male person in the small window at the center. When the male person walks to the left side of the female person, an interface of the electronic device may be shown in FIG. 1B. In the interface in FIG. 1B, the male person is still displayed at the center of the preview picture of the small window, and the male person is located on the left side of the female person.

Figures 1C, 1D:
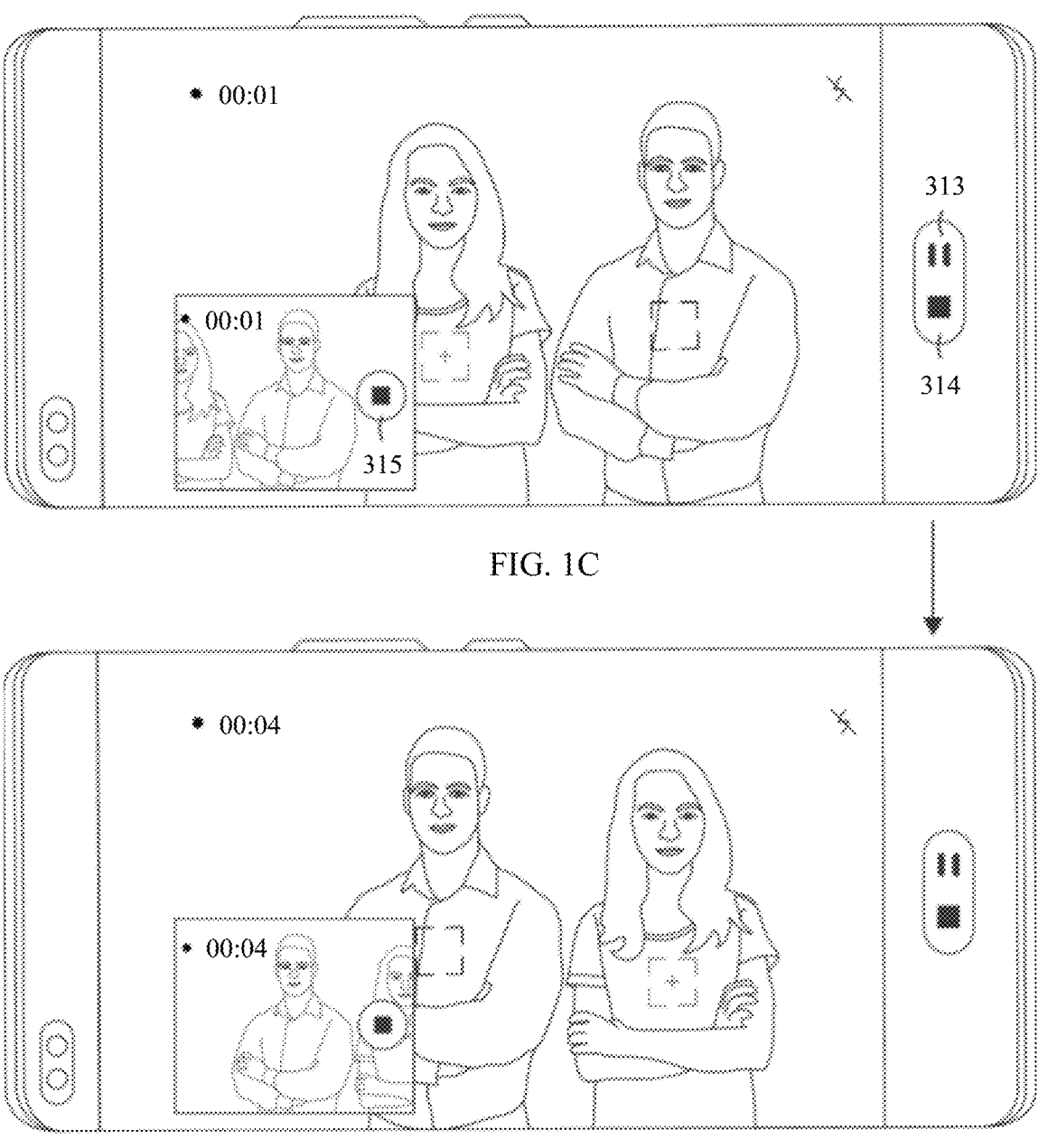

For example, in a recording scenario, the recording interface of the protagonist mode in the electronic device may be shown in FIG. 1C. The recording interface may include a large window 301, a small window 302, a plurality of buttons, and recording time. The buttons may include a pause recording button 313, an end recording button 314, and an end small-window recording button 315.

Different from the preview scenario, in the recording scenario, the small window 302 displays a recording picture of a focus tracking object. In a recording process, the electronic device may additionally generate, based on a video recorded in the large window, a video recorded in the small window. Similar to a preview process, a recording picture of the small window may be a part of a recording picture of the large window. In a possible implementation, the recording picture of the small window is obtained by clipping the recording picture of the large window according to a specific proportion based on the focus tracking object. The two videos are saved independently in the electronic device. In this way, a video corresponding to the focus tracking object can be obtained without performing subsequent manual clipping on the entire video, which is easy and convenient to operate, thereby improving user experience.

The recording interface may include a plurality of buttons. The following describes functions of the buttons.

The pause recording button 313 is configured to pause video recording. Recording of the large window and recording of the small window may be paused at the same time. When the recording interface does not include the small window, the pause recording button 313 may pause recording of the large window only.

The end recording button 314 is configured to end video recording. Recording of the large window and recording of the small window may end at the same time. When the recording interface does not include the small window, the end recording button 314 may end recording of the large window only.

The end small-window recording button 315 is configured to end video recording of the small window. The electronic device may end recording of the small window based on the end small-window recording button 315, and recording of the large window is not affected.

The recording time is used to identify recording duration of a current video. Recording duration of the large window may be the same as or different from that of the small window.

It may be understood that, in the recording scenario, the recording interface may include the large window and the small window. The recording picture of the large window includes a focus trackable object. When the electronic device selects the focus tracking object, the recording picture of the small window may display the focus tracking object at the center. In some scenarios, the focus tracking object may be in a moving state. When the focus tracking object moves but does not leave the lens, a focus moves along with the focus tracking object, and the recording picture of the small window may continuously display the focus tracking object at the center. For example, trackable objects in the recording interface include a male person and a female person. In response to a tap operation performed by the user on a tracking box of the male person, the electronic device selects the male person as a focus tracking object, and enters the interface shown in FIG. 1C. In the interface in FIG. 1C, the male person is displayed at the center of the recording picture of the small window, and the male person is located on the right side of the female person. In this case, the focus is located in a face region of the male person, and is located in a middle-right part of the picture. When the male person moves, the electronic device may continuously perform focus tracking on and record the male person, and display the male person in the small window at the center. When the male person walks to the left side of the female person, an interface of the electronic device may be shown in FIG. 1B. In the interface in FIG. 1B, the male person is still displayed at the center of the recording picture of the small window, and the male person is located on the left side of the female person. In this case, the focus is located in the face region of the male person, and is located in the middle-left part of the picture.

In the embodiments of this application, a shooting mode for generating an additional focus tracking video based on a focus tracking object is defined as a protagonist mode, and the shooting mode may also be referred to as a focus tracking mode, which is not limited in the embodiments of this application.

I. Enter a Protagonist Mode (FIG. 2A(1) to FIG. 2A(4) and FIG. 2B(1) to FIG. 2B(4))

When video recording is performed in the protagonist mode, a plurality of manners of entering the protagonist mode are available.

For example, the following describes a method for entering the protagonist mode according to an embodiment of this application with reference to FIG. 2A(1) to FIG. 2A(4) and FIG. 2B(1) to FIG. 2B(4).

In a possible implementation, an electronic device is located on a main interface shown in FIG. 2A(1). When detecting an operation of enabling a camera application 401 by a user, the electronic device may enter a shooting preview interface shown in FIG. 2A(2). The shooting preview interface may include a preview picture and shooting mode selection buttons. The preview picture may display, in real time, a scene captured by a camera of the electronic device. The shooting mode selection buttons include but are not limited to a "portrait" button, a "photo" button, a "video" button 402, a "professional" button, and a "more" button 403.

When the electronic device detects an operation of tapping the "video" button 402 by the user, the electronic device switches from the shooting preview interface to a video preview interface shown in FIG. 2A(3). The video preview interface may include but is not limited to: a protagonist mode button 404 that is used to receive triggering to enter the protagonist mode, a recording setting button that is used to receive triggering to enter settings, a filter button that is used to receive triggering to enable a filter effect, and a flash button that is used to set a flash effect.

The electronic device may enter the protagonist mode based on the protagonist mode button 404 in the video preview interface. For example, the user taps the protagonist mode button 404 in the interface, and the electronic device responds to the tap operation to enter a preview interface shown in FIG. 2A(4). In the preview interface, there may be a plurality of shooting objects in a large window. The electronic device may recognize the plurality of shooting objects based on image content of the large window. The plurality of shooting objects may be used as focus trackable objects. The preview interface of the electronic device may mark each focus trackable object with a tracking box.

In another possible implementation, the electronic device is located on a main interface shown in FIG. 2B(1). When detecting an operation of enabling the camera application 401 by the user, the electronic device may enter a shooting preview interface shown in FIG. 2B(2). The shooting interface may include a plurality of buttons, for example, a "portrait" button, a "photo" button, a "video" button 402, a "professional" button, and a "more" button 403. When the electronic device detects an operation of tapping the "more" button 403 by the user, the electronic device enters an interface shown in FIG. 2B(3). The interface in FIG. 2B(3) may expand to display a plurality of function buttons of the "more" button. For example, the "more" button may include but is not limited to a "PRO" button, a "panorama" button, a "high-dynamic-range (high-dynamic-range, HDR)" button, a "time-lapse" button, a "watermarks" button, a "document correction" button, a "high resolution" button, a "story" button, and a protagonist mode button 405. Alternatively, it may be understood that the protagonist mode may be hidden in the "more" button.

When the user taps the protagonist mode button 405 in an interface shown in FIG. 2B(3), the electronic device may respond to the tap operation to enter a preview interface shown in FIG. 2B(4). For related content of the preview interface shown in FIG. 2B(4), refer to the description of the preview interface shown in FIG. 2A(4). Details are not described herein again.

It may be understood that, in the embodiments of this application, FIG. 2A(1) to FIG. 2A(4) and FIG. 2B(1) to FIG. 2B(4) show two methods for entering the protagonist mode of the electronic device. However, the embodiments of this application are not limited to the foregoing two methods for entering the protagonist mode. In addition to the icon forms shown in FIG. 2A(3) and FIG. 2B(3), the protagonist mode button may be in another form. The protagonist mode button may alternatively be disposed in another hidden menu or another window display position, which is not limited in the embodiments of this application.

After the electronic device enters the protagonist mode, video content corresponding to a "protagonist" selected by the user can be additionally generated for display in a small window while recording is performed in a large window. It may be understood that, when the electronic device enters the protagonist mode to perform recording, the electronic device may be in a landscape state or may be in a portrait state. In the landscape state or the portrait state, a principle of implementing the protagonist mode by the electronic device is similar. To facilitate description of the video recording method in the embodiments of this application, the following embodiments use landscape recording of the electronic device as an example to describe a plurality of application scenarios of the protagonist mode.

In the embodiments of this application, a scenario in a preview mode in the protagonist mode is described in detail with reference to FIG. 2C to FIG. 2P(4), and in the embodiments of this application, a scenario in a recording mode in the protagonist mode is described in detail with reference to FIG. 3A to FIG. 3L. First, the scenario in the preview mode is described.

II. Scenario in the Preview Mode in the Protagonist Mode (FIG. 2C to FIG. 2P(4))

1. Switch a Focus Tracking Object in the Preview Mode in the Protagonist Mode (FIG. 2C)

Figure 2C:
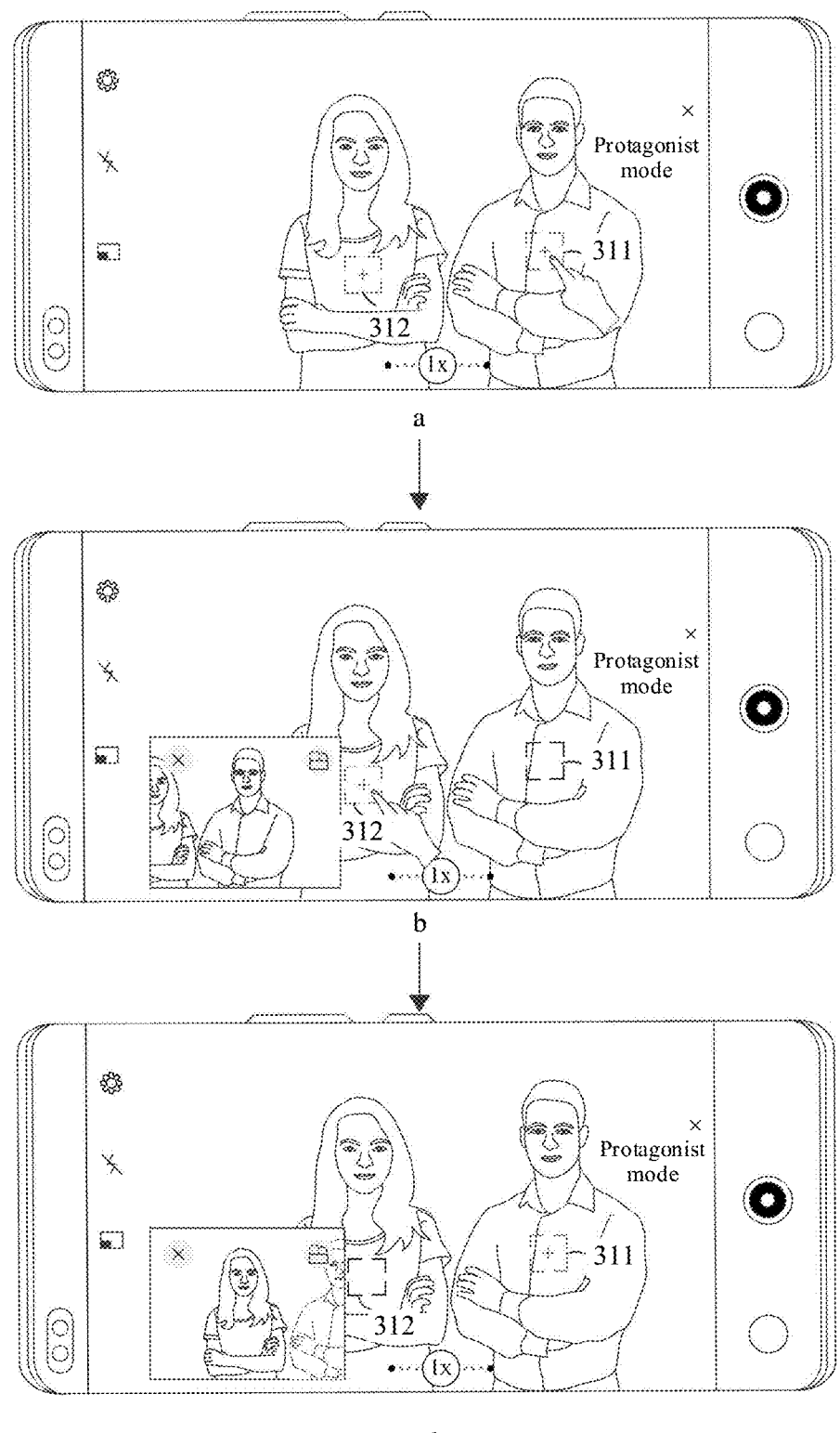
FIG. 2A(1) to FIG. 2P(4) are schematic diagrams of a group of user interfaces according to an embodiment of this application.

For example, FIG. 2C is a schematic diagram of an interface in which a focus tracking object is selected in the preview mode of the protagonist mode. As shown in FIG. 2C, the electronic device enters the preview mode of the protagonist mode. As shown in a in FIG. 2C, the electronic device may display a preview interface of the protagonist mode. The preview interface includes a plurality of focus trackable objects, and each focus trackable object may be correspondingly marked with a tracking box (for example, a male person is marked with a tracking box 311, and a female person is marked with a tracking box 312).

The electronic device may determine, according to a tap operation performed by the user on the tracking box, a focus tracking object selected by the user. For example, the user wants to preview a focus tracking picture of the male person in a small window of the electronic device, and may tap the tracking box 311 corresponding to the male person. Correspondingly, the electronic device may respond to the tap operation to enter an interface shown in b in FIG. 2C.

As shown in the interface shown in b in FIG. 2C, when the male person is selected as a focus tracking object, a small window is paused in a large window of the preview interface, and the small window presents a picture corresponding to a position of the focus tracking object in the large window. In the small window, the focus tracking object may be at a centered position of the small window, which represents a "protagonist" status of the focus tracking object. Optionally, after the tracking box of the focus tracking object is triggered, a color of the tracking box corresponding to the focus tracking object may change, for example, become lighter, darker, or change to another color, and a shape of the tracking box may also change. For example, the tracking box 311 of the male person is a dashed box, and the tracking box 311 of the male person is a dashed box, and the tracking box 312 of the female person is a combination of a dashed box and "+". In the embodiments of this application, a tracking box style of a focus tracking object and that of another object may be any combination of different colors, different sizes, and different shapes, so that the user can distinguish between the focus tracking object and the another object in the large window. Optionally, after the tracking box of the focus tracking object is triggered, the tracking box corresponding to the focus tracking object may disappear, so that the user does not repeatedly select the selected focus tracking object.

It may be understood that, in the preview mode of the protagonist mode, the user may automatically change the focus tracking object after selecting the focus tracking object. As shown in an interface in b in FIG. 2C, when receiving an operation of tapping the tracking box 312 of the female person by the user, the electronic device enters an interface shown in c in FIG. 2C. In this case, the focus tracking object in the small window is switched from the male person to the female person. A status of a tracking box of a person changes, for example, a color and a shape of the tracking box 312 of the female person change, and the tracking box 311 of the male person resumes a style when the tracking box is not selected. For a change to the tracking box style, references may be made to the related description in the interface shown in b in FIG. 2C, and details are not described herein again.

Optionally, the electronic device switches the focus tracking object in the preview mode, and an object displayed in the preview picture of the small window changes from an original focus tracking object to a new focus tracking object. To make a picture smoother in a switching process, an embodiment of this application further provides a dynamic special effect of switching a focus tracking object. For example, the following uses an example in which a male person is an original focus tracking object and a female person is a new focus tracking object to describe a design of a dynamic special effect.

In a possible implementation, a large window of a preview interface includes a male person and a female person, and a focus tracking object displayed in the small window is a male person. When the electronic device detects a tap operation on a tracking box for a female person, a preview picture of a small window may switch from focus tracking display of the male person to panoramic display, and then switch from the panoramic display to focus tracking display of the female person. For example, the male person is originally displayed at the center of the small window. After the user taps the tracking box of the female person, a clipping ratio of the preview picture of the small window to the preview picture of the large window increases, and the preview picture of the small window may include more content in the preview picture of the large window, which may be represented by gradually zooming out the male person and a background thereof in the small window and the like, until a panorama of the female person and the male person can be displayed in the small window at the same time. The small window then zooms in and displays the female person in the panorama at the center. Optionally, the panorama may be a preview picture of the large window that is scaled down equally, or may be an image that is in the preview picture of the large window and that is obtained by clipping a common region of the male person and the female person.

In another possible implementation, a large window of a preview interface includes a male person and a female person, and a focus tracking object displayed in the small window is a male person. When the electronic device detects a tap operation on the tracking box for the female person, a focus tracking point in the preview picture of the small window gradually changes from the male person to the female person. For example, the male person is originally displayed at the center of the small window. After the user taps the tracking box of the female person, the clipping ratio of the preview picture of the small window to the preview picture of the large window remains unchanged, but the preview picture of the small window is clipped in a direction close to the female person according to the original clipping ratio. For example, the female person is located on the left side of the male person. In a process in which the electronic device switches a focus tracking object, the male person in the small window and the background thereof are translated to the right, until the female role is displayed in the small window at the center.

In this way, in the process in which the electronic device switches the focus tracking object, a picture in which the original focus tracking object is switched to the new focus tracking object in the small window is smoother, thereby improving video recording experience of the user.

2. Adjust a Style of the Small Window in the Preview Mode in the Protagonist Mode (FIG. 2D to FIG. 2J)

Figure 2D:
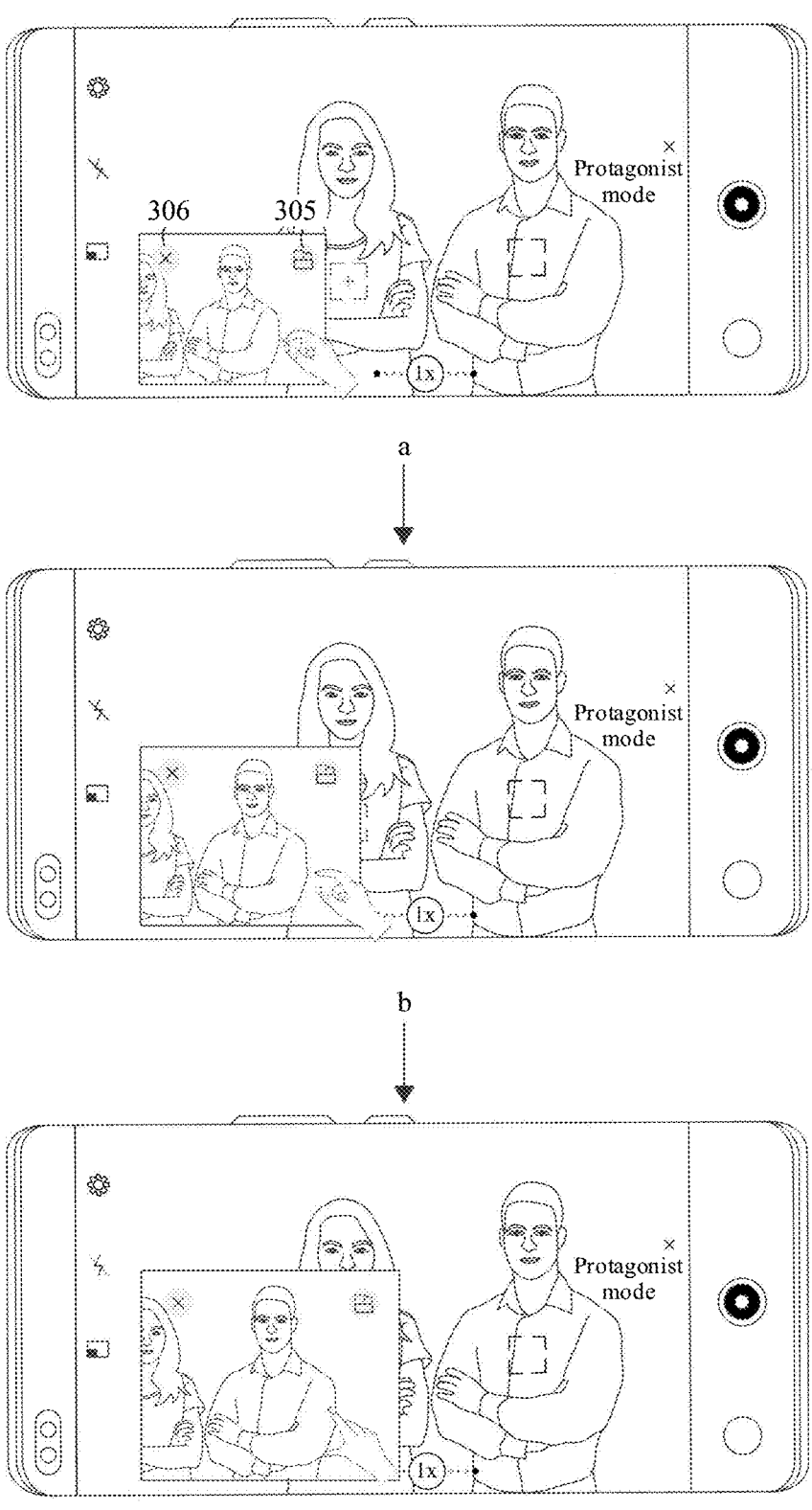
Figure 2E:
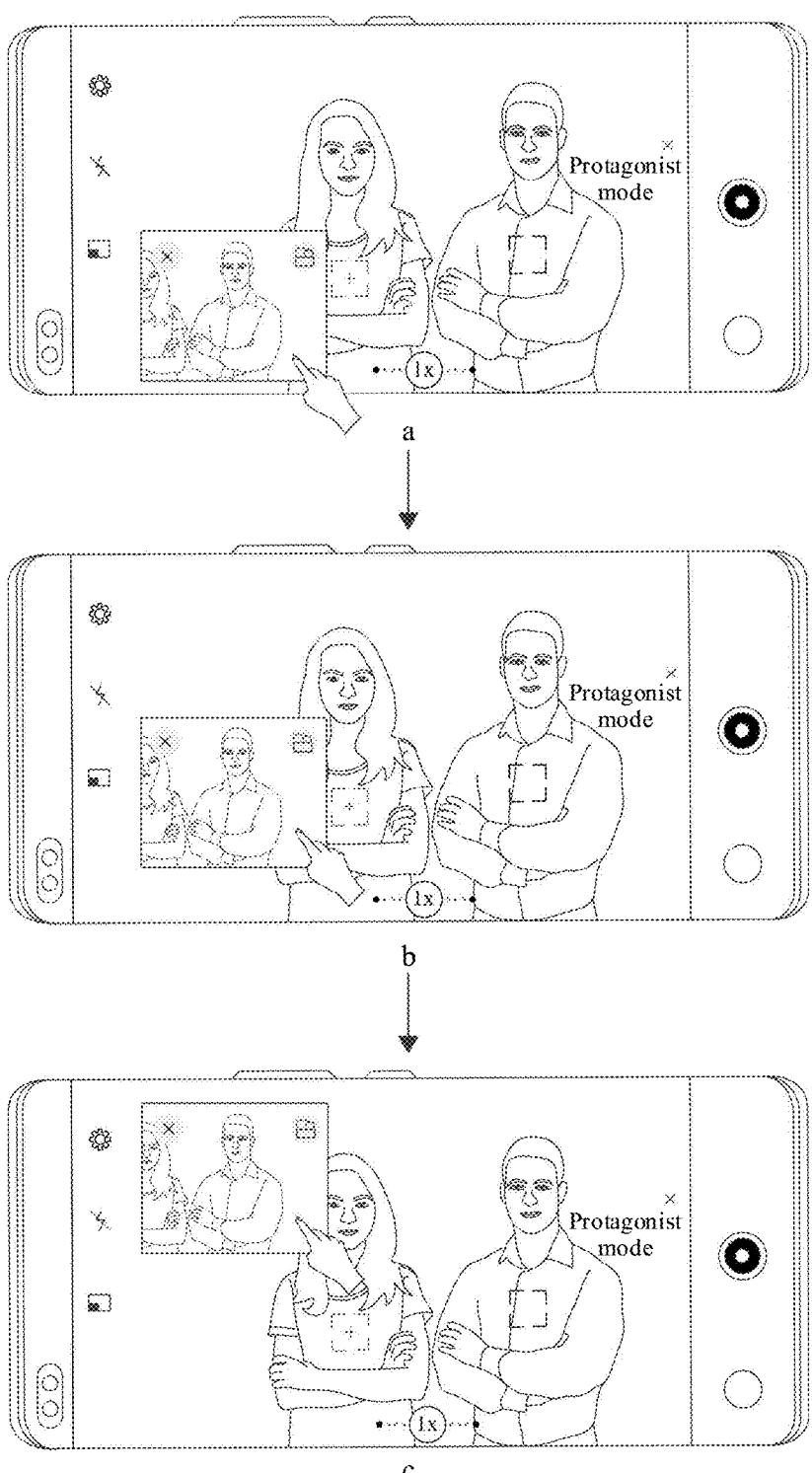

(1) Adjust a Position of the Small Window (FIG. 2D to FIG. 2F(1) to FIG. 2F(4))

In the preview mode of the protagonist mode, after the small window appears in the preview interface of the electronic device, the user may further adjust the style of the small window according to a requirement. The following describes an adjustment method for the small window with reference to FIG. 2D, FIG. 2E, and FIG. 2F(1) to FIG. 2F(4).

For example, FIG. 2D is a schematic diagram of an interface for adjusting a specification of a small window according to an embodiment of this application. As shown in a in FIG. 2D, the small window may include function regions of a small window close button 306 and a second landscape and portrait switch button 305, and a non-function region of a preview picture that displays a focus tracking object. The user can press any position in the non-function region of the small window by using two fingers and adjust a distance between the two fingers. When detecting the press operation, the electronic device enters an interface shown in b in FIG. 2D. The user can adjust the distance between the two fingers to control a size of the small window. When detecting that the distance between the two fingers changes, the electronic device may correspondingly adjust the specification of the small window according to a distance change amount. For example, when the distance between the two fingers is reduced, the small window becomes smaller, and when the distance between the two fingers is increased, the small window becomes larger. After the user releases the two fingers, the size of the small window is remained at a size when the fingers are released. A preview interface is shown in c in FIG. 2D.

It should be noted that, in some embodiments, in the preview mode in the protagonist mode, when the electronic device adjusts the specification of the small window, the preview picture of the small window may be zoomed in and out according to a specific proportion relative to an original preview picture of the small window. For example, in a process of zooming in the small window, content in the preview picture displayed in the small window remains unchanged, but only the original preview picture is zoomed in according to a specific proportion according to an adjusted distance between two fingers, and a person and a background in the original preview picture are correspondingly zoomed in to obtain a zoomed-in preview picture, as shown in c in FIG. 2D.

In some embodiments, when the electronic device adjusts the specification of the small window, the preview picture of the small window is zoomed in and out relative to the preview picture of the large window. For example, in the process of zooming in the small window, content in the preview picture displayed in the small window increases. The electronic device may add content in the preview picture of the small window according to the adjusted distance between the two fingers. For example, the electronic device clips more content in the preview interface of the large window for preview in the small window, which is represented as that a size of a person in the preview picture of the small window is the same as a size of a person in the original preview picture, but a background in the preview picture increases.

The specification of the small window in the embodiments of this application may be adjusted in a customized manner. The user may adjust the specification of the small window to an appropriate size, so that the user can more clearly view a small window preview picture of a focus tracking object, thereby improving recording experience of the user.

It may be understood that because the specification of the small window is relatively small, a contact area of fingers is excessively large during a double-finger operation, which may cause a button in the small window to be triggered incorrectly. Optionally, an embodiment of this application provides a method for preventing a button from being triggered incorrectly in a small window adjustment process. When the electronic device detects that a tap or long press operation exists in the non-function region of the small window, the small window close button in the small window and the second landscape and portrait switch button are hidden. When the electronic device detects that a touch operation does not exist in the small window, the hidden buttons resume display.

In the preview mode of the protagonist mode, to improve recording experience of the user, the electronic device further provides a function of adjusting a display position of the small window. For example, FIG. 2E shows a method for adjusting a display position of a small window. As shown in FIG. 2E, the display position of the small window in an interface shown in a in FIG. 2E is located in a lower left part of the large window. When detecting an operation that the user taps and drags the small window, the electronic device enters an interface shown in b in FIG. 2E. In the interface b in FIG. 2E, the display position of the small window may follow a finger of the user. For example, when the user long presses the small window and drags it upward, the small window moves upward accordingly. After dragging the small window to a preset position, the user releases the finger. The electronic device detects a lifting operation of the user and stops moving the small window, and the small window stays at a position at which the finger performs the lifting operation. The electronic device enters an interface shown in c in FIG. 2E. In the interface c in FIG. 2E, the small window is moved to the upper left.

It should be noted that, in a possible implementation, after the display position of the small window is adjusted, with movement of a person in the lens of the electronic device or movement of the lens of the electronic device, the small window may shield a human image or a face in the preview picture of the large window, which affects preview experience of the user. In the embodiments of this application, automatic adjustment or default adjustment may be performed on the display position of the small window. For example, the electronic device may detect a display position of the face in the large window and the display position of the small window. When the electronic device detects that the small window overlaps with a region in which the face is located, the electronic device may automatically adjust the display position of the small window until there is no overlapping region in the two regions. Alternatively, the electronic device may detect the position of the face and a position of a rectangular border of the small window. When the electronic device detects that a distance between the border and the face region is less than a threshold, the electronic device stops moving the small window in a direction toward the face by default, so that the small window cannot be moved to a region displaying the face.

In another possible implementation, after the display position of the small window is adjusted, a part of the small window may exceed an edge of the large window, and the user cannot preview a complete small window, which affects preview experience of the user. In the embodiments of this application, automatic adjustment or default adjustment may be performed on the display position of the small window. For example, the electronic device may detect whether the small window is completely displayed on the display screen. If a part of the small window cannot be completely displayed, the electronic device automatically moves the small window in a reverse direction of a previously adjusted display position of the small window until the small window is completely displayed. The electronic device may alternatively automatically adjust the display position of the small window according to another principle, which is not limited in the embodiments of this application. Alternatively, the electronic device may detect a boundary line position of a rectangular border of the large window and a boundary line position of a rectangular border of the small window. When any boundary lines of the two rectangular borders overlap, the electronic device stops moving the small window by default, so that the small window cannot be moved out of the edge of the large window.

Optionally, in the preview mode of the protagonist mode, in a process in which the electronic device adjusts the position of the small window, the electronic device may also set to hide the button in the small window to prevent the button from being triggered incorrectly. Details are not described herein.

In the embodiments of this application, the display position of the small window may be adjusted in a customized manner, so that the user can adjust the position of the small window in real time, so as to reduce shielding of the preview picture of the large window by the small window, and improve recording experience of the user.

An embodiment of this application provides a method for adjusting the small window by using a gesture, and the method can flexibly and quickly adjust the style of the small window. The embodiments of this application are not limited to the foregoing method. The electronic device may alternatively adjust the small window in another manner. For example, the electronic device may adjust the specification of the small window by using a button with a magnification increase/decrease function. The electronic device may set a small window adjustment menu and adjust the specification of the small window by manually entering parameters such as a length/a width. The electronic device may further adjust the position of the small window upward, downward, left, or right by setting a movement orientation button. The embodiments of this application impose no limitations on a method for implementing adjustment of the small window.

In a possible implementation, the small window in the preview mode in the protagonist mode in the embodiments of this application may further have a memory mechanism. With reference to FIG. 2F(1) to FIG. 2F(4), the following describes the memory mechanism in the protagonist mode.

For example, the protagonist mode may provide a function of adjusting the display position of the small window, and the user may move the position of the small window according to a shooting habit of the user. As shown in FIG. 2F(1), the small window is adjusted to an upper left position of the preview interface. When the electronic device detects an operation that the user taps the small window close button 306, the electronic device enters an interface shown in FIG. 2F(2). In the interface in FIG. 2F(2), the small window is closed. There is no selected focus tracking object in the picture of the large window, and the tracking box 311 resumes a style when the tracking box is not selected. When receiving an operation of tapping the tracking box 311 by the user, the electronic device enters an interface shown in FIG. 2F(3). In the interface in FIG. 2F(3), the small window is re-opened. In this case, the style of the small window is the same as the style of the small window in FIG. 2F(1). For example, in the interface in FIG. 2F(1) and the interface in FIG. 2F(3), the sizes, the positions, and landscape and portrait display of the small windows are the same.

In the embodiments of this application, a time limit of the memory mechanism may be further set. When duration in which the electronic device does not display the small window is within the time limit, or duration in which the electronic device does not use a video recording function is within the time limit, if the electronic device triggers display of the small window again, the style of the small window continues to use the style of the small window before previous closing. When the duration in which the electronic device does not display the small window exceeds the time limit, or the duration in which the electronic device does not use the video recording function exceeds the time limit, if the electronic device triggers the small window again, the small window resumes a default style.

In the preview mode of the protagonist mode, the default style of the small window may be a style of the small window when the protagonist mode is entered for the first time and the small window is opened on a current day, or may be a system default style. The time limit may be set to 15 minutes (min). For example, the small window in the interface in FIG. 2F(2) is closed. After 15 minutes, the user taps the tracking box 311 of the male person, and the electronic device enters the interface shown in FIG. 2F(4). A style of the small window of the interface in FIG. 2F(4) may be the default style, for example, the large window is previewed in a landscape manner, the small window is previewed in a portrait manner, and the small window appears in the lower left part of the preview interface.

It may be understood that the default style of the small window may be shown in an interface in FIG. 2F(4), and a preview direction of the large window is inconsistent with a preview direction of the small window. For example, when the large window is previewed in a landscape manner, the small window is previewed in a portrait manner. When the large window is previewed in a portrait manner, the small window is previewed in a landscape manner. In another default style of the small window, the preview direction of the large window is consistent with the preview direction of the small window. For example, when the large window is previewed in a landscape manner, the small window is also previewed in a landscape manner. When the large window is previewed in a portrait manner, the small window is also previewed in a portrait manner. The embodiments of this application impose no limitations on the default style of the small window.

The embodiments of this application provide the memory mechanism of the small window in the preview mode in the protagonist mode. The small window is re-opened in a specific time limit, and the style of the small window may use a style of the small window adjusted by the user last time. In addition, when the small window is incorrectly closed, the electronic device may automatically adjust the small window to a style before the small window is incorrectly closed, so as to reduce time for adjusting the style of the small window by the user, and improve recording experience of the user.

In the embodiments of this application, the electronic device may separately set the memory mechanism of the small window, so that when the small window is opened for a $K^{th}$ time within a period of time, the style of the small window is consistent with the style of the small window in a $(K-1)^{th}$ time. In addition, in the embodiments of this application, the electronic device may further establish a binding relationship between the style of the small window and the focus tracking object.

For example, in some embodiments, the electronic device may set the memory mechanism based on a face recognition technology. The electronic device selects a focus tracking object and adjusts the style of the small window. The electronic device may establish a binding relationship between a face feature of the focus tracking object and adjustment data of the small window, and save the data in the electronic device. When the electronic device re-recognizes the focus tracking object, the electronic device automatically invokes the adjustment data bound to the focus tracking object. The style of the current small window may be consistent with the style of the small window when the focus tracking object is selected last time.

In some embodiments, when recognizing the focus tracking object for the $K^{th}$ time, the electronic device adjusts the style of the small window, and the electronic device may save adjustment data in the $K^{th}$ time and establish a binding relationship between the new adjustment data and the focus tracking object. Optionally, the adjustment data in the K time may replace adjustment data in the $(K-1)^{th}$ time, and the electronic device reserves only the most recent time of adjustment data corresponding to the focus tracking object. Optionally, the electronic device may save the adjustment data in the $K^{th}$ time and establish a new binding relationship between the new adjustment data and the focus tracking object, and the electronic device may reserve the binding relationship established according to the adjustment data in the $(K-1)^{th}$ time. When the electronic device selects the focus tracking object for a $(K+1)^{th}$ time, the electronic device may provide the adjustment data of the small window in the $K^{th}$ time and the $(K-1)^{th}$ time for the user to select.

Optionally, when the electronic device selects the focus tracking object but does not adjust the style of the small window, the electronic device may store data of the face feature of the focus tracking object and the default style of the small window, and establish a binding relationship. When the electronic device re-recognizes the focus tracking object, the small window may display the default style.

The embodiments of this application provide a memory mechanism of the focus tracking object and the small window in the preview mode in the protagonist mode. When the electronic device recognizes a once selected focus tracking object, the electronic device may automatically invoke, according to the binding relationship, adjustment data of the small window last time when the focus tracking object is selected, so that the style of the small window is consistent with the style of the small window last time when the focus tracking object is selected, thereby reducing adjustment time of the small window and improving recording experience of the user.

(2) Landscape and Portrait Switch for the Small Window (FIG. 2G to FIG. 2J)

To meet diversified requirements of the user, in the preview mode in the protagonist mode, the embodiments of this application may provide landscape preview and portrait preview of the small window, and may further support switching between landscape preview and portrait preview of the small window. The following describes a scenario in which the electronic device switches between landscape preview and portrait preview of the small window with reference to FIG. 2G, FIG. 2H, and FIG. 2I.

In a possible implementation, landscape preview and portrait preview of the large window are related to the display screen of the electronic device. When the electronic device is placed horizontally, the large window may display a picture of landscape preview. When the electronic device is placed vertically, the large window may display a picture of portrait preview. Landscape preview and portrait preview of the small window may be controlled by a landscape and portrait switch button, where the landscape and portrait switch button may be the first landscape and portrait switch button 304 and/or the second landscape and portrait switch button 305. When the electronic device detects an operation of tapping the landscape and portrait switch button, the small window may be switched from landscape preview to portrait preview, or may be switched from portrait preview to landscape preview.

In another possible implementation, landscape preview and portrait preview of the large window and landscape preview and portrait preview of the small window may be set in association. When landscape preview and portrait preview of the large window are switched, landscape preview and portrait preview of the small window also change. For example, both the large window and the small window are in landscape preview, and when the large window is switched to portrait preview, the small window is also switched to portrait preview. The following uses an example in which landscape preview of the small window is switched to portrait preview, and with reference to the foregoing possible implementation, three methods for switching landscape preview and portrait preview of the small window are described. An embodiment of this application may further provide a method for switching portrait preview of the small window to landscape preview. Methods and principles of the two are similar, and details are not described herein again.

It should be noted that an icon of the second landscape and portrait switch button 305 may have two styles, and the icon of the second landscape and portrait switch button 305 may be a style in a case of landscape preview. As shown in an interface a in FIG. 2G, the icon is represented in a form of a horizontal frame pointing to a vertical frame. It may be understood that the small window is currently in landscape preview. After the second landscape and portrait switch button 305 is tapped, the small window may be switched from landscape preview to portrait preview. The icon of the second landscape and portrait switch button 305 may further be a style in a case of portrait preview. As shown in an interface c in FIG. 2G, the icon of the second landscape and portrait switch button 305 is represented in a form of a vertical frame pointing to a horizontal frame. It may be understood that the small window is currently in portrait preview. After the second landscape and portrait switch button 305 is tapped, the small window may be switched from portrait preview to landscape preview. In this application, the style of the icon of the second landscape and portrait switch button is not limited.

Figure 2G:
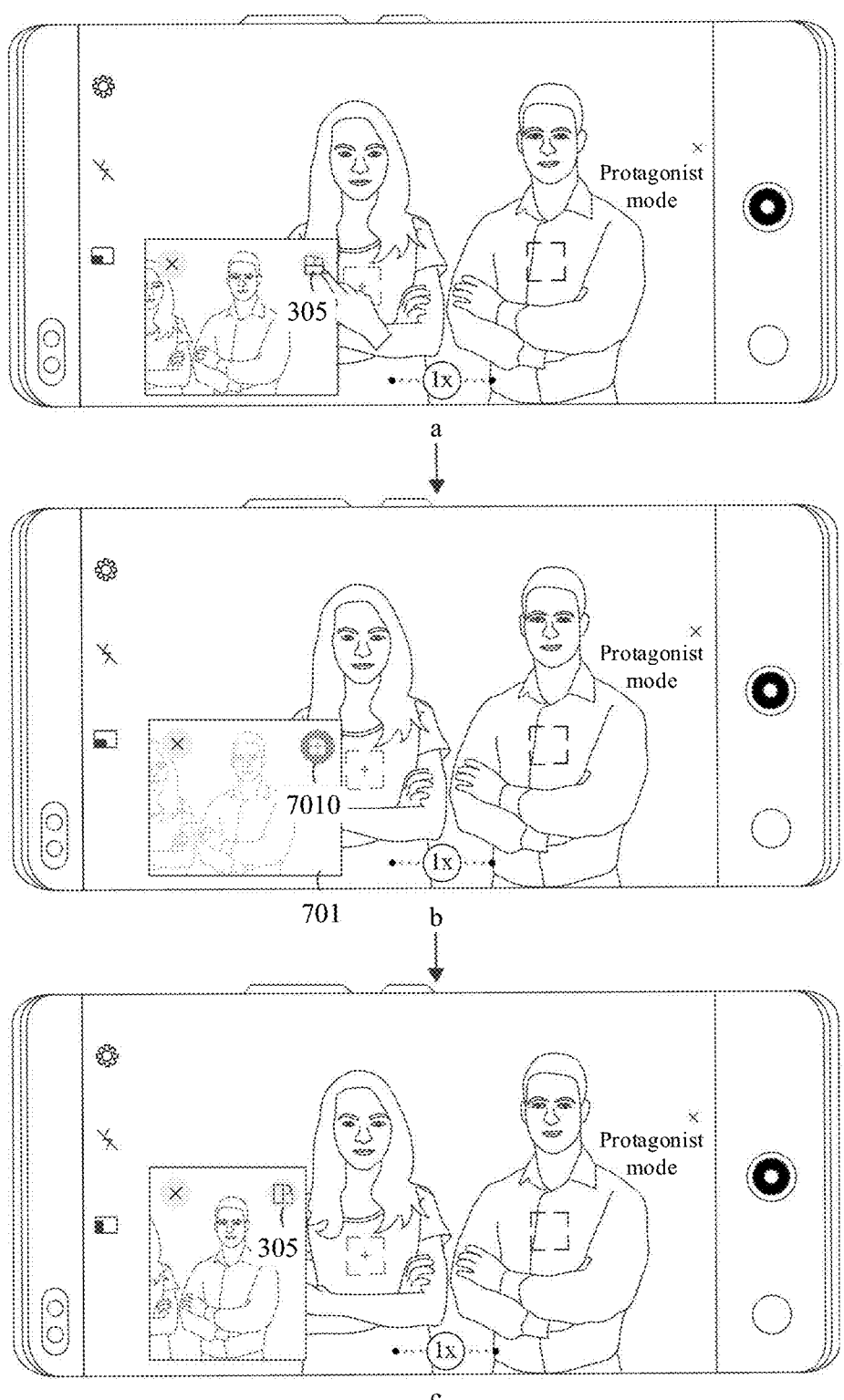

For example, the small window in landscape preview is displayed on the interface a in FIG. 2G, where the small window includes the second landscape and portrait switch button 305, and the second landscape and portrait switch button 305 is of the style in the case of landscape preview. When the electronic device receives a tap operation for the second landscape and portrait switch button 305, the electronic device enters an interface shown in figure c in FIG. 2G. In the interface c in FIG. 2G, the small window is in portrait preview, and the icon of the second landscape and portrait switch button 305 also changes accordingly, and changes to the style in the case of portrait preview.

It may be understood that landscape and portrait switching of the small window does not affect a preview picture of the large window. For example, when the small window switches from landscape preview to portrait preview, landscape preview and portrait preview of the large window do not change.

Optionally, to enable the small window to enhance watchability during landscape and portrait switching, the electronic device may set a dynamic special effect. For example, as shown in a in FIG. 2G, the user taps the second landscape and portrait switch button 305 in the small window, and the electronic device responds to the operation to enter the interface shown in b in FIG. 2G. In the interface b in FIG. 2G, the small window may display a dynamic special effect 701, and the dynamic special effect 701 is used to prompt the user that the small window is in a landscape and portrait switching process. For example, the dynamic special effect may be processing such as blurring, soft focusing, and adding a mask layer to the preview picture in the small window by the electronic device. After switching between landscape and portrait of the small window is completed, the electronic device enters the interface shown in c in FIG. 2G, and the dynamic special effect of the small window disappears. The dynamic special effect enables the preview picture of the small window to be smoother during landscape and portrait switching, reduces a problem of distortion and twisting of a person, a background, and the like in the switching process, and improves preview aesthetics of the small window.

It may be understood that, when detecting a tap operation in the small window, the electronic device may further generate a highlighted icon 7010 at a corresponding tap position, so as to indicate that the user performs a tap operation in the small window, so as to indicate that the small window obtains a focus, as shown in figure b in FIG. 2G. For example, when the electronic device receives operations of adjusting the specification of the small window by using two fingers, tapping and dragging to adjust the position of the small window, and tapping the region of the small window, the electronic device may generate the highlighted icon 7010. This application imposes no limitations on a generation scenario of the highlighted icon 7010.

The preview interface of the protagonist mode further includes a first landscape and portrait switch button. An icon of the first landscape and portrait switch button 304 may also have two styles. The icon of the first landscape and portrait switch button 304 may be a style in a case of landscape preview. As shown in an interface a in FIG. 2H, the icon is represented in a form of a large rectangular frame nested with a horizontally placed small rectangular frame. It may be understood that the small window is currently in landscape preview. The icon of the first landscape and portrait switch button 304 may alternatively be a style in a case of portrait preview. As shown in an interface c in FIG. 2H, the icon is represented in a form of a large rectangular frame nested with a vertical small rectangular frame. It may be understood that the small window is currently in portrait preview. It should be noted that in the embodiments of this application, that the electronic device is placed horizontally is used as an example, and the large window is in landscape preview. Therefore, in the icon of the first landscape and portrait switch button 304, the large rectangle is placed horizontally. It may be understood that when the electronic device is placed vertically, the large rectangle may be displayed as being placed vertically. In this application, the style of the icon of the first landscape and portrait switch button is not limited.

Figure 2H:
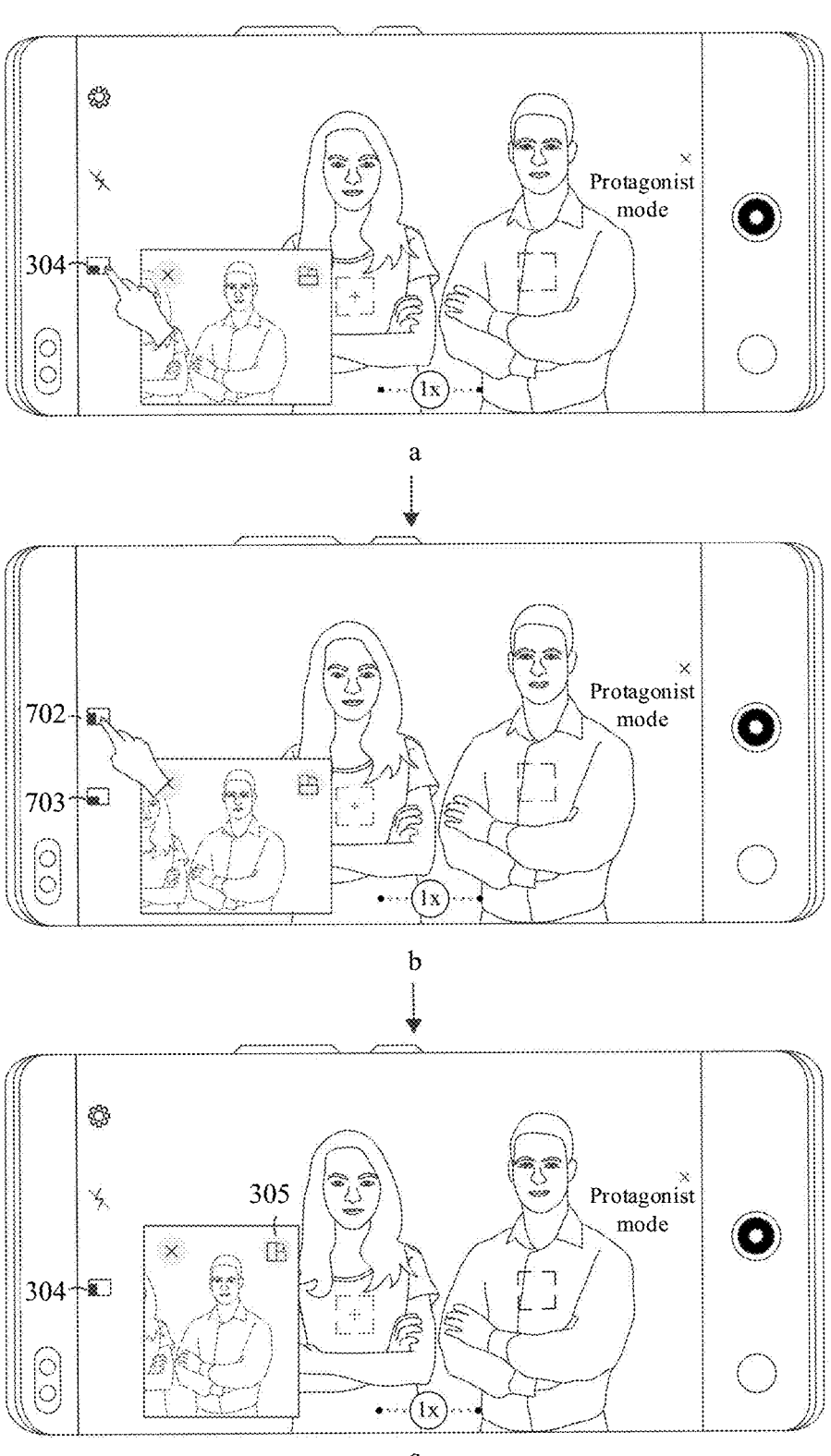

For example, the small window in landscape preview is displayed on the interface a in FIG. 2H, and the large window of the electronic device includes the first landscape and portrait switch button 304. When receiving a tap operation for the first landscape and portrait switch button 304, the electronic device enters an interface shown in b in FIG. 2H. In the interface b in FIG. 2H, the first landscape and portrait switch button 304 is in an expanded state, and a landscape display button 703 and a portrait display button 702 are provided in the preview interface. The landscape display button 703 is used to instruct the electronic device to display the small window as landscape preview, and the portrait display button 702 is used to instruct the electronic device to display the small window as portrait preview. When the electronic device receives a tap operation for the portrait display button 702, the electronic device enters the interface shown in c in FIG. 2H. In the interface c in FIG. 2H, the small window is switched to portrait preview, and correspondingly, the icon of the first landscape and portrait switch button 304 is displayed as the style in the case of portrait preview.

Optionally, in a possible implementation, in this embodiment of this application, when switching between landscape and portrait of the small window based on the first landscape and portrait switch button, the electronic device may directly enter the interface c in FIG. 2H from the interface b in FIG. 2H. During switching between landscape and portrait of the small window, there is no dynamic special effect in the small window. In another possible implementation, the electronic device may alternatively set a dynamic special effect in the landscape and portrait switching process of the small window. Refer to related descriptions in FIG. 2G, and details are not described herein again.

It should be noted that in the foregoing two methods for switching landscape and portrait of the small window, the second landscape and portrait switch button 305 in the small window and the first landscape and portrait switch button 304 in the large window may be set in association. For example, when the small window is switched to the portrait preview, the icon of the first landscape and portrait switch button 304 is of the style in the case of portrait preview, and the icon of the second landscape and portrait switch button 305 is also of the style in the case of portrait preview, as shown in the interface c in FIG. 2H.

Optionally, in the preview mode of the protagonist mode, an embodiment of this application further provides a scenario in which landscape and portrait of the small window are adjusted without the small window, which is an example. In an interface a in FIG. 2I, when the electronic device enters the protagonist mode or closes preview of the small window, the preview interface may not include the small window. In this case, the icon of the first landscape and portrait switch button 304 is displayed as the style in the case of landscape preview. If the electronic device receives a tap operation for a tracking box of a focus tracking object, the electronic device may start landscape preview of the small window. If the electronic device receives a tap operation for the first landscape and portrait switch button 304, the electronic device may enter an interface shown in b in FIG. 2I. In the interface b in FIG. 2I, the first landscape and portrait switch button 304 is expanded into a landscape display button 703 and a portrait display button 702. When the electronic device receives a tap operation for the portrait display button 702, the electronic device enters an interface shown in c in FIG. 2I. In the interface c in FIG. 2I, the icon of the first landscape and portrait switch button 304 is of the style in the case of portrait preview. When the user taps the tracking box 311 of the focus tracking object, the electronic device responds to the tap operation to enter an interface shown in d in FIG. 2I. In the interface d in FIG. 2I, the small window displays the preview picture in a portrait manner, the first landscape and portrait switch button 304 is displayed as the style in the case of portrait preview, and the second landscape and portrait switch button 305 also switches in association to the style in the case of portrait preview.

Optionally, when the electronic device enters the protagonist mode for the first time or closes preview of the small window, the preview interface does not include the small window. If the electronic device does not recognize a focus trackable object, and no person is in the preview picture, the first landscape and portrait switch button may be hidden. When the electronic device recognizes a focus trackable object and marks the object with a tracking box, the first landscape and portrait switch button may be displayed.

Figure 2I:
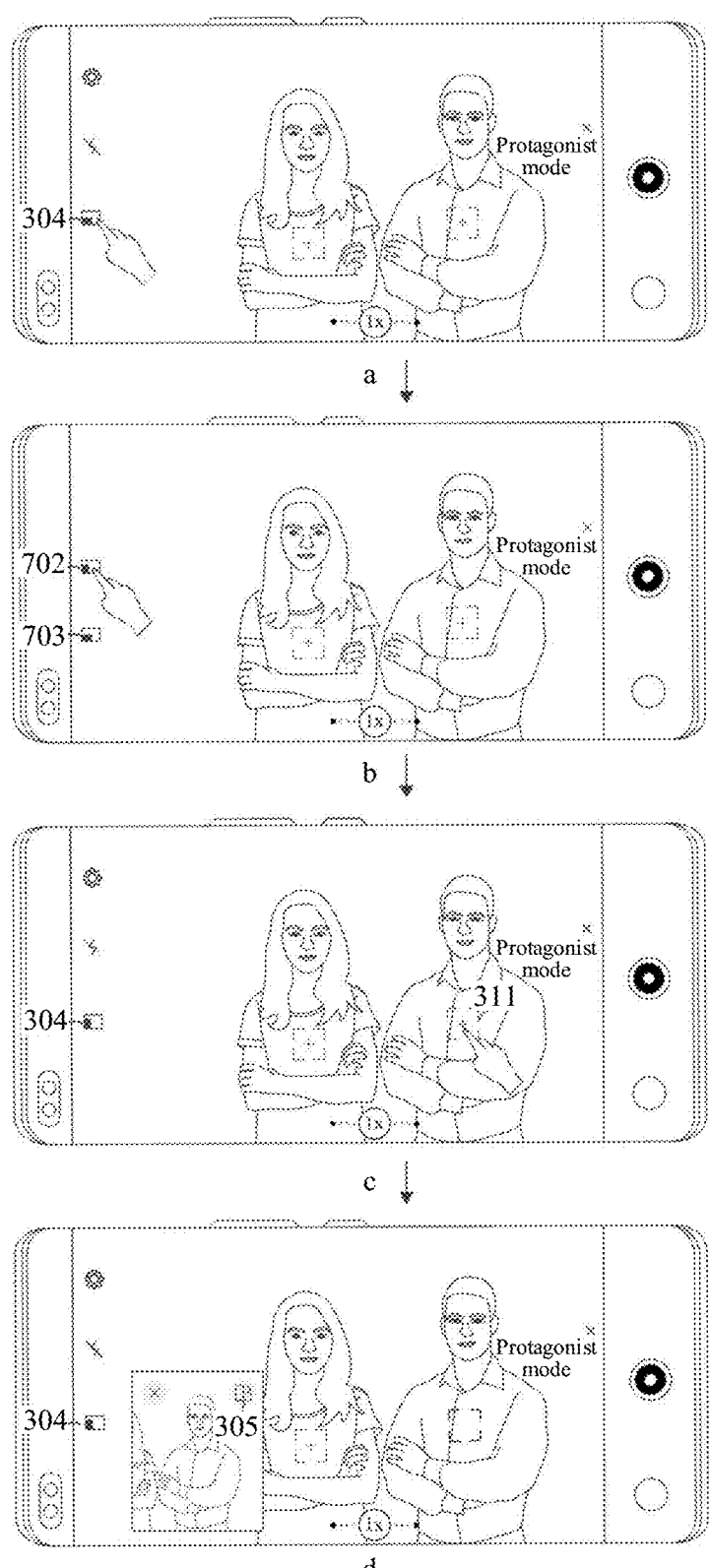

Optionally, in an interface shown in d in FIG. 2I, the electronic device may perform, based on the first landscape and portrait switch button 304 and the second landscape and portrait switch button 305, a process of switching from portrait preview to landscape preview. This scenario is similar to the scenarios shown in FIG. 2G and FIG. 2H, and details are not described herein.

Figure 2J:
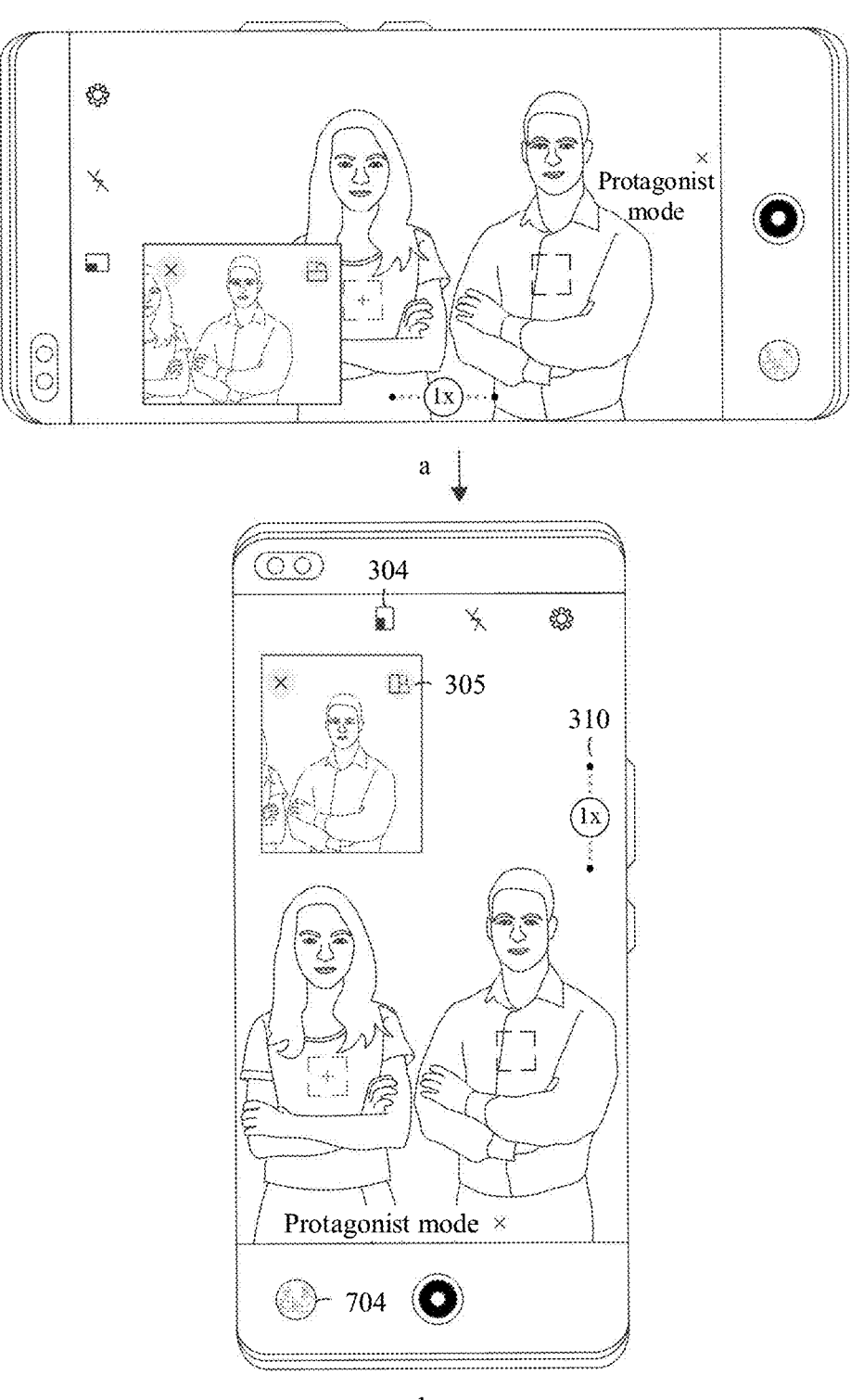

An embodiment of this application further provides a scenario in which landscape and portrait of a large window and a small window are switched in association, as shown in FIG. 2J.

For example, the electronic device is placed horizontally. The preview interface of the electronic device may be shown in a in FIG. 2J. The large window is in a landscape preview state, and the small window is also in the landscape preview state. When the electronic device detects that the electronic device is placed vertically, the large window of the electronic device switches to a portrait preview state, and the small window also switches to the portrait preview state, as shown in b in FIG. 2J.

For example, the electronic device is placed horizontally. In the preview interface of the electronic device, the large window is in the landscape preview state, and in this case, the small window may be in the portrait preview state. When the electronic device detects that the electronic device is placed vertically, the large window of the electronic device switches to the portrait preview state, and the small window switches to landscape preview.

When vertical placement of the electronic device in this embodiment of this application is converted into horizontal placement, a change of the landscape and portrait states of the large window and the small window may be an inverse process of the foregoing embodiment, and details are not described herein.

It may be understood that when the display screen of the electronic device is switched from horizontal placement to vertical placement, the large window is switched from landscape to portrait, the small window does not change with respect to the large window, and the preview picture of the small window is still a clipped picture at a corresponding position of the large window. However, the change of the placement state of the electronic device is represented as that landscape is switched to portrait, and the icons of the first landscape and portrait switch button and the second landscape and portrait switch button are also switched to the style in the case of portrait preview.

When switching between landscape and portrait, the electronic device may detect an acceleration sensor to obtain acceleration values in X, Y, and Z directions. The electronic device obtains a rotation angle through calculation based on the acceleration values, so as to determine landscape and portrait states of the electronic device. When the electronic device detects that the electronic device rotates, the large window performs landscape and portrait switching, and positions and states of some icons also change correspondingly. For example, in an interface in figure b in FIG. 2J, the large window is switched from landscape to portrait, and an icon of a zoom button 310, a button of the large window, a button of the small window, and content displayed in a preview box 704 of a recorded video and the like may correspondingly rotate to change to the style in the case of portrait preview.

In a possible implementation, in a process in which the electronic device rotates the screen, the small window correspondingly rotates, but a function button in the small window may not follow the rotation. For example, regardless of whether the small window is in landscape preview or portrait preview, the second landscape and portrait switch button 305 is always located at a position in the upper right corner of the small window, as shown in a in FIG. 2J and b in FIG. 2J.

In another possible implementation, in the process in which the electronic device rotates the screen, the small window rotates correspondingly, and the function button in the small window rotates correspondingly. For example, if the small window is in landscape preview, the second landscape and portrait switch button is located at a position in the upper right corner of the small window. When the electronic device rotates by 90° (or about 90°) clockwise, the small window changes to portrait preview, and the second landscape and portrait switch button is located at a position in the lower right corner of the small window.

3. The Focus Tracking Object is Lost in the Preview Mode in the Protagonist Mode (FIG. 2K(1) to FIG. 2P(4))

The foregoing embodiment is an application scenario in which the user normally performs preview in the protagonist mode. In some embodiments, the electronic device may not recognize a focus tracking object in the preview mode. The following describes, with reference to FIG. 2K(1) to FIG. 2K(5), FIG. 2L(1) to FIG. 2L(3), and FIG. 2M(1) to FIG. 2M(3), several scenarios in which a large window loses a focus tracking object in the preview mode in the protagonist mode.

For example, FIG. 2K(1) to FIG. 2K(5) are a schematic diagram of an interface that can be displayed in a small window when the electronic device cannot detect a focus tracking object in the preview mode in the protagonist mode according to an embodiment of this application.

In a possible implementation, the position of the lens of the electronic device does not change, and the focus tracking object moves out of a shootable range of the lens, so that the focus tracking object in the large window is lost. In this case, as shown in FIG. 2K(1) and FIG. 2K(2), in an interface in FIG. 2K(1), the preview picture of the large window may include a male person, a female person, and a background such as a road map and a tree. In this case, the male person leaves an original position, and the electronic device cannot recognize the focus tracking object. The electronic device enters an interface shown in FIG. 2K(2). In the interface shown in FIG. 2K(2), the picture of the small window may be a clipped picture of a current picture of the large window. For example, when the lens of the electronic device does not move, the male person (that is, the focus tracking object) in the preview picture of the large window disappears, and the female person and the background such as a tree and a road mark do not change. When the lens of the electronic device does not move, the preview picture of the small window may display a preview picture of a background in which the focus tracking object is located before being lost.

In another possible implementation, the person does not move, and the lens of the electronic device deviates from the focus tracking object, thereby causing a loss of the focus tracking object in the large window. In this case, as shown in FIG. 2K(1) and FIG. 2K(3), it may be found from the interface in FIG. 2K(3) compared with the interface shown in FIG. 2K(1) that the lens of the electronic device shifts to the left, the tree in the preview picture of the large window moves from the left to the right, the person moves out of the shootable range, and the focus tracking object is lost. It may be understood that before the focus tracking object is lost, the small window displays a picture of the focus tracking object at a corresponding position in the large window (a focus tracking position is on the right side of the preview picture of the large window, and the small window displays the picture at this position). After the focus tracking object is lost, the small window still displays the picture at the corresponding position in the picture of the large window (the focus tracking position is still on the right side of the preview picture of the large window, and the small window displays the picture at this position). For example, before the focus tracking object is lost, as shown in FIG. 2K(1), the small window displays a picture of the male person on the right side of the large window. After the focus tracking object is lost, as shown in FIG. 2K(3), the picture at the position of the male person is a tree in this case, and a preview picture of the tree is displayed in the small window of the electronic device.

It may be understood that, in the foregoing two scenarios in which the focus tracking object in the large window is lost because the person moves or the lens of the electronic device moves, when the focus tracking object is selected in the large window of the electronic device, the small window may display the picture for the focus tracking object. Before the focus tracking object is lost, a display picture of the small window is corresponding to a display picture of the large window. After the focus tracking object is lost, the display picture of the small window is still corresponding to the display picture of the large window, and a corresponding position is consistent with a position before the object is lost. In this case, the large window is in a dynamic preview state, and the small window also dynamically displays a picture at a corresponding position in the large window.

In still another possible implementation, the electronic device switches landscape and portrait states of the small window in the preview mode. In an example in which landscape preview of the small window is switched to portrait preview, when the electronic device switches from landscape to portrait, data used for clipping the small window in the original landscape preview mode may be lost, or data of landscape preview does not match data of portrait preview, so that after switching, the small window cannot obtain a focus tracking position in the large window, and consequently, the small window loses the focus tracking object. The scenario is subsequently described in detail with reference to FIG. 2O and FIG. 2P(1) to FIG. 2P(4). Details are not described herein.

In still another possible implementation, in the preview mode in the protagonist mode, after the focus tracking object is lost, the small window of the electronic device may display a still picture of the last frame of picture before the focus tracking object is lost. For example, as shown in FIG. 2K(4), the focus tracking object in the picture of the large window is lost. The electronic device may retain the last frame of picture that can recognize the male person, and the small window may not dynamically track the preview picture of the large window and display only the static picture of the last frame of picture.

In still another possible implementation, after the focus tracking object is lost in the preview mode in the protagonist mode, the small window may display the interfaces shown in FIG. 2K(2) to FIG. 2K(4). The interface in FIG. 2K(3) of the small window is used as an example. When the electronic device loses the focus tracking object, the electronic device enters an interface shown in FIG. 2K(5). In the interface in FIG. 2K(5), the electronic device adds a mask layer to the small window. For example, the mask layer may be a grayscale layer that floats above the preview picture of the small window, and the small window in the masked state has lower brightness than the large window, which may remind the user that preview of the current small window is abnormal.

It may be understood that, when the focus tracking object of the electronic device is lost, the picture presented by the small window may be any interface shown in FIG. 2K(2) to FIG. 2K(4), or may be a combination of any interface shown in FIG. 2K(2) to FIG. 2K(4) and a masked state. This is not limited in the embodiments of this application.

This embodiment of this application provides several implementations of the display interface of the small window after the focus tracking object is lost in the preview mode of the protagonist mode. It may be understood that the small window may also have another implementation of the display interface, which is not enumerated herein. The following uses the foregoing implementation as an example to describe an example processing process of the electronic device after the focus tracking object of the large window in the preview mode is lost. In the following scenarios, the male person may be selected as the focus tracking object.

Scenario 1: For example, in an interface shown in FIG. 2L(1), when the male person in the large window is lost as the focus tracking object, the male person is not displayed in the large window and the small window, and the small window is in a masked state. Within a specific period of time, the small window of the electronic device may keep displaying the preview picture. For example, the period of time may be 5 s. If the electronic device re-recognizes the male person within 5 s, the electronic device enters an interface shown in FIG. 2L(2). The small window may automatically perform focus tracking on the male person and resume the preview picture of the male person. The electronic device cancels the masked state of the small window. If the male person is not identified by the electronic device within 5 s, the electronic device enters an interface in FIG. 2L(3) from the interface in FIG. 2L(1). In the interface in FIG. 2L(3), the small window is closed, and the electronic device reserves the preview picture of the large window.

Scenario 2: For example, after the male person (that is, the focus tracking object) is lost in the large window, the electronic device does not recognize the male person within 5 s, the terminal enters an interface in FIG. 2M(1), and the small window in the interface in FIG. 2M(1) is closed. If the electronic device re-recognizes the focus tracking object, namely, the male person when the small window is closed, the electronic device enters an interface shown in FIG. 2M(3). In the interface in FIG. 2M(3), the small window re-displays the preview picture of the focus tracking object.

In an implementation in which the interface in FIG. 2M(3) is entered from the interface in FIG. 2M(1), when the small window is not opened, the electronic device recognizes a plurality of focus trackable objects (the focus trackable objects may include the focus tracking object before being lost, or may not include the focus tracking object before being lost). The preview picture of the large window includes a plurality of focus trackable objects and corresponding tracking boxes, as shown in FIG. 2M(2). When detecting an operation that the user taps the tracking box 311, the electronic device enters the interface shown in FIG. 2M(3). In the interface in FIG. 2M(3), the small window can perform focus tracking on a focus tracking object selected by the user. In this process, the user can tap the tracking box again to select or replace the focus tracking object.

In another implementation, when the electronic device recognizes the focus tracking object before being lost, the small window may be automatically restored and display the focus tracking object. For example, as shown in FIG. 2M(1) to FIG. 2M(3), the electronic device recognizes a plurality of focus trackable objects in a period of time after the small window is closed, and based on the face recognition technology, the electronic device may determine whether the current a plurality of focus trackable objects include the focus tracking object before being lost. If the focus tracking object before being lost is included, the small window may automatically perform focus tracking preview on the focus tracking object. If the focus tracking object before being lost is not included, the electronic device may perform the foregoing method for tapping the tracking box to re-select a focus tracking object.

In the preview mode in the protagonist mode, the focus tracking object in the large window is lost. If the electronic device detects, within 5 seconds after the focus tracking object is lost, an operation that the user taps to start recording, the large window starts recording a video without the focus tracking object. However, there is no focus tracking object in the small window, the video of the large window cannot be clipped for the focus tracking object, and a focus tracking video cannot be generated. In this case, the small window may perform a method shown in FIG. 2N(1) to FIG. 2N(4).

Scenario 3: For example, in an interface in FIG. 2N(1), the male person in the large window is lost, and time of being lost does not exceed 5 s. In this case, the small window presents a masked state, and the male person in the small window also does not exist. The user taps the start recording button 303 in the large window, and the electronic device responds to the operation to enter an interface shown in FIG. 2N(2). In the interface in FIG. 2N(2), the large window of the electronic device starts to record a video, and recording time is displayed in a recording picture of the large window. For example, the recording time in recording may include but is not limited to a form of a combination of a dot and time. The small window displays the preview picture in the masked state. It may be understood that the small window in the masked state may still dynamically display a picture at a corresponding position in the large window. However, the small window is only in the preview mode, and cannot record and save a video on the picture.

Optionally, in some embodiments, when the interface in FIG. 2N(1) is switched to the interface in FIG. 2N(2), the first landscape and portrait switch button 304 and the second landscape and portrait switch button 305 may display the icons. In some embodiments, after the large window starts recording, the landscape and portrait switch button may be hidden, as shown in FIG. 2N(2).

When the small window is in the masked state, if the electronic device recognizes the focus tracking object within 5 s after recording starts in the large window, the small window may eliminate the masked state and start recording. Otherwise, the small window is closed. It may be understood that the masked state of the small window may be maintained for 5 s. If the electronic device regains the focus tracking object within 5 s, the small window starts to record a focus tracking video for the focus tracking object. If the electronic device does not regain the focus tracking object within 5 s, the small window disappears.

For example, in the interface in FIG. 2N(2), the large window has no focus tracking object and is recording a video, and the small window has no focus tracking object and is in the masked state. If the electronic device recognizes the male person at the 3rd second after the large window starts recording, the electronic device enters an interface in FIG. 2N(3). In the interface in FIG. 2N(3), the masked state of the small window disappears, and the small window automatically starts recording for the focus tracking object. In this case, recording time (3 s) of the large window is inconsistent with recording time (Is) of the small window. A recording time difference may be a time difference between time at which the electronic device detects that the user taps a recording button and time of re-recognizing a focus tracking object.

For another example, in the interface in FIG. 2N(2), the large window has no focus tracking object and is recording a video, and the small window has no focus tracking object and is in the masked state. If the electronic device does not re-recognize a focus tracking object within 5 s after the focus tracking object is lost, the electronic device enters an interface in FIG. 2N(4). In the interface in FIG. 2N(4), the small window is closed, and the electronic device reserves only the recording picture of the large window.

The foregoing scenario may be understood as that the small window presents the masked state after the focus tracking object is lost, and the masked state may be maintained for 5 s. The small window automatically starts recording the focus tracking object if time from losing the focus tracking object to regaining the focus tracking object is within 5 s. The small window is closed if the time from losing the focus tracking object to regaining the focus tracking object exceeds 5 s or the focus tracking object is not regained.

It may be understood that when the large window starts recording and the small window is closed because the focus tracking object is lost for more than 5 s, if the electronic device re-recognizes a focus tracking object, the user may re-select a focus tracking object based on the tracking box of the focus trackable object. After the electronic device responds to the operation, the small window automatically appears and starts recording. This scenario is similar to the scenario shown in FIG. 3B(1) to FIG. 3B(4), and details are not described herein.

In the preview mode in the protagonist mode, the electronic device may lose the focus tracking object of the large window due to a human factor such as lens movement or person movement. The electronic device may also lose the focus tracking object due to loss of small window data or data mismatch during landscape and portrait switching of the small window. An embodiment of this application provides a method for processing loss of a focus tracking object due to landscape and portrait switching.

Figure 2O:
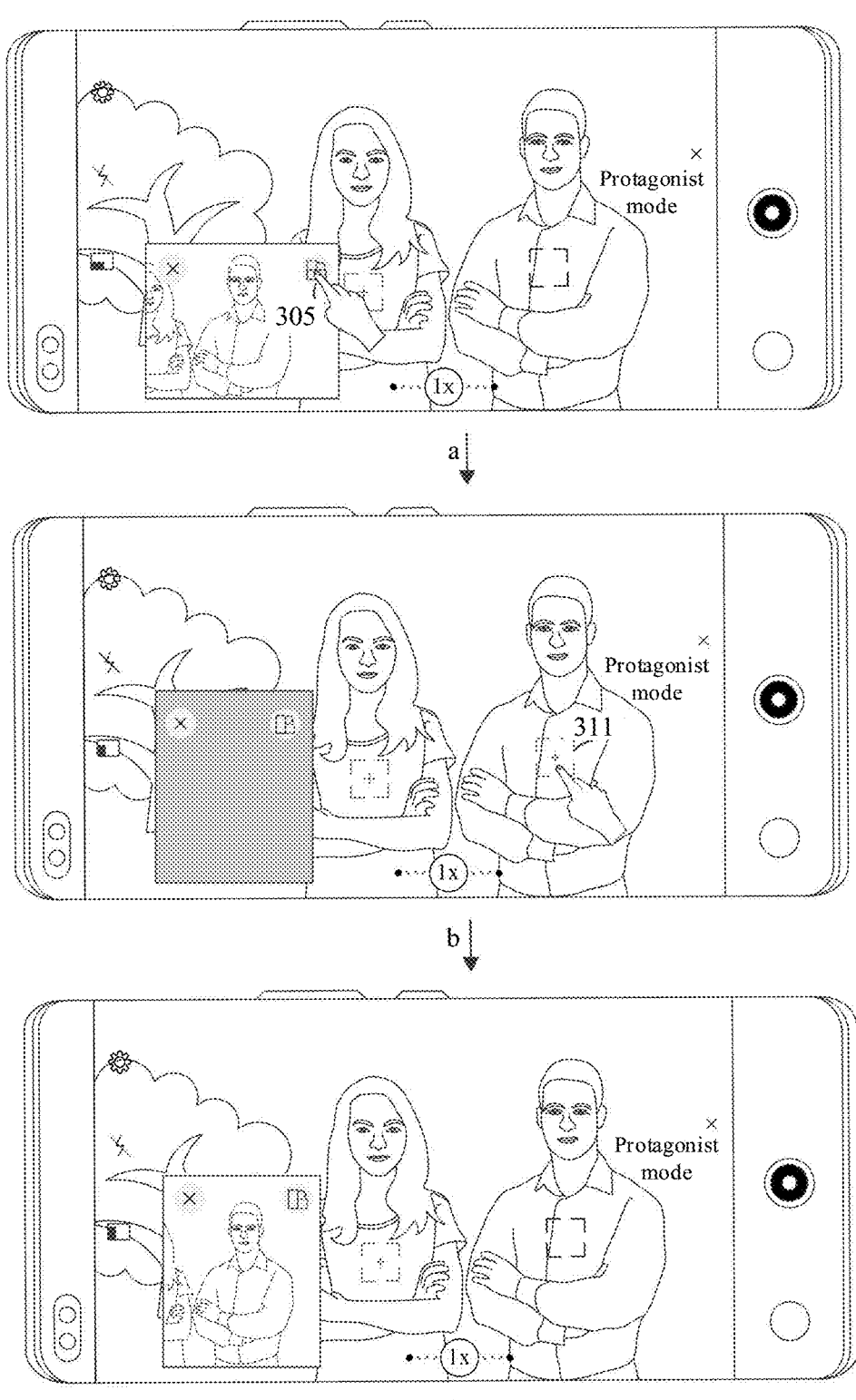

For example, the embodiments of this application provide processing methods shown in FIG. 2O and FIG. 2P(1) to FIG. 2P(4) for a scenario in which the focus tracking object is lost due to landscape and portrait switching of the small window.

In an interface a in FIG. 2O, the small window is in the landscape preview state, and the small window includes the focus tracking object. When the electronic device receives a tap operation for the landscape and portrait switch button (for example, the user taps the second landscape and portrait switch button 305 on the interface a in FIG. 2O), the electronic device may enter an interface shown in b in FIG. 2O. The electronic device loses the focus tracking object in the small window due to landscape and portrait switching of the small window. The preview picture of the small window in the interface b in FIG. 2O has no focus tracking object and is in the masked state, and the tracking box 311 resumes a style when being not selected. It may be understood that because data of the small window is lost or is not applicable, the small window cannot accurately track a focus tracking position. However, the small window is still in the preview state, and may display in real time a clipped picture at any position in the large window. For example, in the interface b in FIG. 2O, the focus tracking position of the small window is changed from the position of the original male person to the position of the tree. When receiving an operation of tapping the tracking box 311 by the user, the electronic device enters an interface c in FIG. 2O. The electronic device re-selects a focus tracking object. In the interface c in FIG. 2O, a focus tracking object appears on the preview picture of the small window. The focus tracking object selected by the electronic device may be the focus tracking object before being lost, or may be another object, which is not limited herein.

Optionally, when the electronic device re-detects a focus tracking object, the small window may resume tracking of the focus tracking object. For example, when the small window of the electronic device is switched from landscape to portrait, the focus tracking object of the small window may be lost. When the electronic device re-recognizes the focus tracking object before being lost, the small window automatically displays the focus tracking object, and the masked state disappears. For example, before the small window of the electronic device performs landscape and portrait switching, the focus tracking subject is the male person, as shown in a in FIG. 2O. In the landscape and portrait switching process of the small window, the male person disappears, and the small window presents the masked state, as shown in b in FIG. 2O. After switching of the small window is completed, the electronic device re-recognizes the male person, and automatically resumes tracking of the male person in the small window, as shown in c in FIG. 2O.

It may be understood that, when the small window performs landscape and portrait switching, the electronic device needs to recalculate a clipping position of the small window relative to the large window. When receiving a tap operation performed by the user on the focus tracking object, the electronic device may re-obtain data of a focus tracking position and clip a picture of the focus tracking position. In this way, the scenario in which the focus tracking object is lost during landscape and portrait switching of the small window can be reduced.

Optionally, after the small window loses the focus tracking object due to landscape and portrait switching, the preview picture of the small window does not include the focus tracking object and is in the masked state, as shown in FIG. 2P(1). After a period of time (for example, 5 s after the focus tracking object is lost), if the electronic device does not receive a tap operation performed by the user on the tracking box, the electronic device may enter an interface shown in FIG. 2P(2). The interface in FIG. 2P(2) includes the preview picture of the large window, and the small window is closed.

Optionally, after the small window loses the focus tracking object due to landscape and portrait switching, the preview picture of the small window does not include the focus tracking object, as shown in FIG. 2P(3). During a period in which the small window loses the focus tracking object (for example, within 5 s after the focus tracking object is lost), when detecting a tap operation on the start recording button 303 in the large window, the electronic device may enter an interface FIG. 2P(4). The interface in FIG. 2P(4) displays the recording picture and the recording time of the large window, and the small window disappears. Subsequently, the electronic device may also receive a tap operation on the tracking box, and start recording of the small window, which is not described herein.

The embodiments of this application provide several scenarios in which the focus tracking object is lost in the preview mode in the protagonist mode. Based on the methods in the foregoing embodiments, the electronic device may select a corresponding processing method when the focus tracking object is lost, thereby improving flexibility and accuracy of recording performed by the electronic device by using the protagonist mode, and further improving recording experience of the user.

III. Scenario in the Recording Mode in the Protagonist Mode (FIG. 3A to FIG. 3L)

The foregoing embodiment describes the preview mode of the protagonist mode. The following describes the recording mode of the protagonist mode with reference to the accompanying drawings. In the recording mode of the protagonist mode, the electronic device may start a small window to record a video for a focus tracking object, and save the video.

1. Start Large- and Small-Window Recording (FIG. 3A to FIG. 3D)

For example, a scenario in which the electronic device starts small-window recording is first described with reference to FIG. 3A, FIG. 3B(1) to FIG. 3B(4), and FIG. 3C.

In a scenario in which small-window recording is started, recording of videos of the large window and the small window may start at the same time. In an interface a in FIG. 3A, a preview picture of the large window includes a focus tracking object (for example, a male person), and the small window displays a preview picture of the focus tracking object. When the electronic device detects a tap operation on a start recording button 303 in the large window, the electronic device enters an interface shown in b in FIG. 3A.

The electronic device simultaneously starts recording of the large window and recording of the small window, and the small window may display in real time the focus tracking object in the large window. In the interface b in FIG. 3A, the small window displays a recording picture and recording time. For another example, an end small-window recording button 315 in the recording mode is further displayed in the small window, and the start recording button 303 in the large window is converted into a pause recording button 313 and an end recording button 314 in the recording mode. The large window and the small window can display their respective recording time, where the large window and the small window can keep consistent recording time. To beautify a recording interface and reduce shielding of the focus tracking object, in this embodiment of this application, a display position of the recording time may be shown in b in FIG. 3A, and the recording time may alternatively be set at another position that does not affect recording.

Figure 3A:
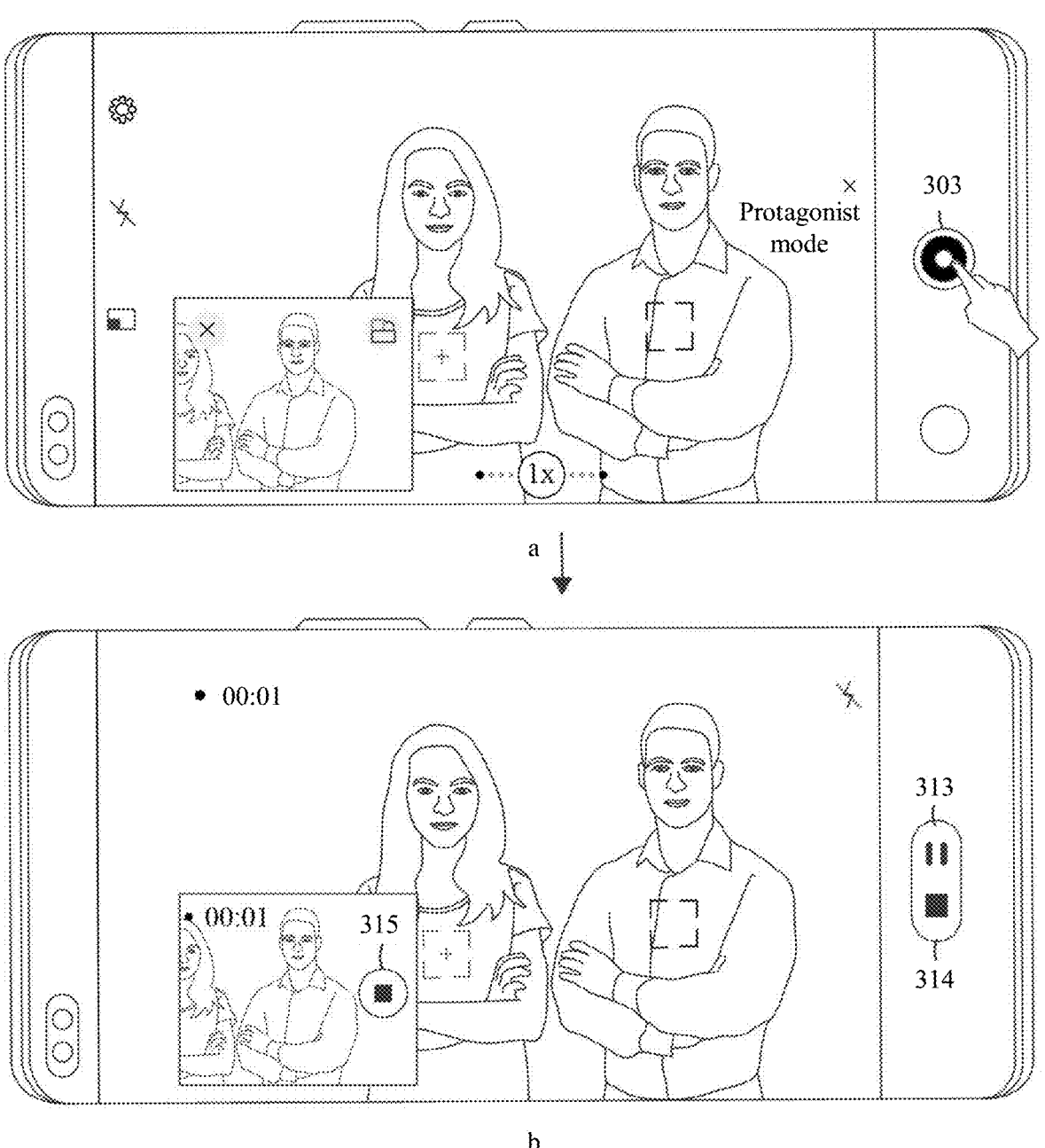
FIG. 3A to FIG. 3N are schematic diagrams of another group of user interfaces according to an embodiment of this application.
Figure 3B:
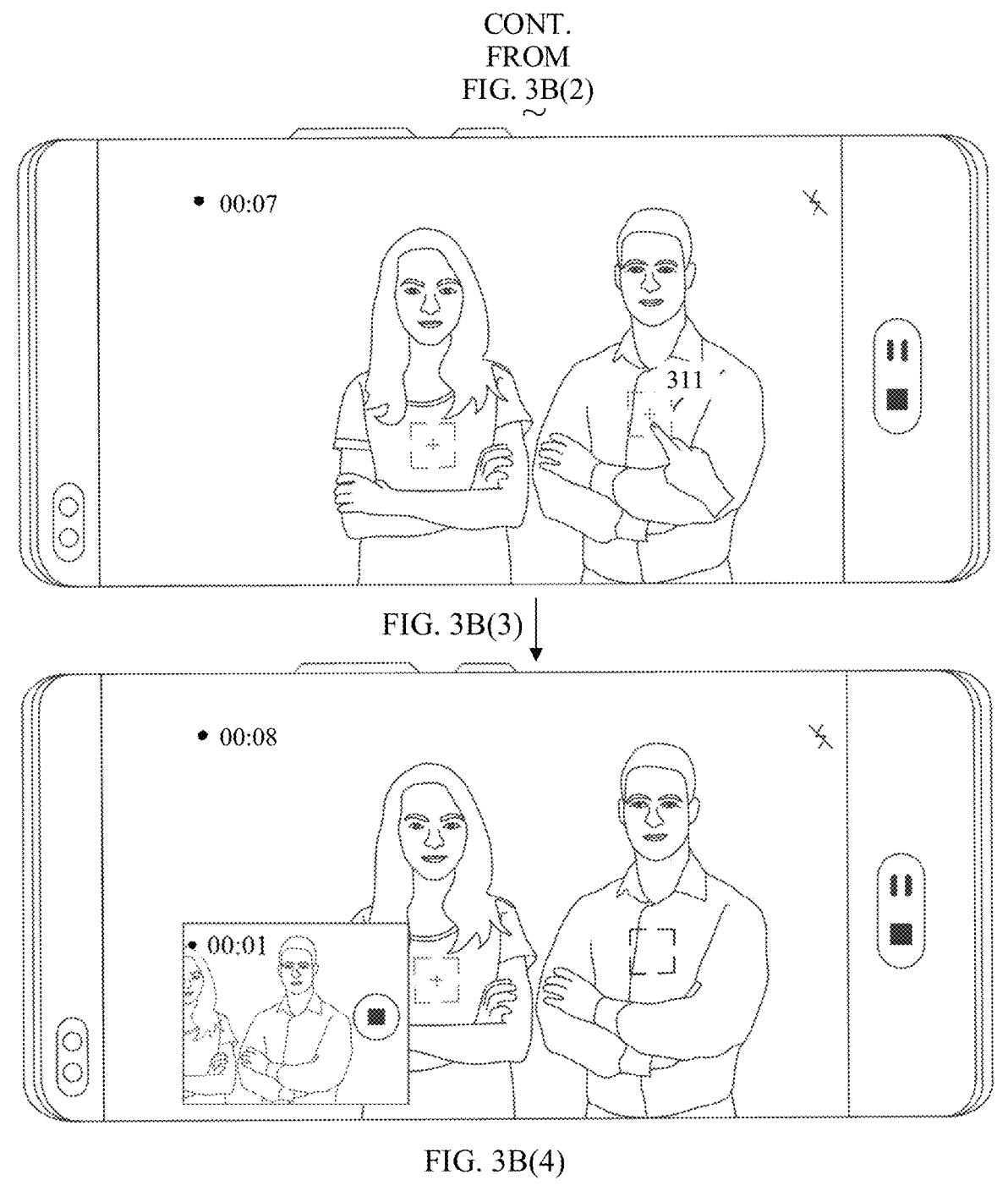
Figure 3C:
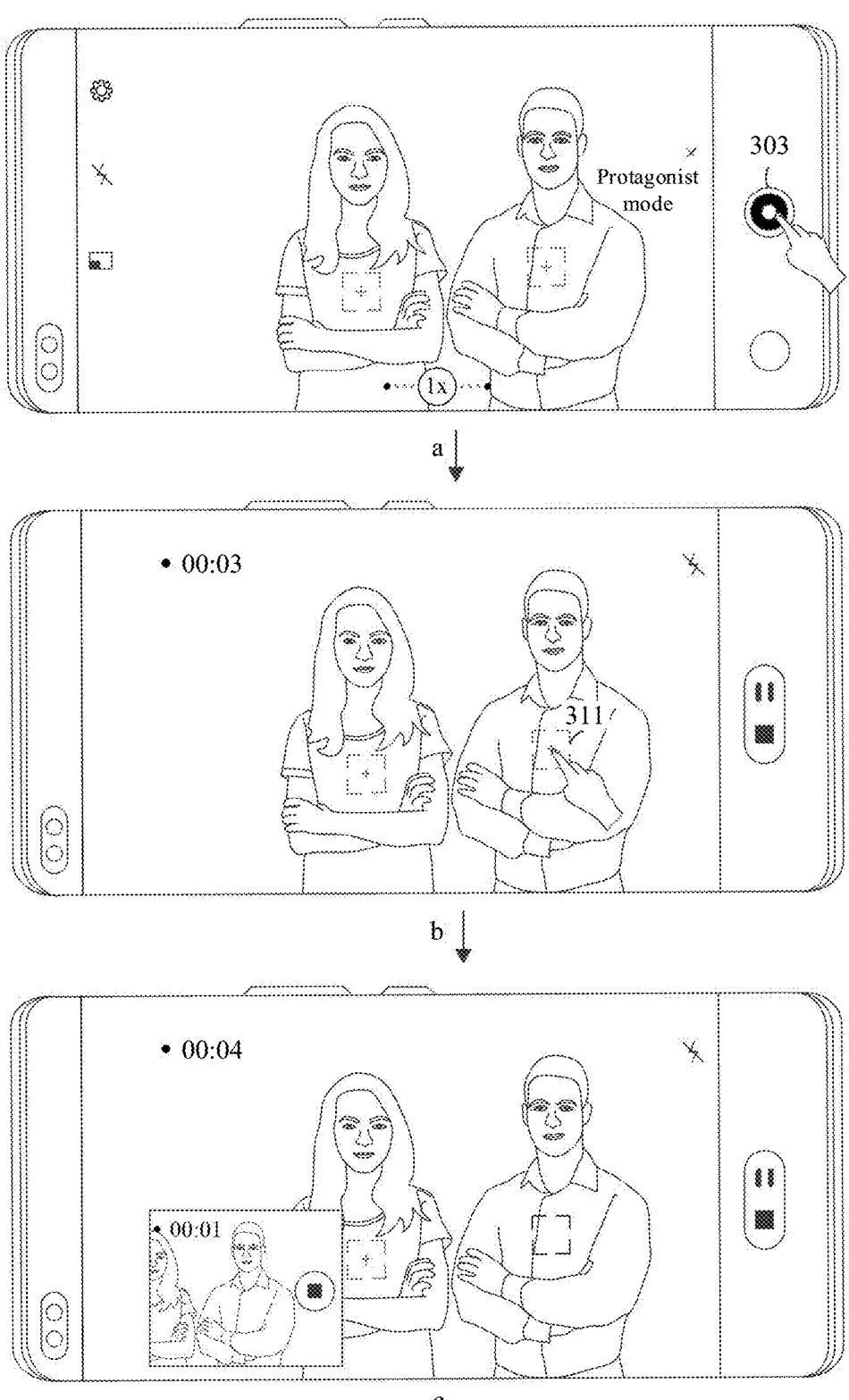

Optionally, in some embodiments, when the electronic device enters the recording mode from the preview mode, a first landscape and portrait switch button, a second landscape and portrait switch button, a zoom button, and a small window close button may disappear, as shown in figure b in FIG. 3A. These buttons may also be reserved in some embodiments, which is not limited in this embodiment of this application.

In another scenario in which small-window recording is started, videos of the large window and the small window may be recorded in sequence. In an interface in FIG. 3B(1), the preview picture of the large window does not include the focus tracking object, and the electronic device does not open the small window. When the electronic device detects a tap operation on a start recording button 303 in the large window, the electronic device enters an interface shown in FIG. 3B(2). In the interface in FIG. 3B(2), the electronic device starts recording of the large window, and the recording time is displayed in the large window. After a period of time, the electronic device recognizes a focus tracking object. The recording picture of the large window may be shown in FIG. 3B(3). The interface in FIG. 3B(3) includes a male person and a tracking box 311 corresponding to the male person. When the electronic device receives a tap operation performed by a user on the tracking box 311 of the male person when the recording time is the $7^{th}$ second, the electronic device starts recording of the small window and enters an interface shown in FIG. 3B(4). In the interface in FIG. 3B(4), the small window may display a recording picture and recording time of the focus tracking object, a small-window recording button, and the like, and the small window may record the focus tracking object in the large window in real time.

In still another scenario in which small-window recording is started, videos of the large window and the small window may be recorded in sequence. In an interface a in FIG. 3C, the preview picture of the large window includes a focus tracking object, and the small window is not opened because the electronic device does not select the focus tracking object. In response to a tap operation performed by the user on the start recording button 303, the electronic device starts recording of the large window and enters an interface shown in b in FIG. 3C. In the interface b in FIG. 3C, the large window displays the recording picture and the recording time, and the electronic device does not open the small window. In the recording process of the large window, when the electronic device detects a tap operation of the user for selecting the tracking box 311, the electronic device displays an interface shown in c in FIG. 3C. In the interface c in FIG.

3C, the electronic device keeps recording of the large window and starts recording of the small window.

The electronic device may start video recording of the small window based on the foregoing scenario, and obtain a plurality of videos. It should be noted that the small window may display a picture about the focus tracking object in the large window, but a video recorded in the small window and a video recorded in the large window are a plurality of independent videos, and are not a composite video in a picture-in-picture form in which a recording picture of a large window is nested with a small window.

It should be noted that if the electronic device does not start recording of the small window, the electronic device may obtain one video recorded in the large window. If the electronic device starts recording of the small window, the electronic device may obtain one video recorded in the large window and a plurality of videos recorded in the small window. For example, during large-window video recording, the electronic device may start small-window recording for a plurality of times, and when detecting a tap operation for the end small-window recording button, the electronic device may end recording of the small window to obtain one video. After recording of the small window is started again, the electronic device may obtain a new video. A quantity of videos obtained by the small window may be related to a quantity of times of starting recording of the small window.

Figure 3D:
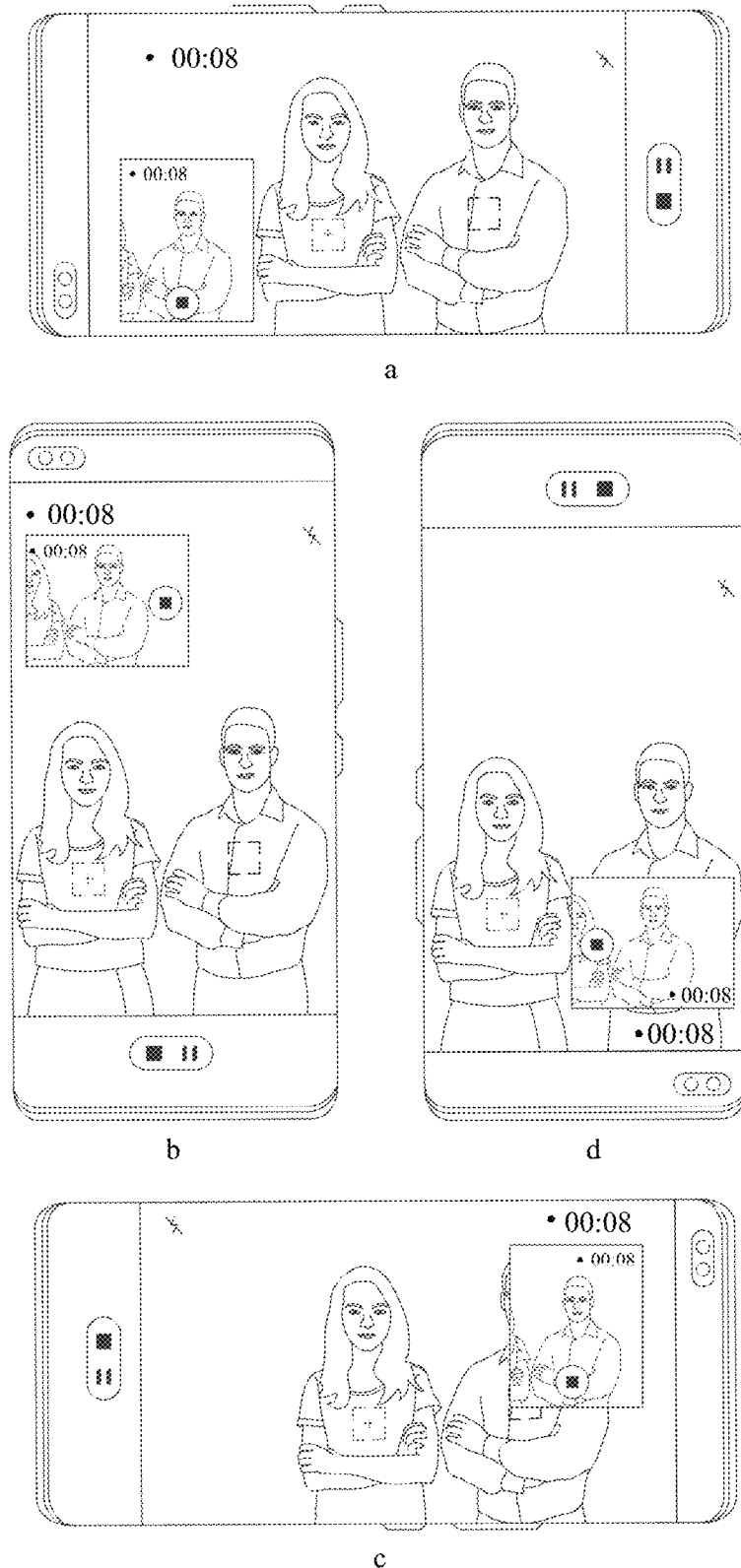

In the recording mode of the protagonist mode, an embodiment of this application further provides a schematic diagram of interfaces during four types of small-window recording of the electronic device, as shown in FIG. 3D.

For example, when recording is performed in the large window and the small window of the electronic device, the recording picture may be shown in a in FIG. 3D. The user sequentially rotates the electronic device by 90° (or about 90°) clockwise, and recording interfaces of the large window and the small window of the electronic device may be shown in b, c, and d in FIG. 3D. The recording time and the end recording button of the small window may be adjusted adaptively with landscape and portrait switching.

FIG. 3D is an example schematic diagram of interfaces in four recording modes. It may be understood that, in the recording mode of the protagonist mode, a default style of the small window may be shown in FIG. 3D, and a recording direction of the large window is inconsistent with a recording direction of the small window. For example, in the interface a in FIG. 3D, the large window performs recording in a landscape manner, and the small window performs recording in a portrait manner. For another example, in the interface b in FIG. 3D, the large window performs recording in the portrait manner, and the small window performs recording in the landscape manner. The default style of the small window may alternatively be that the recording direction of the large window is consistent with the recording direction of the small window, for example, the large window performs recording in the landscape manner, and the small window performs recording in the landscape manner. For another example, the large window performs recording in the portrait manner, and the small window performs recording in the portrait manner. The embodiments of this application impose no limitations on the default style of the small window.

It may be understood that, in a process in which the electronic device rotates, a relative display position of the small window is fixed (for example, the small window in FIG. 3D is always located near a corner of a camera). Based on a human image recognition technology, the electronic device may lock the position of the focus tracking object in real time, so that the small window always tracks the focus tracking object and displays the focus tracking object. For example, in FIG. 3D, after the electronic device rotates, the small window still performs focus tracking on the male person, and the male person is at a centered position.

Because the display position of the small window is fixed, in the process in which the electronic device rotates, the small window may shield a person in the large window, as shown in c in FIG. 3D. In a possible implementation, the user can manually move the small window to a position not shielding the person. In another possible implementation, the electronic device may detect whether there is an overlapping region between the small window and the focus tracking object in the large window. If there is an overlapping region between the small window and the focus tracking object in the large window, the display position of the small window is automatically adjusted until there is no overlapping region between the two.

This embodiment of this application provides several scenarios in which the electronic device starts recording of the small window in the protagonist mode. The user can perform a corresponding operation according to an actual situation to start recording of the small window, so that recording in the protagonist mode is more convenient and flexible, and recording experience of the user is improved.

2. Adjust a Style of the Small Window in the Recording Mode in the Protagonist Mode (FIG. 3E to FIG. 3H)

In the recording mode of the protagonist mode, after the small window appears in the recording interface of the electronic device, the user may further adjust the style of the small window according to a requirement. The following describes an adjustment method for the small window with reference to FIG. 3E to FIG. 3H.

Figure 3E:
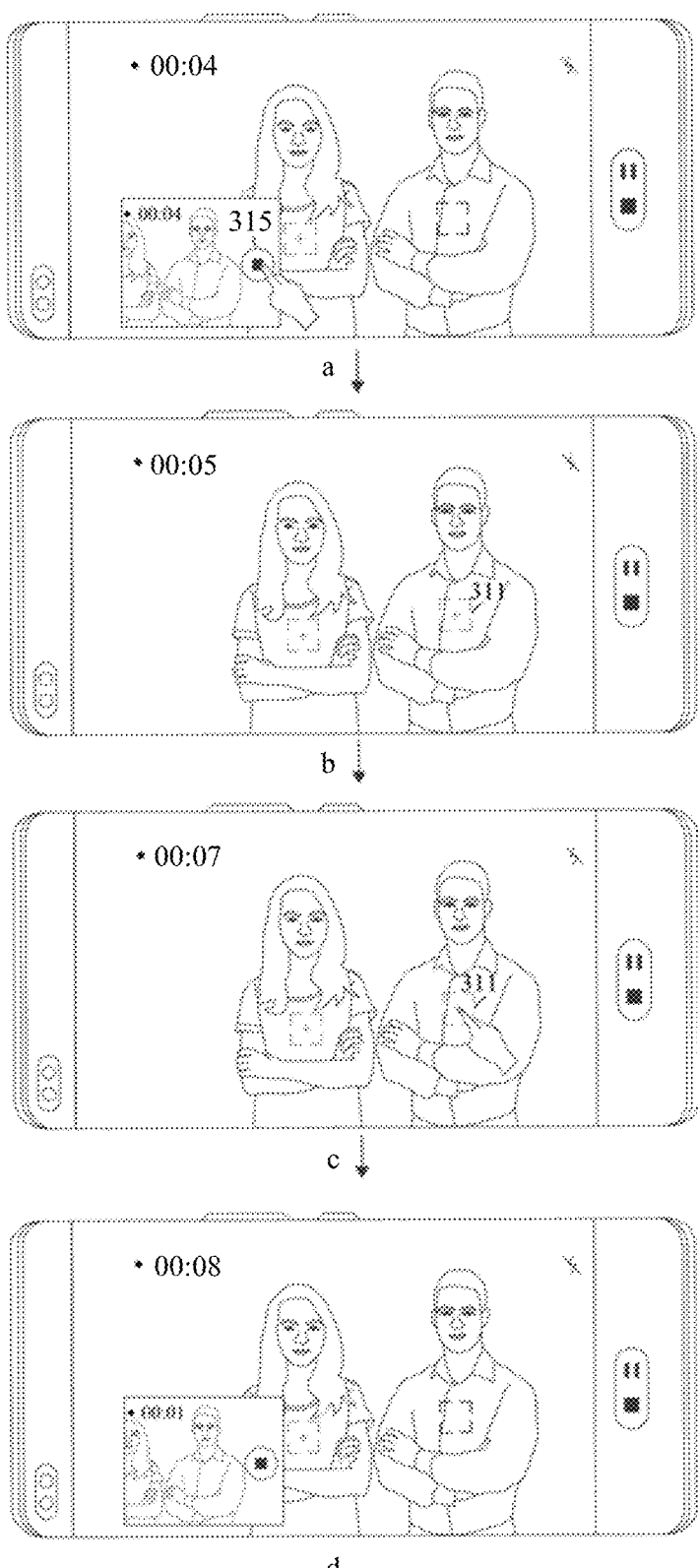
Figure 3F:
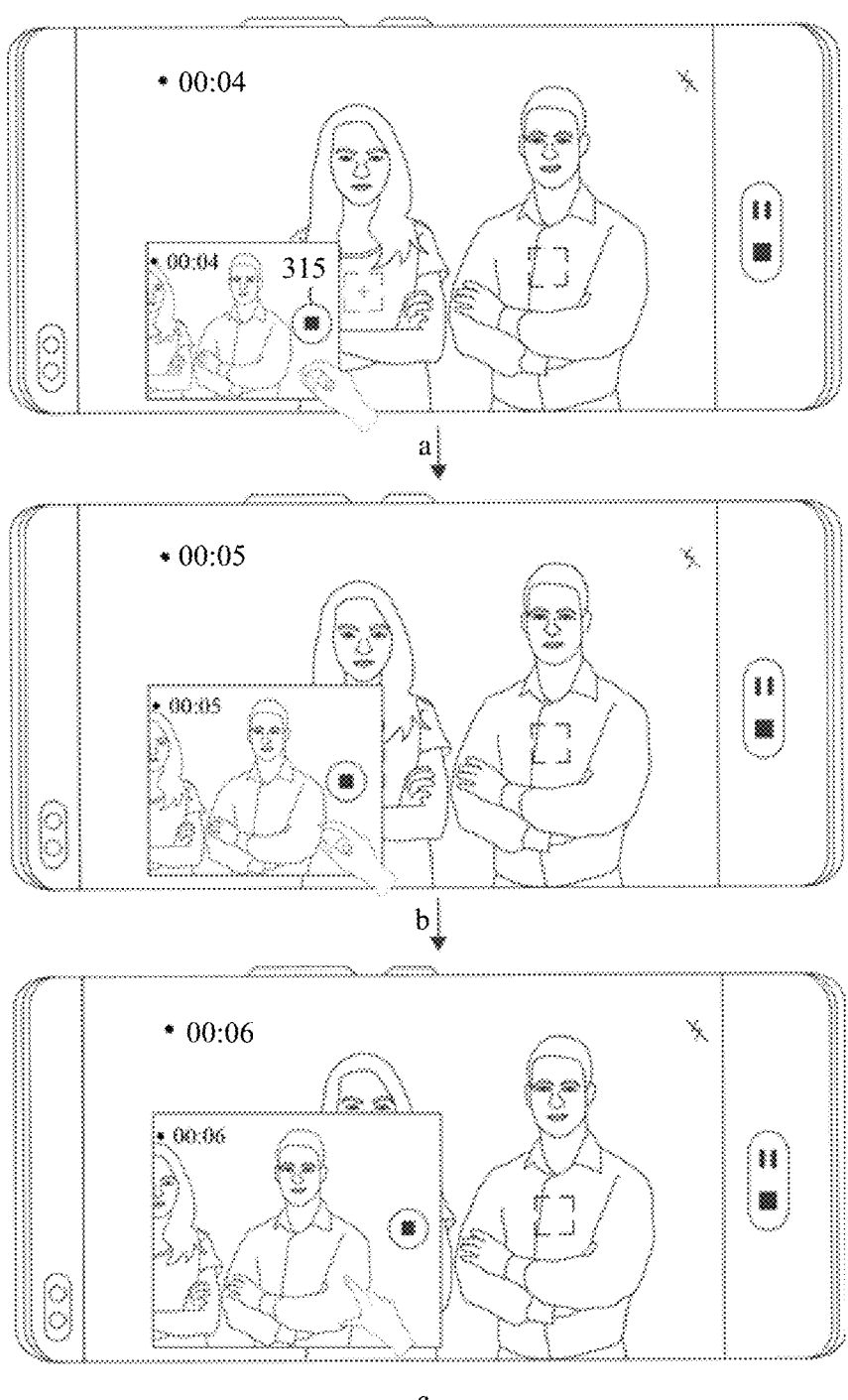
Figure 3G:
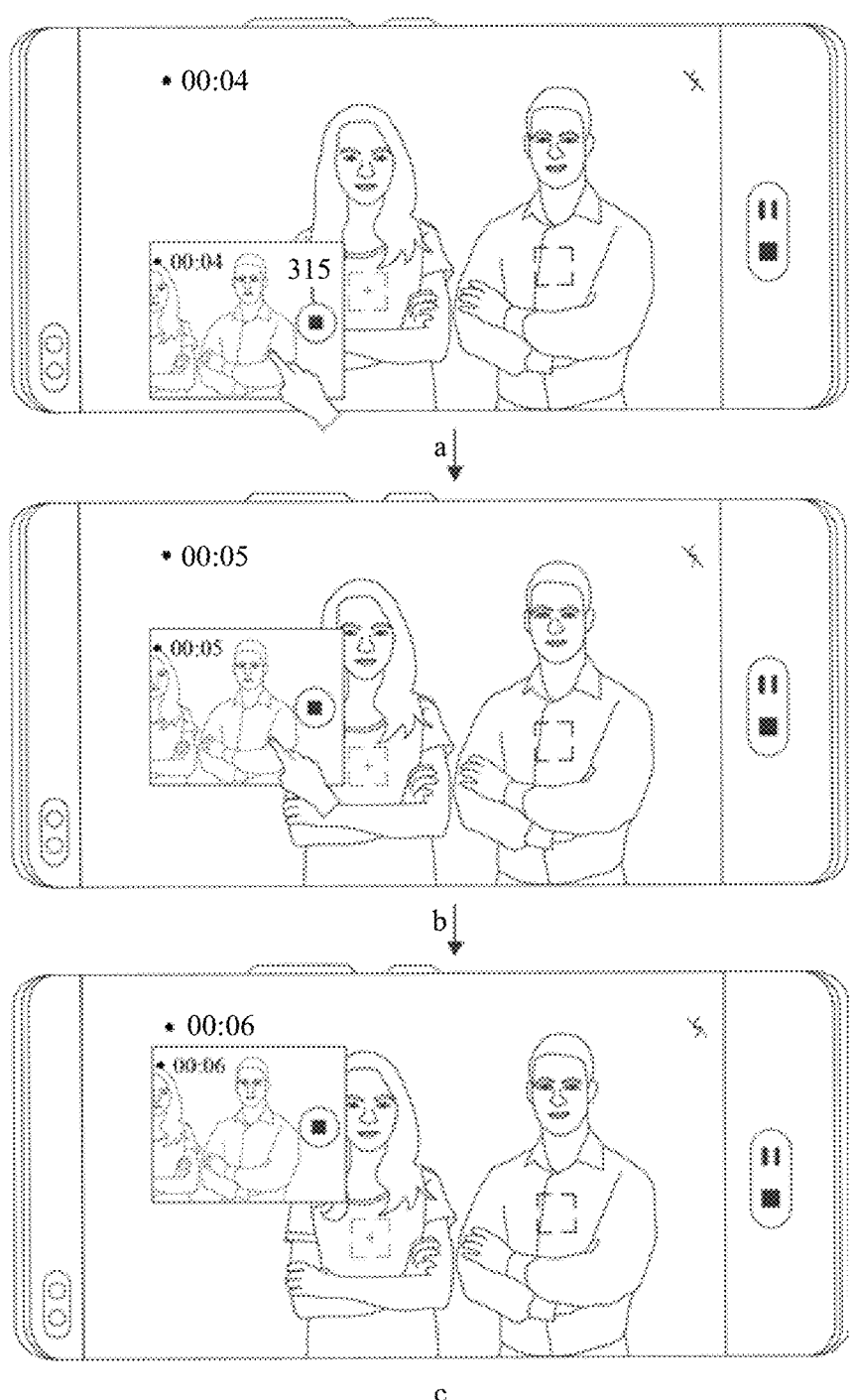
Figure 3H:
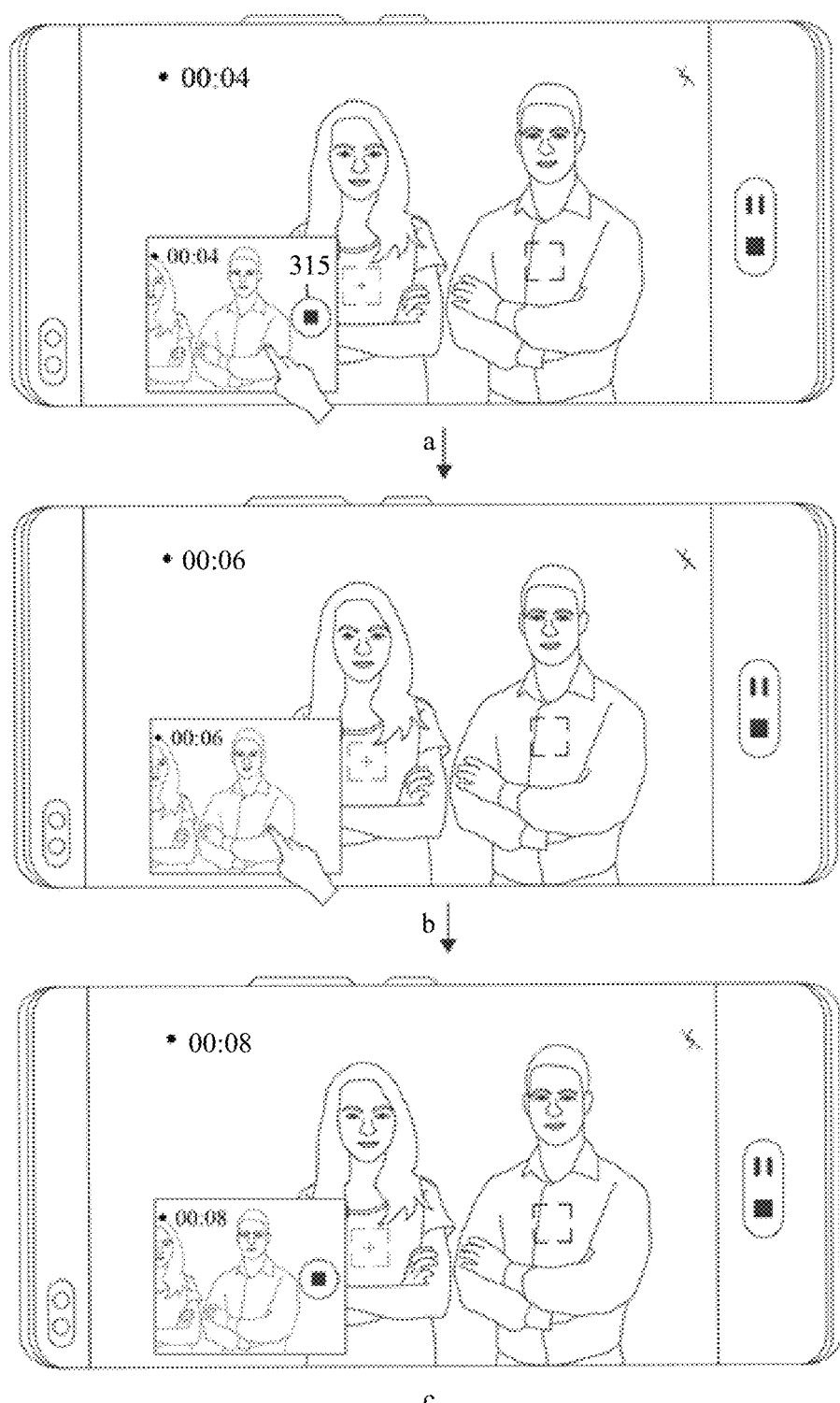

For example, FIG. 3E is a schematic diagram of a scenario in which an end small-window recording button is used in the small window in the recording mode of the protagonist mode.

The small window in the recording mode includes an end small-window recording button 315. The electronic device may end, based on an operation performed by the user on the end small-window recording button 315, recording of the small window at any time in a process of recording the small window. For example, in an interface a in FIG. 3E, when the large window is recorded to the 4$^{th}$ second, the electronic device receives a tap operation performed by the user on the end small-window recording button 315 in the small window, and the electronic device may enter an interface shown in b in FIG. 3E. In the interface b in FIG. 3E, the small window is closed, there is no selected focus tracking object in the large window, and the tracking box 311 resumes a style when the tracking box is not selected. In this case, the small window has ended recording, and the electronic device may save a video recorded in the small window. After a period of time, as shown in an interface shown in c in FIG. 3E, the electronic device receives a tap operation for the tracking box 311 when the large window is recorded to the 7$^{th}$ second, and the electronic device may enter an interface shown in d in FIG. 3E. The interface d in FIG. 3E may include a small window, and the small window starts recording a video. The recorded video in d in FIG. 3E may be different from the video whose recording is ended in a in FIG. 3E. For example, the electronic device saves a first segment of 4 s-video when small-window recording ends at the 4$^{th}$ second. At the 7$^{th}$ second, the electronic device selects a focus tracking object, and the small window starts to record a second segment of video.

It may be understood that the end small-window recording button 315 in the small window may control recording of the small window. However, recording of the small window does not affect recording of the large window, that is, when the electronic device performs the process shown in FIG. 3E, the large window keeps recording.

In addition, in the recording mode of the protagonist mode, the electronic device may also set a memory mechanism. When recording of the small window is restarted within 15 minutes, a style of a current small window is the same as a style of a previous small window. For example, in a in FIG. 3E and d in FIG. 3E, the small windows are the same in terms of position, size, landscape and portrait recording, and the like. For the memory mechanism, refer to the description in FIG. 2F(1) to FIG. 2F(4). Details are not described herein again.

In the recording mode of the protagonist mode, when the electronic device starts small-window recording, the user may further adjust a specification of the small window. For example, the user may adjust the specification of the small window by using two fingers. The electronic device may detect positions at which the user taps the display screen by using the two fingers, and control zoom in and out of the small window according to a distance between the two tap positions. An adjustment process of the specification of the small window may be as shown in a to c in FIG. 3F. For the adjustment process of the small window herein, refer to the description in FIG. 2D. Details are not described herein again. It may be understood that in an adjustment period of the small window, recording of the large window and recording of the small window are not affected.

It should be noted that, in a possible implementation, when the electronic device adjusts the specification of the small window in the recording mode of the protagonist mode, the recording picture of the small window may be correspondingly zoomed in and out. For example, in a process of zooming in the small window, the recording picture of the small window does not change, but is correspondingly zoomed in, so that the user can clearly browse the picture in the recording process of the small window. In this case, adjustment of the small window in the recording process does not affect video recording of the small window, that is, in a video playback process of the small window, a discontinuous picture that is suddenly zoomed in or out does not appear. In this method, watchability of the recording process is improved, and smoothness of video playback is not affected.

In another possible implementation, when the electronic device adjusts the specification of the small window, the preview picture of the small window is zoomed in and out relative to the large window. For example, in the process of zooming in the small window, the preview picture of the small window changes, and recording content in the small window increases. That is, in the video playback process of the small window, content in the picture increases, and the focus tracking object correspondingly becomes smaller. In this method, the user may adjust a display proportion of the focus tracking object in the small-window video based on zoom in and out of the small window, so that the focus tracking object can be better displayed, thereby improving recording experience of the user.

In the recording mode of the protagonist mode, the electronic device may further adjust a display position of the small window.

For example, the user may adjust the display position of the small window by using a long press and drag operation. The electronic device may detect an operation that the user taps and drags the small window, the position of the small window may be adjusted in the large window according to movement of the finger of the user, and an adjustment process of the position of the small window may be shown in a to c in FIG. 3G. For the adjustment process of the small window herein, refer to the description in FIG. 2E. Details are not described herein again. It may be understood that in an adjustment period of the small window, recording of the large window and recording of the small window are not affected.

Optionally, in the recording mode of the protagonist mode, when the user adjusts the size and the position of the small window, the electronic device may also hide a button in the small window. For example, when detecting that a finger contacts the display screen, the electronic device hides the end small-window recording button 315 in FIG. 3G. In this way, the user can be prevented triggering the button by mistake to cause the small window to end recording.

In the recording mode of the protagonist mode, when starting small-window recording, the electronic device may set a hidden mode to improve recording experience of the user. For example, as shown in a in FIG. 3H, the small window includes recording time and an end small-window recording button 315. When the electronic device receives that the user taps a non-function region of the small window, the end small-window recording button 315 of the small window is hidden, as shown in b in FIG. 3H. When the electronic device receives again that the user taps the small window, the electronic device may enter an interface shown in c in FIG. 3H. In the interface c in FIG. 3H, the end small-window recording button is resumed.

Optionally, when the electronic device does not receive a tap operation within a specific period of time, the small window may automatically hide the button, and the large window may hide the tracking box. For example, the time may be set to 5 s. When the electronic device in the hidden mode receives a tap operation, hidden content is resumed for display. In this way, in the recording process, shielding of the recording picture by the button can be reduced, and the user can experience the recording process immersively, thereby improving recording experience of the user.

3. Switch a Focus Tracking Object in the Recording Mode in the Protagonist Mode (FIG. 3I)

Figure 3I:
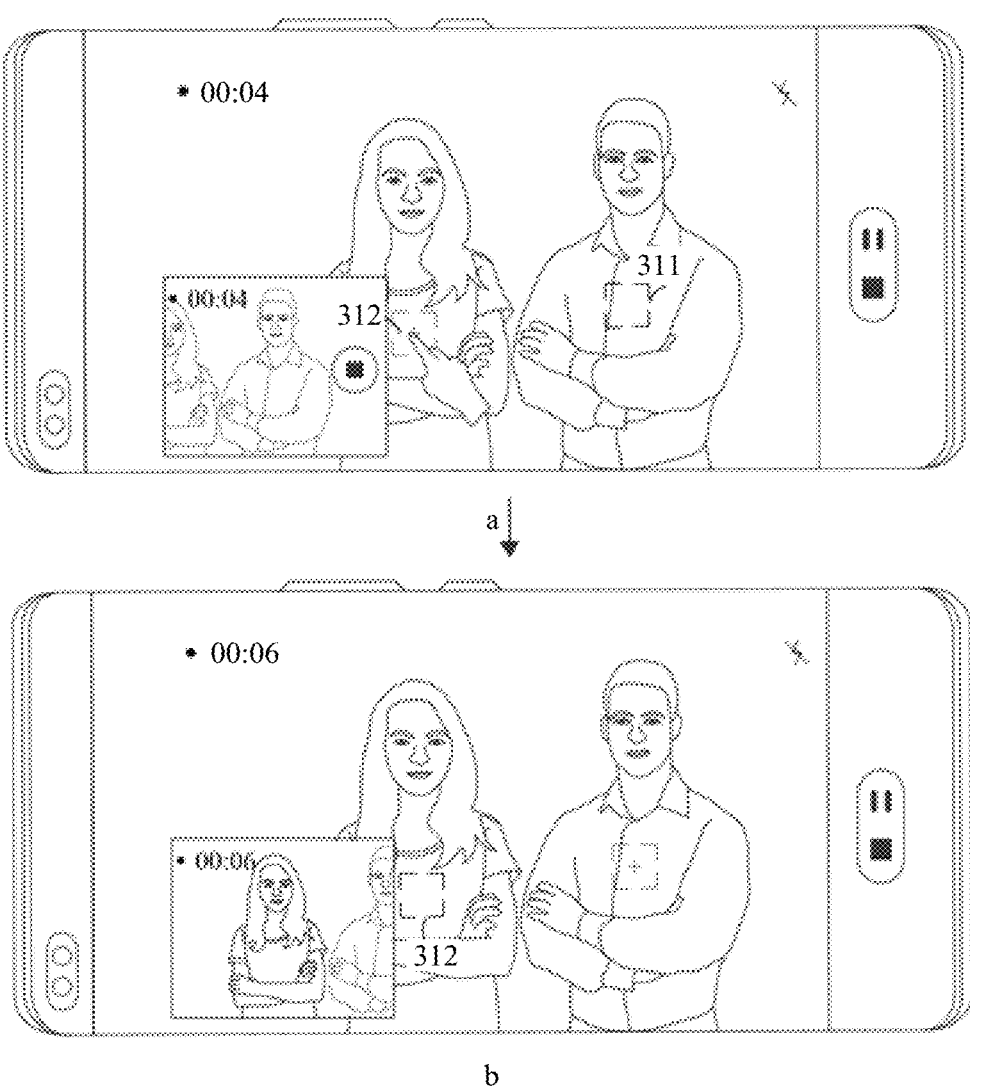

An embodiment of this application further provides a method for switching a focus tracking object in the recording mode of the protagonist mode, as shown in FIG. 3I. For example, in an interface a in FIG. 3I, in a recording scenario of the protagonist mode, a focus tracking object in a large window is a male person, and a tracking box 311 corresponding to the male person is highlighted. A recording picture of the male person is displayed in a small window. When detecting an operation that the user taps a tracking box 312 corresponding to a female person, the electronic device enters an interface b in FIG. 3I. The electronic device changes the focus tracking object from the male person to the female person. In the interface b in FIG. 3I, the focus tracking object in the large window is the female person, and the tracking box 312 corresponding to the female person is highlighted. A recording picture of the female person is displayed in the small window.

Optionally, when switching the focus tracking object in the recording mode, the electronic device may also set a dynamic special effect, so as to improve smoothness of the recording picture in a switching process of the focus tracking object. For the dynamic special effect, refer to the description in FIG. 2C. Details are not described in this embodiment of this application.

The embodiments of this application provide several scenarios for flexibly adjusting the recording picture of the small window, so as to improve user experience in the recording process.

4. Pause Recording (FIG. 3J)

According to a recording method provided in this embodiment of this application, in the recording mode of the protagonist mode, the electronic device may provide a pause recording function.

Figure 3J:
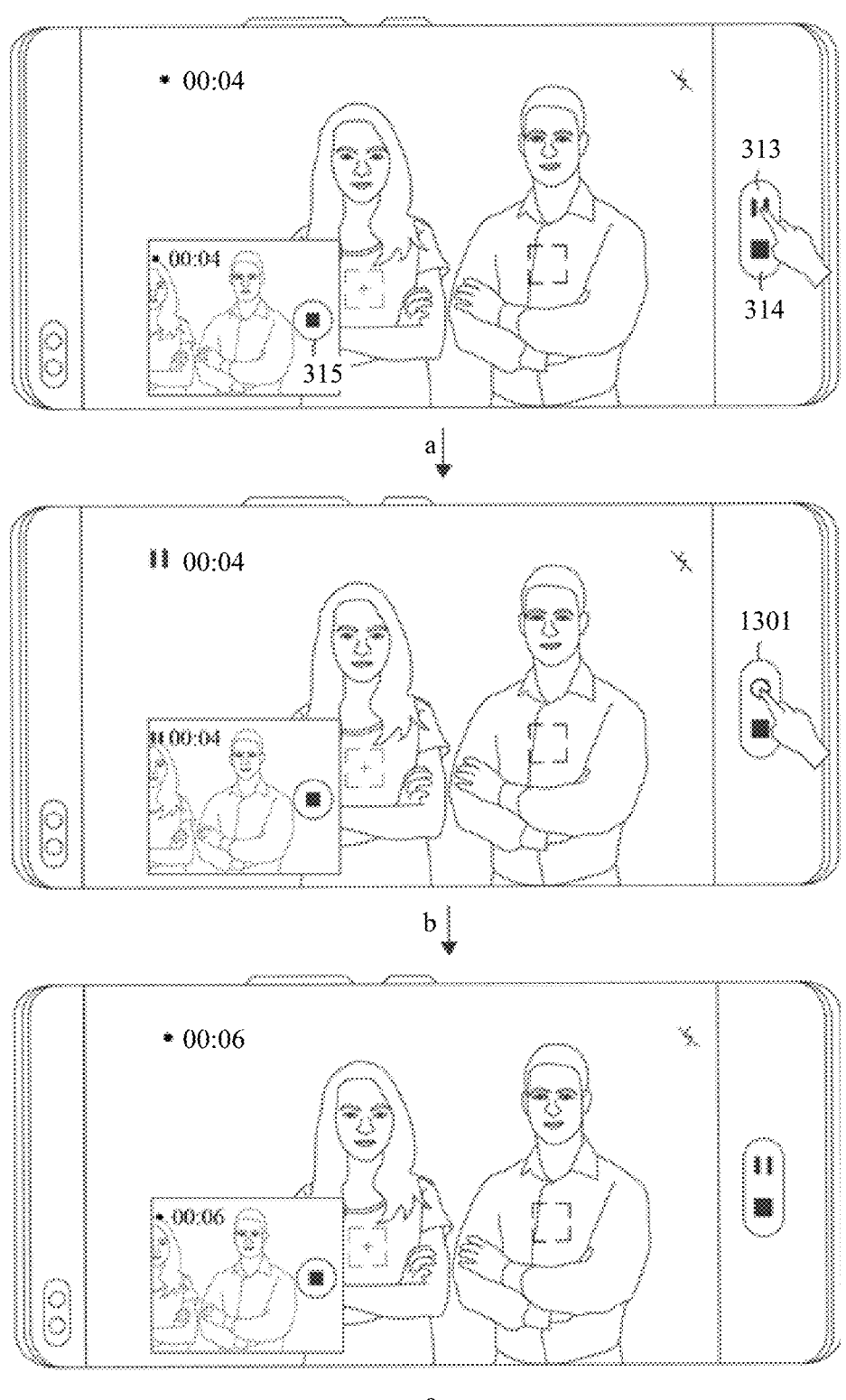

For example, as shown in an interface a in FIG. 3J, the electronic device is in a recording process, and a large window may include a pause recording button 313, an end recording button 314, and recording time of the large window. A small window may include an end small-window recording button 315 and recording time of the small window. When the electronic device receives a tap operation on the pause recording button 313, the electronic device enters an interface shown in b in FIG. 3J. In the interface b in FIG. 3J, recording of both the large window and the small window is paused. The pause recording button 313 changes to a continue recording button 1301. The continue recording button 1301 is configured to instruct the electronic device to continue recording a current video in a paused state. In the large window and the small window, the recording time is time at which the electronic device pauses recording, and the recording time when recording is paused may be a combination of "||" and time. When the electronic device receives a tap operation for the continue recording button 1301, the large window and the small window of the electronic device resume recording at the same time, as shown in c in FIG. 3J.

It should be noted that, during a recording pause period of the electronic device, the large window may display in real time an image obtained by the camera, and the small window may display in real time an image of a focus tracking object. However, the electronic device does not save the images displayed in the large window and the small window.

It may be understood that the video after being paused and the video before being paused in the large window are a same video, and the video after being paused and the video before being paused in the small window are also a same video. For example, the user taps the pause recording button at the $4^{th}$ second, the electronic device responds to the tap operation and pauses video recording, and the video recording time is 4 s. After a period of time, when the electronic device receives a tap operation for the continue recording button, the electronic device starts recording the $5^{th}$-second video on a basis of the 4 s-video.

5. A Focus Tracking Target is Lost in the Recording Mode in the Protagonist Mode (FIG. 3K and FIG. 3L)

In the recording mode of the protagonist mode, a case in which a focus tracking object is lost may occur in a recording process of the electronic device. The following describes a processing method when a focus tracking object is lost in a recording process with reference to FIG. 3K and FIG. 3L.

Figure 3K:
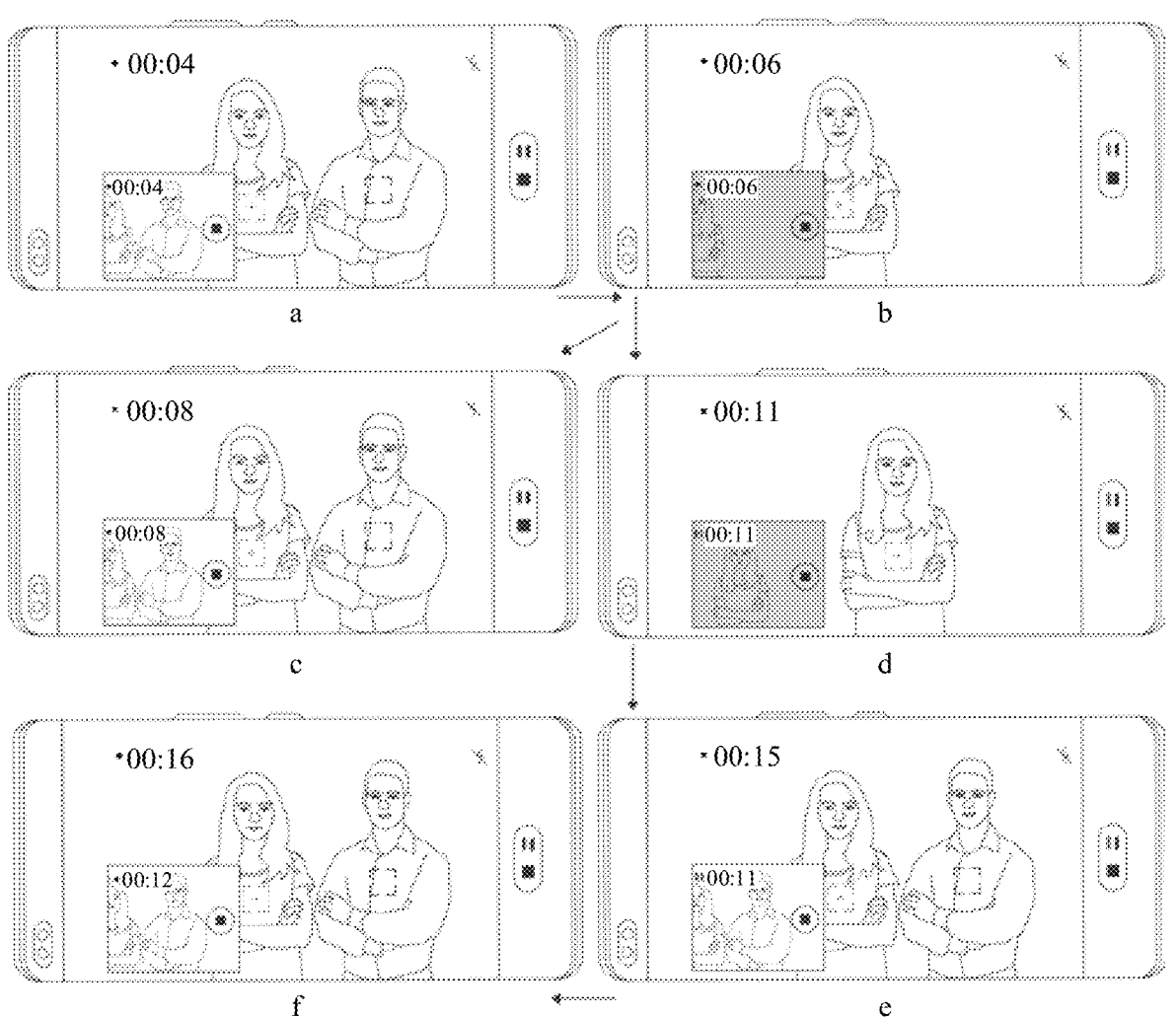
Figure 3L:
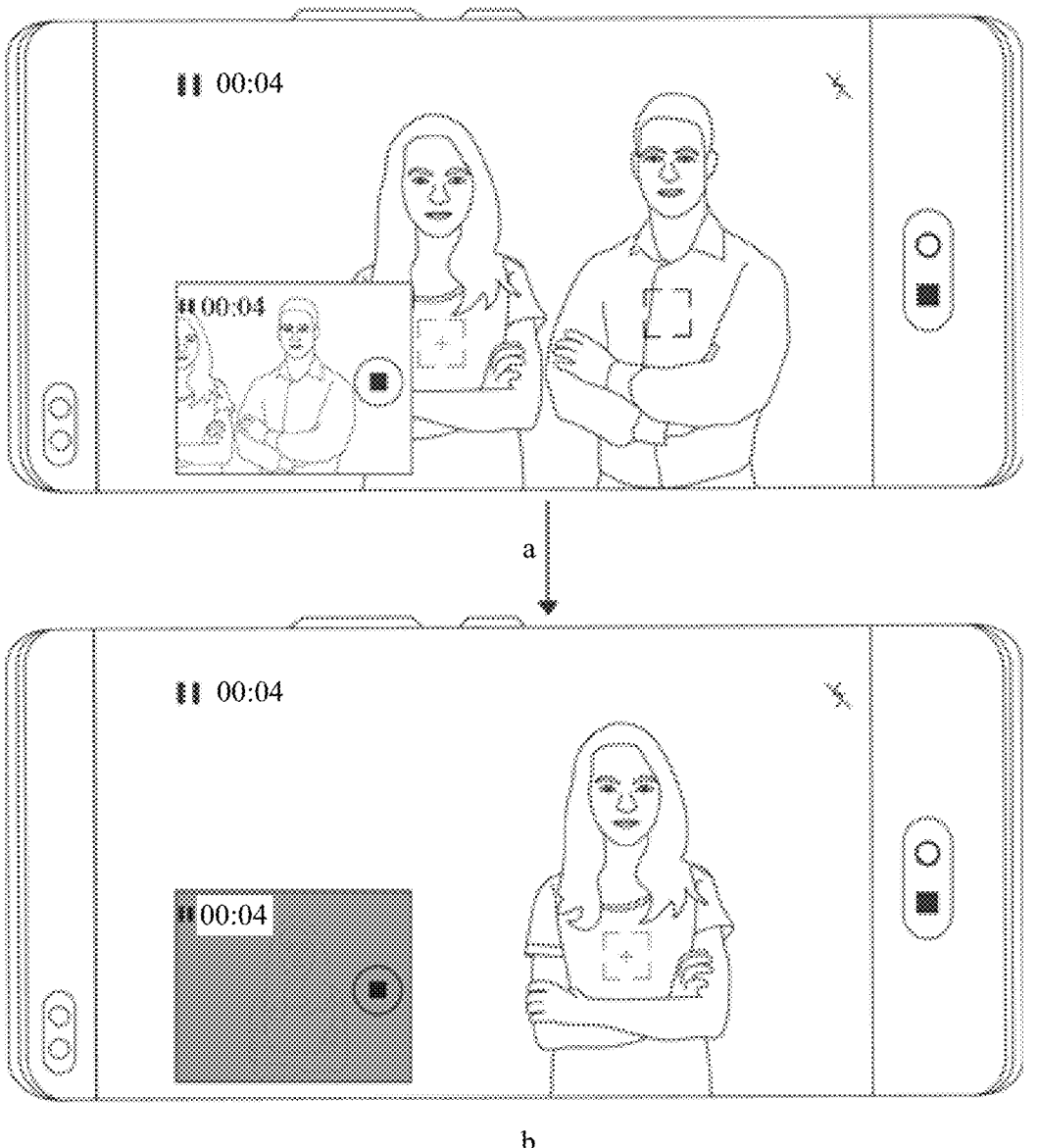

For example, as shown in an interface shown in a in FIG. 3K, both a large window and a small window of the electronic device are performing recording, and the small window includes a focus tracking object. When the electronic device cannot recognize a focus tracking object in the large window as shown in b in FIG. 3K, the focus tracking object in the small window is also lost, and the small window keeps recording and is in a masked state. In some embodiments, after the focus tracking object is lost, the small window may continue to record a picture at a position before the focus tracking object is lost. The recording picture may be a scenery shot that does not include the focus tracking object, and recording time may be 5 s. If the electronic device re-recognizes a focus tracking object within 5 s after the focus tracking object is lost, the electronic device enters an interface shown in c in FIG. 3K, and the small window keeps the state before the focus tracking object is lost. In this scenario, loss of the focus tracking object does not affect a focus tracking video of the small window, and the small window keeps recording. When the focus tracking object is regained and recording is resumed, the electronic device may edit the video before the focus tracking object is lost in the small window, a scenery shot video, and the video after the focus tracking object is regained. In a possible implementation, the electronic device may delete the scenery shot, and splice the video before the focus tracking object is lost and the video after the focus tracking object is regained, to combine them into one video. In another possible implementation, the electronic device may perform processing such as blurring, soft focusing, and adding a mask layer to the scenery shot video, so as to reduce impact of the scenery shot video on overall video coherence, and improve experience of subsequently viewing a recorded video by the user.

If the electronic device does not recognize the focus tracking object within 5 s after the focus tracking object is lost, the electronic device enters an interface shown in d in FIG. 3K from the interface shown in b in FIG. 3K. In the interface d in FIG. 3K, the electronic device continues recording of the large window, and pauses recording of the small window, where the small window may still present a masked state. For example, if the electronic device does not detect a focus tracking object at the 6$^{th}$ second and does not recognize a focus tracking object within subsequent 5 s, the electronic device pauses recording of the small window at the 11$^{th}$ second, and recording of the large window is not interfered with. In this scenario, if the electronic device does not regain a focus tracking object or does not end small-window recording, the small window is always in the paused state and presents a mask layer. Alternatively, the electronic device may end small-window recording and no longer displays the small window and content in the small window on the recording interface of the large window.

It should be noted that when recording of the small window of the electronic device is paused, the small window may continuously track a picture at a relative position in the large window, but the electronic device does not record the small window. Alternatively, when the electronic device pauses recording of the small window, the small window displays a static picture of the last frame during recording, and the small window does not track to display the picture at the relative position in the large window.

When the electronic device does not regain the focus tracking object within 5 s after the focus tracking object is lost, and the small window stops recording, the recording interface of the electronic device is shown in d in FIG. 3K. In a pause process of recording of the small window, the electronic device recognizes a focus tracking object, and the small window may automatically resume recording, to enter interfaces shown in e and f in FIG. 3K. For example, the electronic device pauses small-window recording at the 11$^{th}$ second. At the 15$^{th}$ second, the electronic device recognizes a focus tracking object and resumes small-window recording. In this case, the small window may continue recording the 12$^{th}$-second video on a basis of the 11 s-video.

When the electronic device encounters loss of a focus tracking object in the recording mode of the small window, the foregoing process may be performed. In another possible scenario, the electronic device may experience a case in which a focus tracking object is lost when large-window recording is paused, as shown in FIG. 3L.

For example, an interface a in FIG. 3L may be an interface that is entered when the electronic device detects a tap operation for the pause recording button in the large window, and the large window and the small window are in a recording paused state at the same time. When the electronic device pauses recording, the electronic device may be in a preview state, that is, a preview picture of a focus tracking object may be continuously tracked by the large window and the small window, but recording is not performed. In a phase in which the electronic device stops recording and performs previewing, a case in which the electronic device cannot detect a focus tracking object may occur, as shown in b in FIG. 3L. The electronic device may enter the interface b in FIG. 3L when no focus tracking object is identified. In the interface b in FIG. 3L, the small window automatically presents a masked state. The masked state may prompt the user that the focus tracking object is lost. The electronic device needs to regain the focus tracking object or reselect a focus tracking object to resume recording.

Optionally, in a possible implementation, in the interface b in FIG. 3L, the small window is in a recording paused state and presents a mask layer. If the electronic device does not regain the focus tracking object or does not end/continues recording, the masked state of the small window always exists.

The embodiments of this application provide several scenarios in which a focus tracking object is lost in the recording mode in the protagonist mode. The electronic device can perform a corresponding processing method for the scenario, so as to reduce impact of loss of a focus tracking object on the recording process and improve recording experience of the user.

IV. End Recording and Exit the Protagonist Mode (FIG. 3M)

When the user does not need to use the protagonist mode, the user can choose to exit the protagonist mode and resume the normal video mode. The following describes, with reference to FIG. 3M, a scenario in which the protagonist mode is exited according to an embodiment of this application, as shown in FIG. 3M.

Figure 3M:
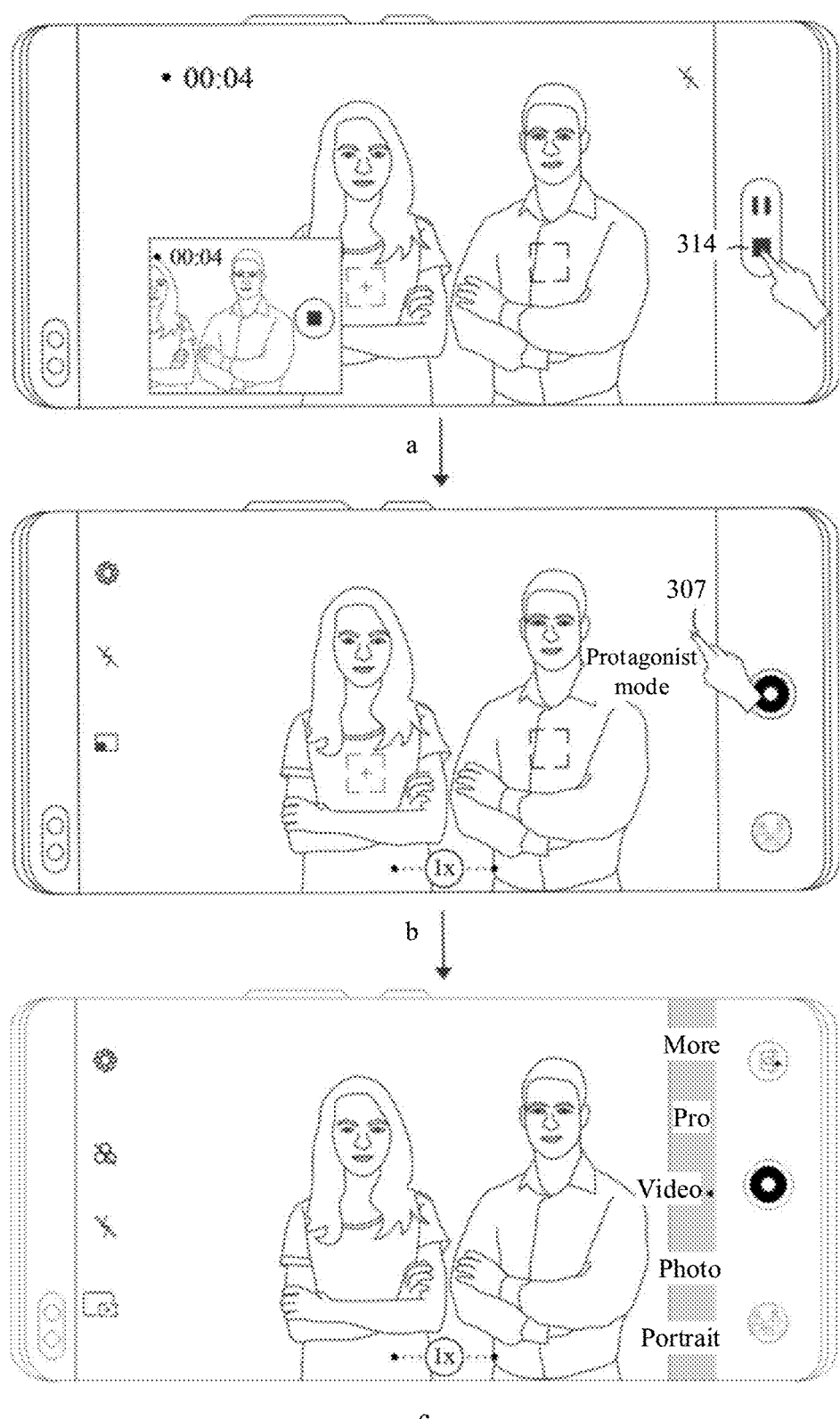

For example, when the electronic device receives a tap operation on an end recording button 314 in an interface a in FIG. 3M, the electronic device may simultaneously end recording of a large window and recording of a small window, and enter an interface b in FIG. 3M. When the electronic device ends recording, a video recorded in the large window and a video recorded in the small window may be saved at the same time. The electronic device may save the two videos in a same path, or may save the two videos in different paths. For example, the video of the large window and the video of the small window may be saved in a folder of an album, or the video of the large window may be saved in a normal path, and the video of the small window is saved in a folder of the protagonist mode in the album. Saving paths of the two videos are not limited in this embodiment of this application.

In the interface b in FIG. 3M, the large window and the small window have ended recording and resumed the preview mode. When receiving a tap operation for an exit protagonist mode button 307, the electronic device enters an interface shown in c in FIG. 3M. The electronic device resumes the normal video mode. Certainly, after detecting a tap operation for the end recording button 314 on the interface a in FIG. 3M, the electronic device may directly exit the protagonist mode, and display an interface shown in c in FIG. 3M. Alternatively, the user may trigger, by using a gesture or the like, the electronic device to exit the protagonist mode, which is not limited in this embodiment of this application.

V. View a Large-Window Video and a Small-Window Video Shot in the Protagonist mode (FIG. 3N)

Optionally, the user may browse, based on an album of a camera application, a video recorded in a large window and a plurality of videos recorded in a small window. A display sequence of the plurality of videos may be a recording sequence of the videos, that is, the electronic device may sort the videos according to end time points or start time points of the recorded videos. The display sequence of the plurality of videos may alternatively be a reversed recording sequence of the videos, that is, the electronic device may perform reversed sorting according to the end time or the start time of the recorded videos.

Optionally, the video recorded in the large window and the video recorded in the small window may be displayed in video thumbnails of a same album interface. To facilitate distinguishing between the video recorded in the large window and the video recorded in the small window, the electronic device may set an identifier for the video recorded in the small window. For example, the electronic device may add an outer border, a font, a graph, and the like to the video recorded in the small window. The electronic device may further set a size of a video thumbnail recorded in the small window, so that a size difference exists between the video thumbnail recorded in the small window and a video thumbnail recorded in the large window. It may be understood that a form of a video thumbnail in the album is not limited in this embodiment of this application.

Figure 3N:
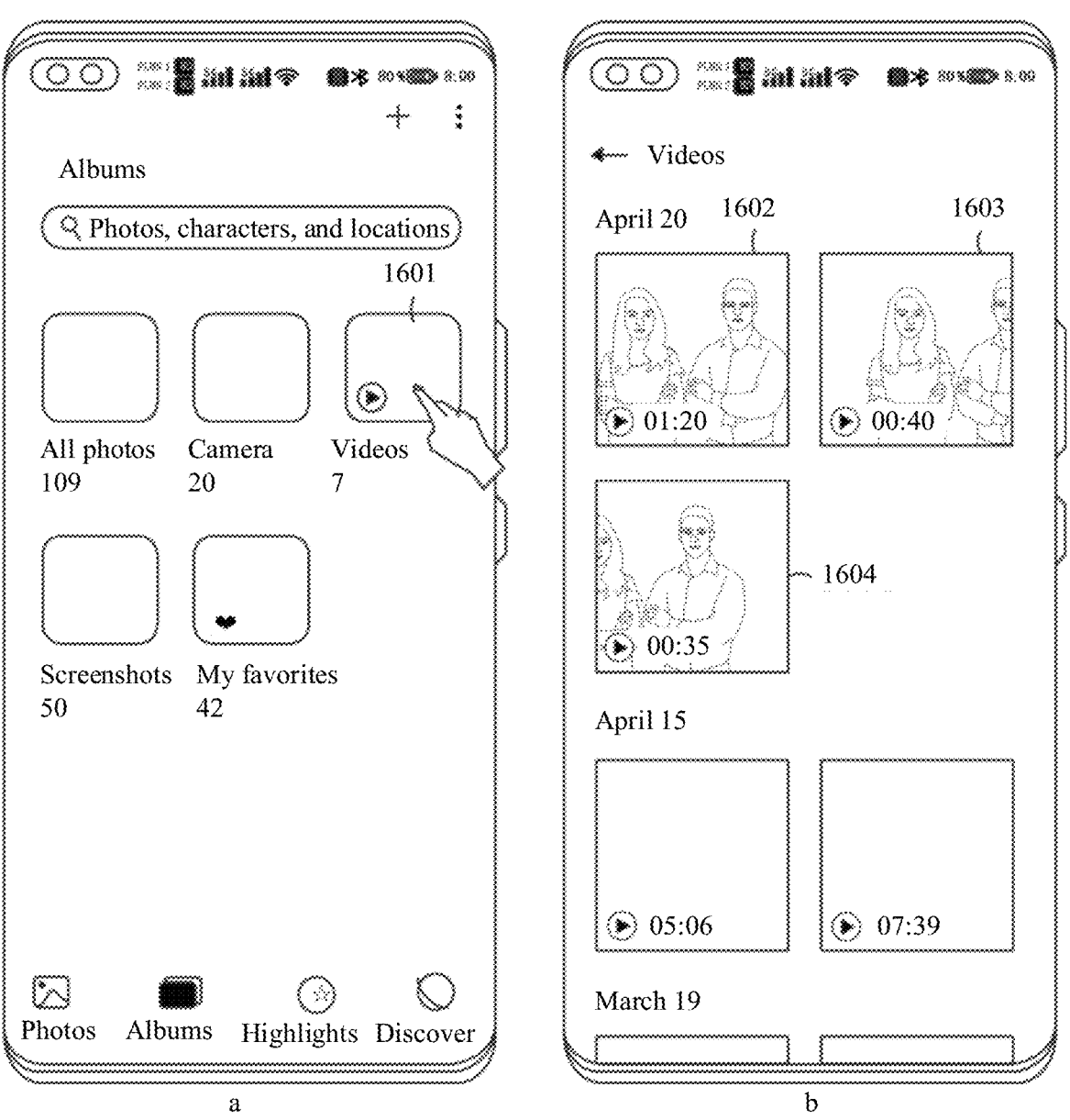

For example, an arrangement sequence of video thumbnails may be shown in FIG. 3N. The user may browse the recorded video based on an interface shown in a in FIG. 3N. When the electronic device detects a tap operation for a video icon 1601, the electronic device enters an interface shown in b in FIG. 3N. The interface b in FIG. 3N may display a currently recorded video thumbnail, where a video 1602, a video 1603, and a video 1604 may be a plurality of videos obtained by performing video recording using the protagonist mode once. The following describes a video sequence with reference to a specific recording scenario.

For example, the electronic device performs recording based on the protagonist mode, a recording interface includes a large window and a small window, a male person and a female person are displayed in the large window, and the male person is displayed in the small window. When the electronic device detects a tap operation for a start recording button, the large window of the electronic device records a video 1602 that includes the male person and the female person, and the small window records a video 1604 that performs focus tracking on the male person. When the video 1604 is recorded to the 35$^{th}$ second, the electronic device detects a tap operation for an end small-window recording button, and the electronic device ends recording the video 1604 and saves the video 1604. The large window continuously records the video 1602. After 5 s, the electronic device detects a tap operation for a tracking box of the female person, and the small window of the electronic device records a video 1603 that performs focus tracking on the female person. When the video 1602 in the large window is recorded to the 80$^{th}$ second, the electronic device detects a tap operation for an end recording button, the electronic device ends recording the video 1603 and the video 1604, and successively saves the video 1603 and the video 1602.

In the foregoing recording scenario, the electronic device performs video recording using the protagonist mode once, to obtain three videos. The electronic device may save the videos according to time at which the three videos end successively, and a video that is first saved is arranged at a rear position on the interface b in FIG. 3N. For example, a saving sequence of the videos is the video 1604, the video 1603, and the video 1602. An arrangement sequence of video thumbnails is reversed to the saving sequence, and is the video 1602, the video 1603, and the video 1604.

It may be understood that this embodiment of this application describes an example of an arrangement sequence of video thumbnails and a saving sequence of videos, which is not limited in this embodiment of this application.

It may be understood that a video recorded in a large window may include an image and sound, and a video recorded in a small window may also include an image and sound. For example, when the electronic device clips a recording picture of the small window from the image of the large window, so as to obtain the video of the small window, the electronic device may further synchronize the sound to the video of the small window.

This embodiment of this application provides a scenario in which the protagonist mode is exited, and the electronic device can switch between normal video recording and video recording in the protagonist mode. The user can select normal video recording and video recording in the protagonist mode according to a requirement of the user, thereby improving user experience.

It should be noted that the foregoing user interfaces are only some examples provided in this application, and should not be considered as a limitation to this application.

The following describes an apparatus in the embodiments of this application.

Figure 4:
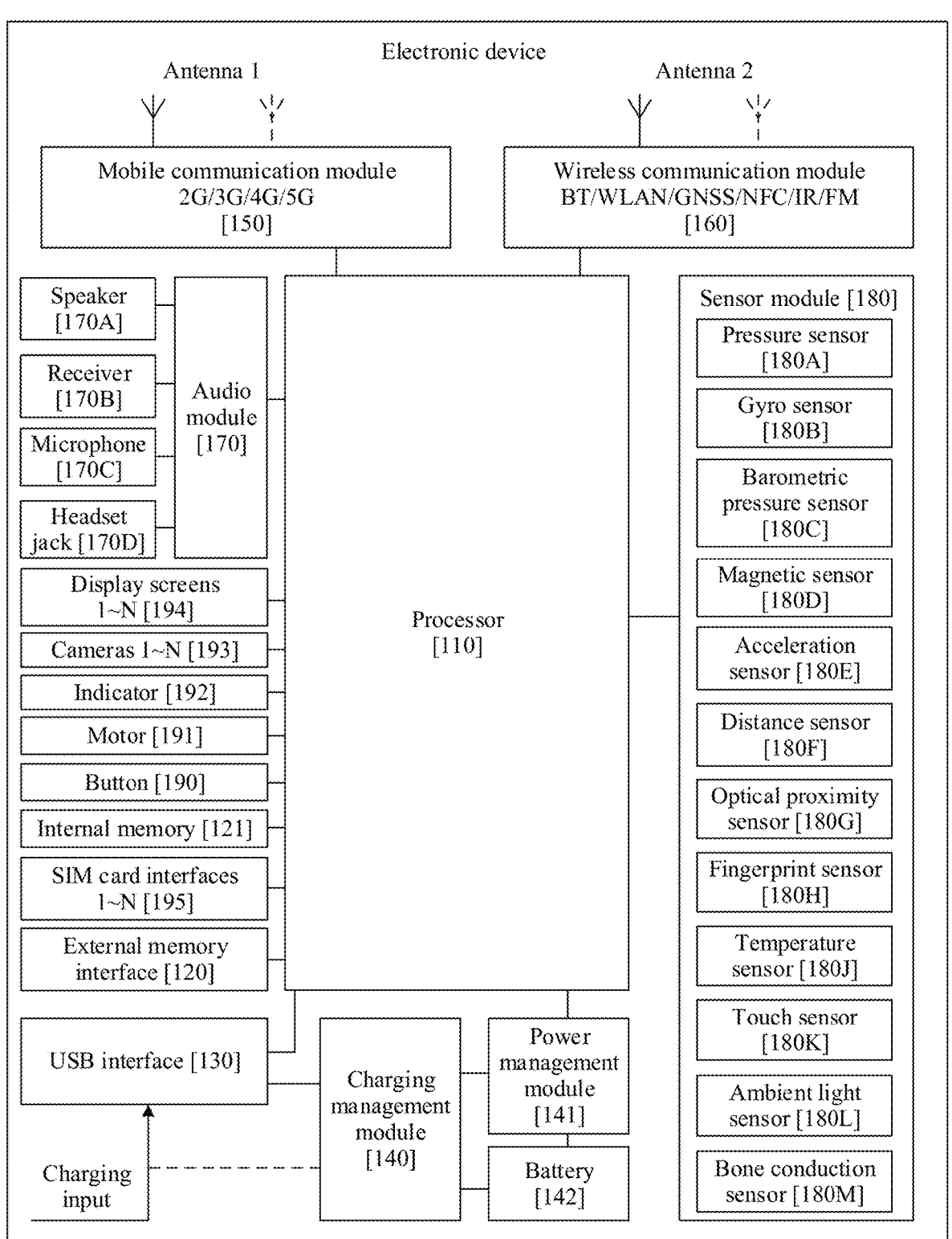
FIG. 4 is a schematic diagram of a hardware structure of an electronic device according to an embodiment of this application.

FIG. 4 is a schematic diagram of a hardware structure of an electronic device according to an embodiment of this application.

The electronic device may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (Subscriber Identification Module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device. In some other embodiments of this application, the electronic device may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, a neural-network processing unit (Neural-network Processing Unit, NPU), and/or the like. Different processing units may be separate devices, or may be integrated into one or more processors. The controller may be a nerve center and a command center of the electronic device. The controller may generate an operation control signal based on an instruction operation code and a time sequence signal, so as to complete control over instruction fetching and instruction execution. The processor 110 may further be configured with a memory configured to store an instruction and data.

In the embodiment provided in this application, the electronic device may perform the shooting method by using the processor 110.

The internal memory 121 may be configured to store computer executable program code, and the executable program code includes an instruction. The processor 110 executes various function applications and data processing of the electronic device by running the instructions stored in the internal memory 121.

The antenna 1 and the antenna 2 are configured to transmit and receive an electromagnetic wave signal. The mobile communication module 150 may provide a solution to wireless communication such as 2G/3G/4G/5G applicable to the electronic device. The wireless communication module 160 can provide a solution for wireless communication including a wireless local area network (Wireless Local Area Network, WLAN) (such as a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication technology (Near Field Communication, NFC), an infrared technology (Infrared, IR) and the like to be applied to the electronic device.

The electronic device implements a display function through the GPU, the display screen 194, the application processor, and the like. The GPU is a microprocessor for image processing and is connected to the display screen 194 and the application processor. The GPU is configured to perform mathematical and geometric calculation, and is configured to render an image. The processor 110 may include one or more GPUs, and the GPU executes a program instruction to generate or change display information.

The display screen 194 is configured to display an image, a video, and the like, The display screen 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a Mini LED, a Micro LED, a Micro-OLED, quantum dot light emitting diodes (Quantum Dot Light Emitting Diodes, QLED), or the like. In some embodiments, the electronic device may include 1 or N display screens 194, where N is a positive integer greater than 1.

The electronic device may implement an obtaining function by using the ISP, the camera 193, the video codec, the GPU, the display screen 194, the application processor, and the like.

The ISP is configured to handle data returned by the camera 193. For example, during shooting, a shutter is opened, and light is transferred to a photosensitive element of the camera through a lens. An optical signal is converted into an electrical signal. The photosensitive element of the camera transfers the electrical signal to the ISP for processing, to convert the electrical signal into an image or a video visible to naked eyes. The ISP may further perform algorithm optimization on noise, brightness, and a color of the image. The ISP may further optimize parameters such as exposure and a color temperature of a shooting scene. In some embodiments, the ISP may be arranged in the camera 193.

The camera 193 is configured to capture a still image or video. An optical image is generated for an object by using the lens and is projected onto the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP to convert the electrical signal into a digital image or a video signal. The ISP outputs the digital image or the video signal to the DSP for processing. The DSP converts the digital image or the video signal into an image or a video signal in a standard format, for example, RGB or YUV. In some embodiments, the electronic device may include a plurality of cameras 193.

The video codec is configured to compress or decompress a digital video. The electronic device can support one or more video codecs. In this way, the electronic device may play or record videos in a plurality of coding formats, for example, moving picture experts group (Moving Picture Experts Group, MPEG) 1, MPEG2, MPEG3, and MPEG4.

The gyro sensor 180B may be configured to determine a motion posture of the electronic device. In some embodiments, the gyro sensor 180B may be configured to determine an angular velocity of the electronic device around three axes (namely, x, y, and z axes). The gyro sensor 180B may be used for image stabilization in image capture.

The acceleration sensor 180E may detect magnitudes of acceleration of the electronic device in various directions (generally on three axes). When the electronic device is static, magnitude and a direction of gravity may be detected. The acceleration sensor 180E may be further configured to recognize a posture of the electronic device, and is applied to applications such as landscape and portrait switching and a pedometer.

The touch sensor 180K is also referred to as a "touch panel". The touch sensor 180K may be disposed in the display screen 194, and the touch sensor 180K and the display screen 194 constitute a "touchscreen". The touch sensor 180K is configured to detect a touch operation on or near the touch sensor. The touch sensor may transmit the detected touch operation to the application processor, to determine a touch event type. The touch sensor 180K may provide a visual output related to the touch operation by using the display screen 194. In some other embodiments, the touch sensor 180K may alternatively be disposed on a surface of the electronic device at a position different from that of the display screen 194.

It should be noted that for a function of another unmentioned module in the electronic device shown in FIG. 4, references may be made to a related technical document, which is not described in detail in this application.

Figure 5:
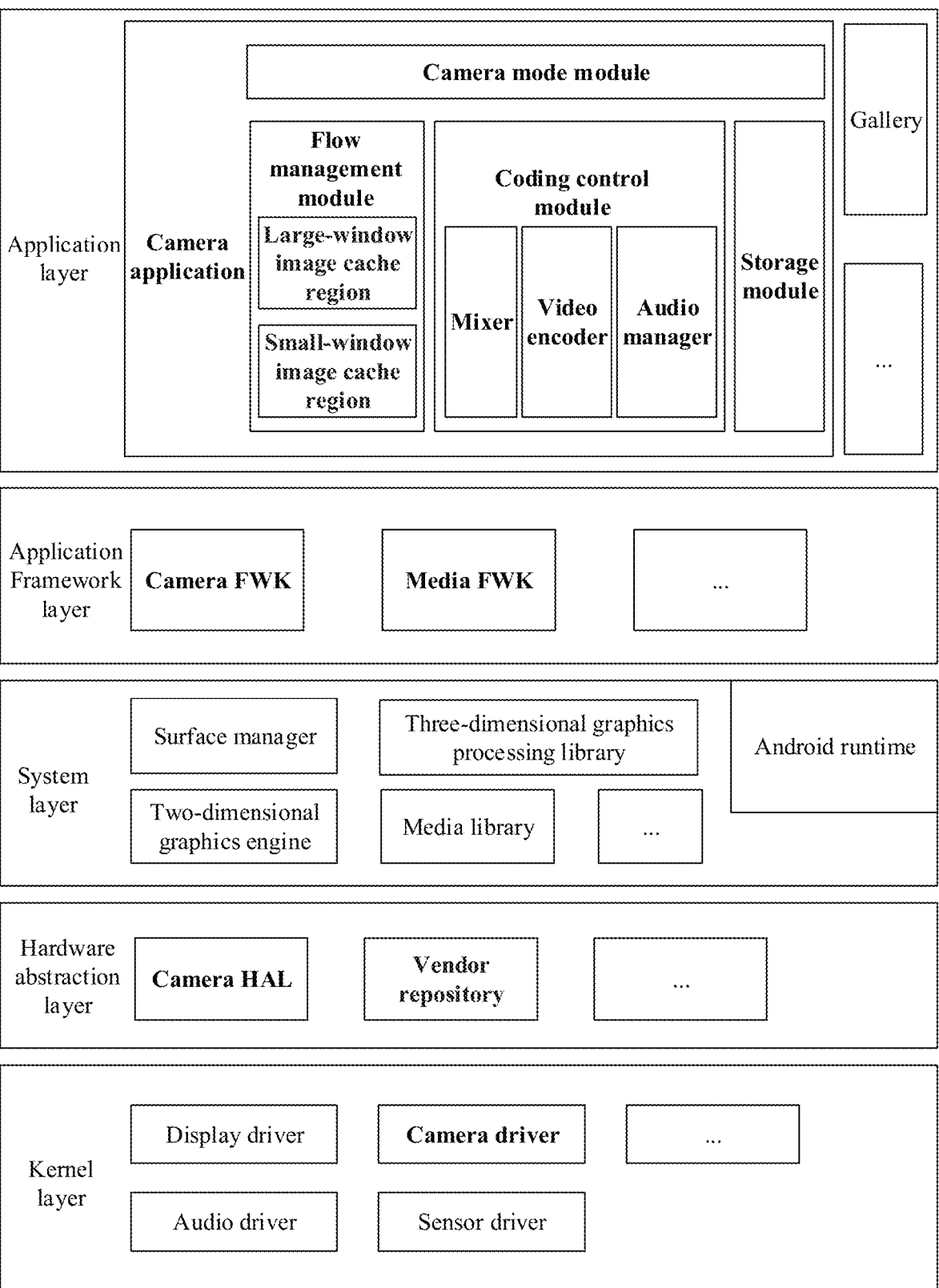
FIG. 5 is a schematic diagram of a software structure of an electronic device according to an embodiment of this application.

FIG. 5 is a schematic diagram of a software structure of an electronic device according to an embodiment of this application.

As shown in FIG. 5, a software framework of the electronic device involved in this application may include an application layer, an application framework layer (framework, FWK), a system library, an Android runtime, a hardware abstraction layer (HAL), and a kernel layer (kernel).

The application layer may include a series of application packages, such as camera, gallery, calendar, calls, map, navigation, WLAN, Bluetooth, music, videos, and messages (also referred to as applications). The camera application may be configured to obtain an image and a video.

As shown in FIG. 5, the camera application may include a camera mode module, a flow management module, a coding control module, and a storage module. The camera mode module may be configured to monitor a user operation and determine a camera mode. The camera mode may include but is not limited to a photo mode, a video preview mode, a video mode, a time-lapse mode, a burst shooting mode, and the like. The video preview mode may include a video preview mode in a focus tracking mode. The video mode may include a video mode in the focus tracking mode. The flow management module is configured to perform data flow management, for example, delivery of data flow configuration information (may be referred to as flow configuration information). The flow management module may include a data flow cache region, for example, a large-window image cache region and a small-window image cache region. The large-window image cache region and the small-window image cache region may store two pieces of image data returned by a camera HAL. The coding control module may include a mixer, a video encoder, and an audio encoder. The video encoder is configured to encode the image collected by the camera. The audio encoder is configured to encode audio collected by a device such as a sound pickup. The mixer is configured to combine an encoded image and encoded audio into a video file. The storage module is configured to store an original video and a close-up video.

The application framework layer provides an application programming interface (Application Programming Interface, API) and a programming framework for applications at the application layer. The application framework layer includes some predefined functions.

As shown in FIG. 5, the application framework layer may include a camera FWK and a media FMK. The camera FWK may provide an API interface for an application (for example, the camera application) to invoke, so as to receive a request from the application, maintain a service logic of the request in internal circulation, and finally send the request to a camera service (Camera Service) for processing by invoking a camera AIDL cross-process interface; and then wait for returning of a result from the camera service (Camera Service), so as to send the final result to the camera application. The English full name of AIDL is Android Interface Definition Language, and the Chinese meaning is an Android interface definition language. Similarly, the media FWK may provide an API interface for a corresponding application (for example, the camera application) to invoke, so as to receive a request from the application (for example, the camera application), deliver the request of the application downward, and then return the request back to the application.

It may be understood that the application framework layer may further include a window manager, a content provider, a view system, a phone manager, a resource manager, a notification manager, and the like. For specific meanings thereof, refer to the related technical documents. Details are not described herein.

The runtime (Runtime) is responsible for scheduling and managing the system. The runtime includes a kernel library and a virtual machine. The kernel library includes two parts: a performance function that a programming language (for example, Java language) needs to invoke, and a kernel library of the system.

The application layer and the application framework layer are run in the virtual machine. The virtual machine executes programming files (for example, Java files) at the application layer and the application framework layer as binary files. The virtual machine is used to perform functions such as object lifecycle management, stack management, thread management, security and exception management, and garbage collection.

The system library may include a plurality of functional modules, for example, a surface manager (Surface Manager), a media library (Media Libraries), a three-dimensional graphics processing library (for example, OpenGL ES), and a two-dimensional graphics engine (for example, SGL).

The surface manager is configured to manage a display subsystem, and provide fusion of two dimensional (2-Dimensional, 2D) and three-dimensional (3-Dimensional, 3D) layers to a plurality of applications.

The media library supports playback and recording in a plurality of commonly used audio and video formats, and static image files. The media library may support a plurality of audio and video encoding formats, for example, MPEG4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The hardware abstraction layer (HAL) is an interface layer that is located between an operating system kernel and upper layer software, and is intended to abstract hardware. The hardware abstraction layer is an abstract interface for a kernel driver of the device, and is used to provide a higher-level Java API framework with an application programming interface for accessing an underlying device. The HAL includes a plurality of library modules, such as a camera HAL, a Vendor repository, a display screen, Bluetooth, and audio. Each library module implements an interface for a specific type of hardware component. It may be understood that the camera HAL may provide an interface for the camera FWK to access a hardware component such as the camera. The Vendor repository may provide an interface for the media FWK to access a hardware component such as the encoder. When a system framework layer API requires access to hardware of a portable device, an Android operating system loads a library module for the hardware component.

The kernel layer is a foundation of the Android operating system, and a final function of the Android operating system is implemented by using the kernel layer. The kernel layer includes at least a display driver, a camera driver, an audio driver, a sensor driver, and a virtual card driver.

It should be noted that the schematic diagram of the software structure of the electronic device shown in FIG. 5 provided in this application is only an example, and does not limit specific module division in different layers of the Android operating system. For details, refer to the description of the software structure of the Android operating system in conventional technologies. In addition, the shooting method provided in this application may be further implemented based on another operating system, and examples are not provided in this application one by one.

US 12,598,372 B2

55
56

Figure 6A:
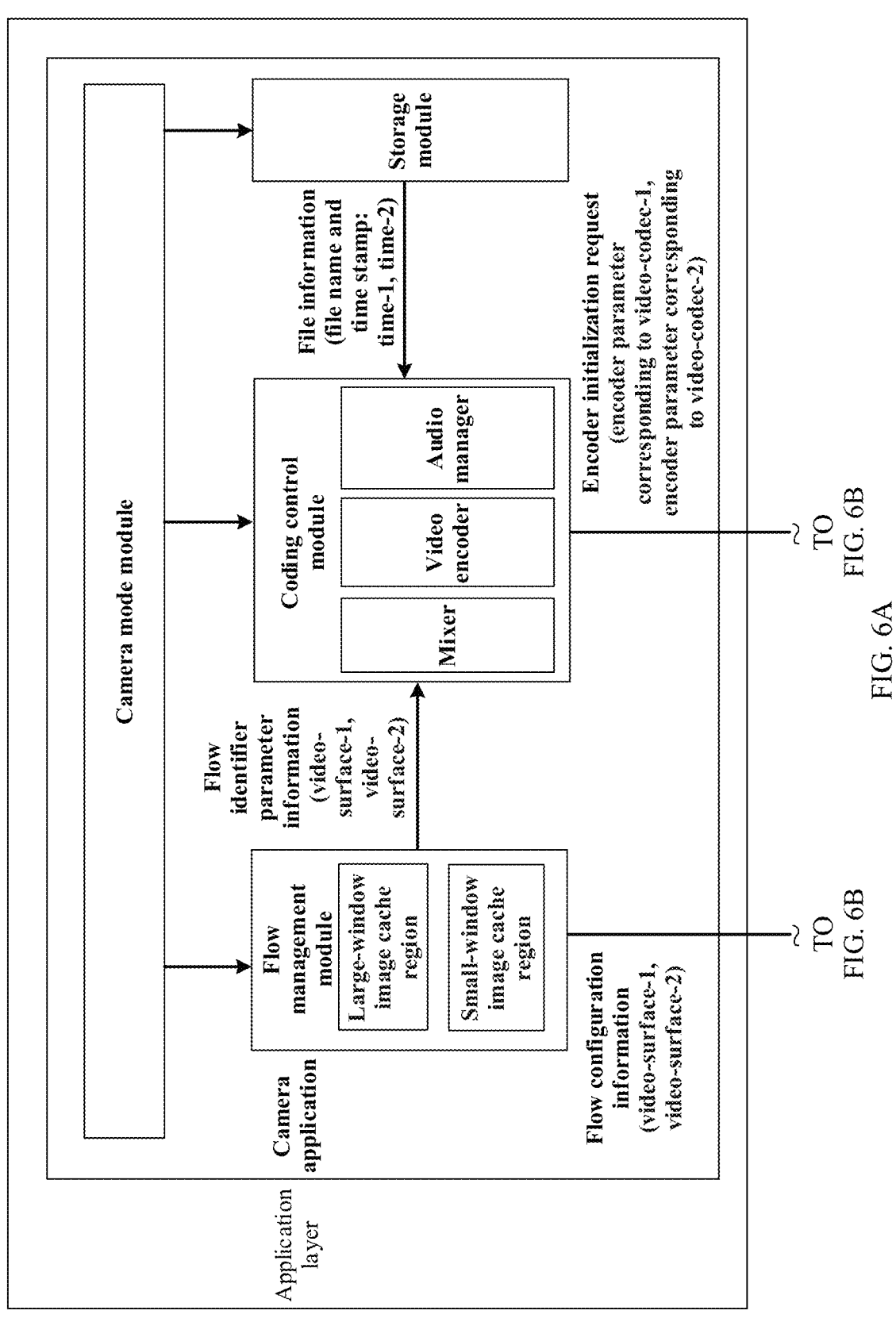
FIG. 6A and FIG. 6B are a schematic diagram of module interaction according to an embodiment of this application.
Figure 6B:
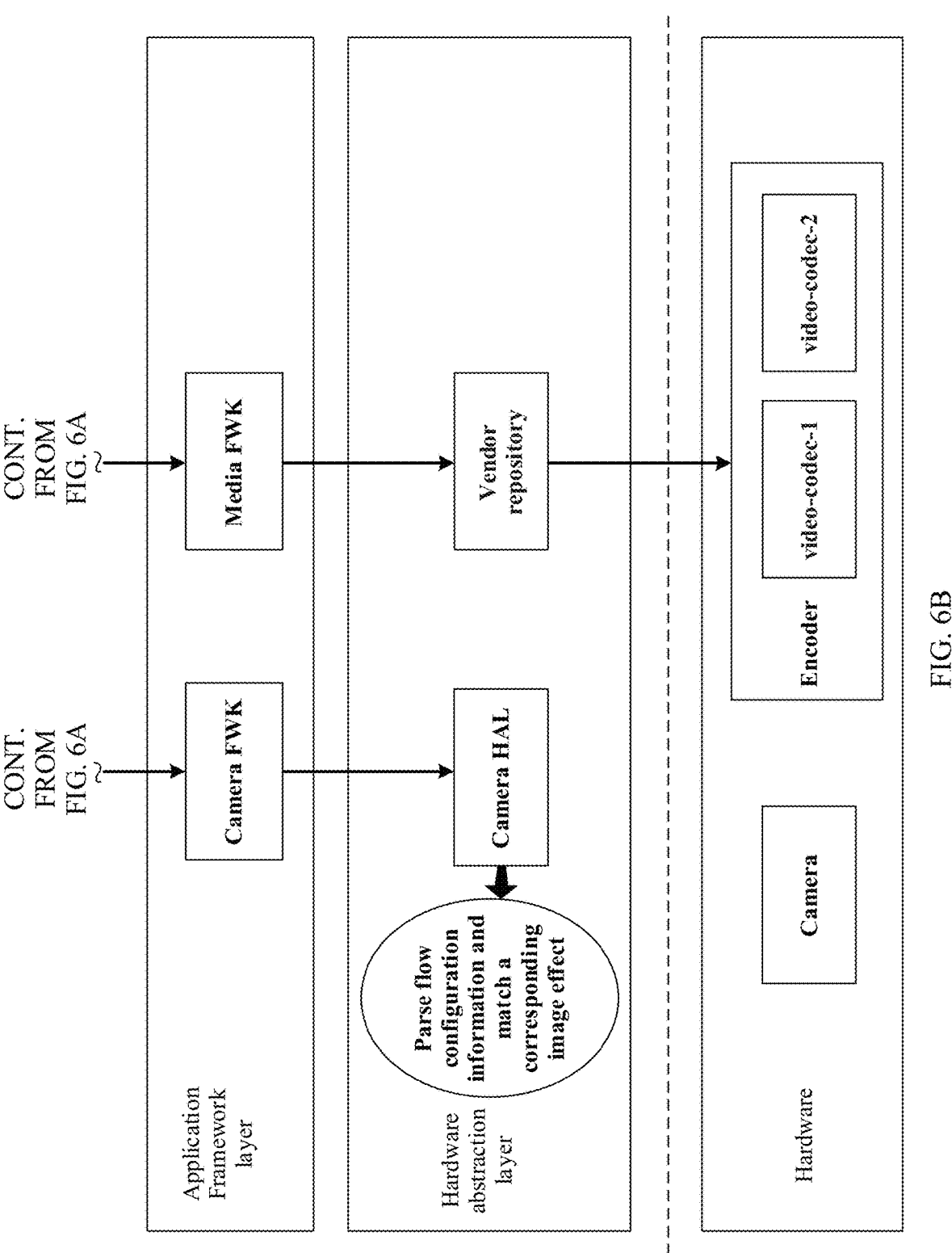

Based on the software and hardware structures of the electronic device shown in FIG. 4 and FIG. 5, the shooting method provided in the embodiments of this application is described from a perspective of software and hardware cooperation with reference to FIG. 6A and FIG. 6B.

The camera mode module may monitor a user operation acting on a focus tracking mode control (for example, the protagonist mode button 404), so as to determine that a current camera mode becomes a video preview mode in the focus tracking mode, and notify the flow management module and the storage module.

The flow management module may send flow identifiers (video-surface-1 and video-surface-2) corresponding to two configured data flows to the coding control module. The storage module may also send file information of video files corresponding to the two created data flows to the coding control module. The file information may include file names and time stamps of the video files. After receiving the flow identifiers and the file information, the coding control module may create encoders (video-codec-1 and video-codec-2), and associate the received flow identifiers and file information with corresponding encoders. Then, the coding control module may deliver an encoder initialization request.

In a subsequent process, if the user triggers video recording in the focus tracking mode, the camera HAL may process image data collected by the camera to obtain two pieces of image data with different effects. The camera HAL may return the two pieces of image data with different effects to the camera FWK. Correspondingly, the camera FWK may continue to return the two pieces of image data with different effects to the camera application, and respectively store the two pieces of image data in a large-window image cache region and a small-window image cache region of the camera application. It may be understood that the two pieces of image data with different effects may be used to preview image display in a large window and a small window, and generate corresponding videos.

The camera mode module may monitor a user operation acting on a video start control (for example, the start recording button 303), so as to determine that a current camera mode becomes a video mode in the focus tracking mode, and notify the coding control module. The coding control module controls the encoder to encode two pieces of image data in the large-window image cache region and the small-window image cache region, so as to obtain an original video and a close-up video. It may be understood that the coding control module controls the encoder to encode the image data in the small-window image cache region, so as to obtain one or more close-up videos. In some embodiments of this application, the coding control module controls the encoder to generate one original video and a plurality of close-up videos after encoding the two pieces of image data in the large-window image cache region and the small-window image cache region.

It may be understood that meanings of the large window, and the large preview window mentioned in this application are the same, and meanings of the small window, and the small preview window are the same.

The following describes specific implementations of the foregoing embodiments with reference to FIG. 7A to FIG. 11.

First, it should be noted that an electronic device may configure a preview data flow and a video data flow. Image data in the preview data flow may be displayed on a display screen of the electronic device for previewing by a user, and image data in the video data flow is saved in the electronic device for viewing by the user after video recording is completed. The data flow mentioned in this application refers to a video data flow.

It may be understood that the user may trigger enabling of a camera application (for example, the main interface shown in FIG. 2A(1), and the user may trigger the electronic device to start the camera application by using an operation acting on the camera application 401). A camera mode module may monitor the user operation, and deliver a message X1 to a camera. The message X1 is used to request to enable the camera.

Figure 7A:
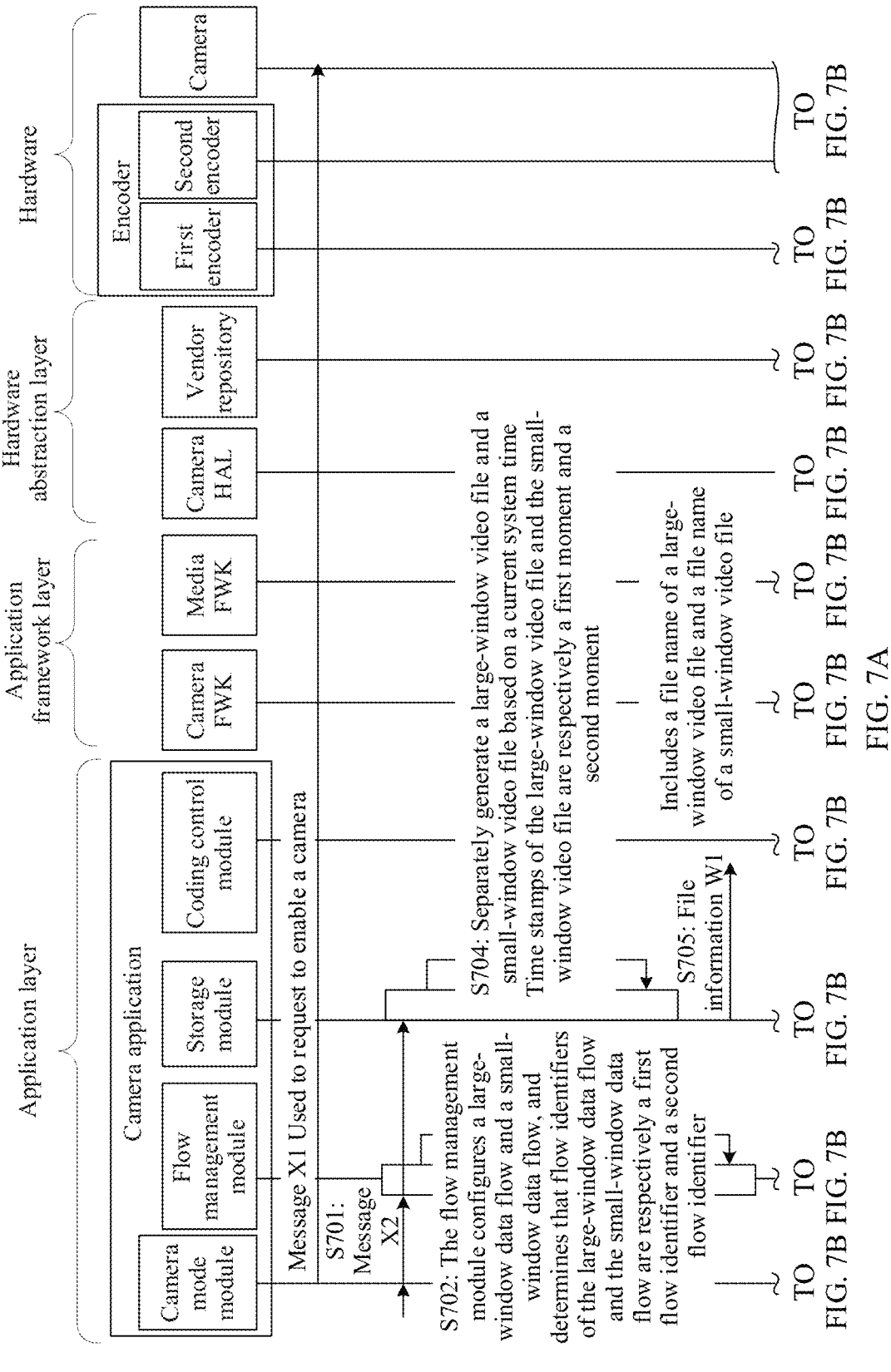
FIG. 7A and FIG. 7B are a flowchart of a shooting method according to an embodiment of this application.
Figure 7B:
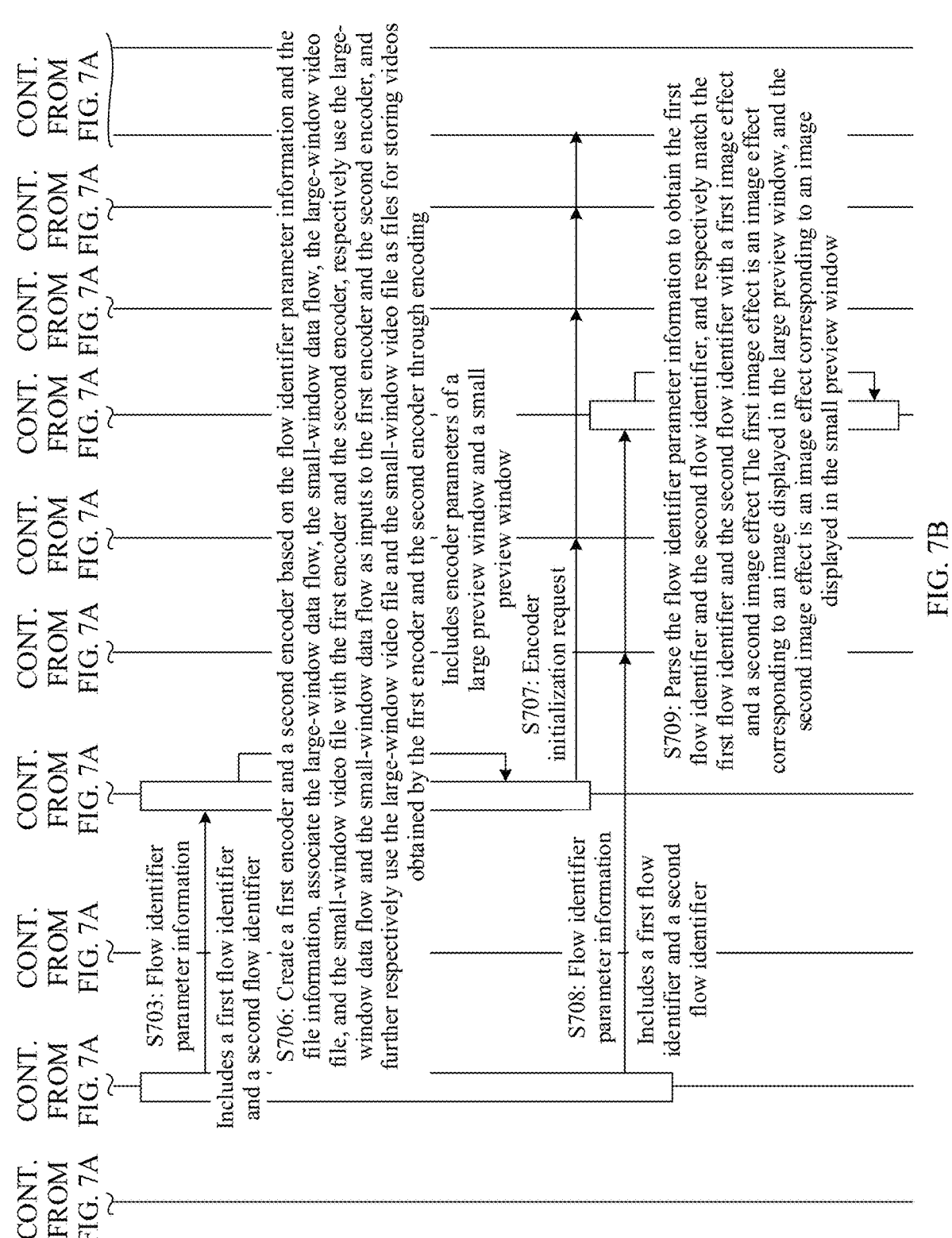

I. Configure a Data Flow (as Shown in FIG. 7A and FIG. 7B)

A user may trigger a camera to enter a focus tracking mode (for example, as shown in FIG. 2B(3), the user may trigger an electronic device to enter a focus tracking mode by tapping a protagonist mode button 405). It may be understood that a camera mode module may monitor a corresponding triggering operation of the user, and notify another module in a camera application.

S701: The camera mode module sends a message X2 to a flow management module and a storage module.

It may be understood that the message X2 is used to notify another module in the camera application of a mode change of the camera application. The mode change mentioned herein may specifically mean that the camera application is going to change from a video mode to a focus tracking mode.

Correspondingly, the flow management module and the storage module may receive the message X2 sent by the camera mode module.

S702: The flow management module configures a large-window data flow and a small-window data flow, and determines that flow identifiers of the large-window data flow and the small-window data flow are respectively a first flow identifier and a second flow identifier.

It may be understood that the flow identifier may be used to distinguish between different data flows. The flow management module may set flow identifiers to distinguish between data flows corresponding to the large-window data flow and the small-window data flow. Specifically, the first flow identifier is used to mark the large-window data flow, and the second flow identifier is used to mark the small-window data flow.

In some embodiments of this application, the first flow identifier is video-surface-1, and the second flow identifier is video-surface-2.

It should be noted that the flow management module may include a cache region of the large-window data flow and a cache region of the small-window data flow, for example, the large-window image cache region and the small-window image cache region shown in FIG. 5 and FIG. 6A and FIG. 6B. A flow identifier corresponding to the large-window image cache region is the first flow identifier. A flow identifier corresponding to the small-window image cache region is the second flow identifier.

It may be understood that configuration information of the large-window data flow and the small-window data flow may be completely the same. The configuration information of the large-window data flow and the small-window data flow may include a format, a resolution, and the like. For example, the format in the configuration information of the large-window data flow and the small-window data flow may be YUV. The resolution in the configuration information of the large-window data flow and the small-window data flow may be 1920px*1080px. It may be understood that the full name of px is "Pixel", and a Chinese meaning is "pixel", and is a smallest unit that represents a picture or a graph. Certainly, the format and the resolution in the configuration information may be other values, which is not limited in this application.

S703: The flow management module sends flow identifier parameter information to a coding control module. The flow identifier parameter information includes the first flow identifier and the second flow identifier.

It may be understood that the flow identifier parameter information may be in a form of a character, a number, a character string, or the like, which is not limited in this application.

For example, the flow identifier parameter information may be 12. For another example, the flow identifier parameter information may be video-surface-1-video-surface-2.

Correspondingly, the coding control module may receive the flow identifier parameter information sent by the flow management module.

S704: The storage module separately generates a large-window video file and a small-window video file based on a current system time. Time stamps of the large-window video file and the small-window video file are respectively a first moment and a second moment.

It may be understood that initial states of the large-window video file and the small-window video file that are separately generated by the storage module based on the current system time are null (that is, no data exists).

In some embodiments of this application, the second moment is not earlier than the first moment.

S705: The storage module sends file information W1 to the coding control module. The file information W1 includes a file name of the large-window video file and a file name of the small-window video file.

In some embodiments of this application, the file information W1 may further include the time stamps (that is, the first moment and the second moment) of the large-window video file and the small-window video file. The file information W1 may further include a correspondence between a file name and a time stamp.

It may be understood that the file information W1 may further include other content related to the large-window video file and the small-window video file, which is not limited in this application. In addition, the file information W1 may be in a form of a character, a number, a character string, or the like, which is not limited in this application.

For example, the file information W1 may be video-1-time-1-video-2-time-2. Referring to Table 1, video-1 is corresponding to time-1. video-1 is the file name of the large-window video file. time-1 is the time stamp (that is, the first moment) of the large-window video file. video-2 is corresponding to time-2. video-2 is the file name of the small-window video file. time-2 is the time stamp (that is, the second moment) of the small-window video file.

TABLE 1

| File information W1 | | |
| --- | --- | --- |
| File name | video-1 | video-2 |
| Time stamp | time-1 | time-2 |
| . . . | . . . | . . . |

For example, the file information W1 is 10987662098767. The $1^{st}$ bit of the character string represents the file name of the large-window video file. The $8^{th}$ bit of the character string represents the file name of the small-window video file. The 2nd to $7^{th}$ bits of the character string represent the time stamp of the large-window video file. The $9^{th}$ to $14^{th}$ bits of the character string represent the time stamp of the small-window video file.

In some embodiments of this application, the large-window video file and the small-window video file may be respectively named by using the time stamps of the large-window video file and the small-window video file.

Correspondingly, the coding control module may receive the file information W1 sent by the storage module.

S706: The coding control module creates a first encoder and a second encoder based on the flow identifier parameter information and the file information W1, associates the large-window data flow, the small-window data flow, the large-window video file, and the small-window video file with the first encoder and the second encoder, respectively uses the large-window data flow and the small-window data flow as inputs to the first encoder and the second encoder, and further respectively uses the large-window video file and the small-window video file as files for storing videos obtained by the first encoder and the second encoder through encoding.

It may be understood that, after receiving the flow identifier parameter information, the coding control module may parse the flow identifier parameter information to determine that there are two data flows configured by the flow management module, and may further determine a correspondence between a flow identifier and a data flow. Similarly, after receiving the file information W1, the coding control module may parse the file information W1 to determine that there are two files and determine file names. Correspondingly, the coding control module creates two encoders (that is, the first encoder and the second encoder), and associates the two data flows with the two encoders according to the correspondence between a flow identifier and a data flow. The coding control module may further associate the two files with the two encoders according to the file names.

Specifically, the coding control module may separately associate the first flow identifier and the large-window video file with the first encoder, use the data flow corresponding to the first flow identifier as an input to the first encoder, and use the large-window video file as a storage file of output data of the first encoder. Similarly, the coding control module may separately associate the second flow identifier and the small-window video file with the second encoder, use the data flow corresponding to the second flow identifier as an input to the second encoder, and use the small-window video file as a storage file of output data of the second encoder.

In some embodiments of this application, the first encoder is video-codec-1, and the second encoder is video-codec-2.

For example, the flow identifier parameter information is video-surface-1-video-surface-2. The coding control module parses the flow identifier parameter information to determine that the flow management module configures two data flows. The flow identifiers of the two data flows are video-surface-1 and video-surface-2 respectively. As shown in Table 2, the coding control module may associate a data flow whose flow identifier is video-surface-1 (that is, the large-window data flow) with video-codec-1. The data flow whose flow identifier is video-surface-1 (that is, the large-window data flow) is a data flow corresponding to a large preview window. This means that video-codec-1 is used to generate a video corresponding to the large preview window through encoding. Similarly, as shown in Table 2, the coding control module may associate a data flow whose flow identifier is video-surface-2 (that is, the small-window data flow) with video-codec-2. The data flow whose flow identifier is video-surface-2 (that is, the small-window data flow) is a data flow corresponding to a small preview window. This means that video-codec-2 is used to generate a video corresponding to the small preview window through encoding.

For example, the file information W1 is video-1-time-1-video-2-time-2. The coding control module parses the file information W1 to determine that the storage module generates two files. File names of the two files are video-1 and video-2 respectively. As shown in Table 2, the coding control module may associate a file whose file name is video-1 (that is, the large-window video file) with the first encoder. A file whose file name is video-1 (that is, the large-window video file) is used to store the video corresponding to the large preview window. The first encoder is configured to generate the video corresponding to the large preview window through encoding. Similarly, as shown in Table 2, the coding control module may associate a file whose file name is video-2 (that is, the small-window video file) with the second encoder. A file whose file name is video-2 (that is, the small-window video file) is used to store the video corresponding to the small preview window. The second encoder is configured to generate the video corresponding to the small preview window through encoding.

TABLE 2

| Encoder | Flow identifier | File name | Time stamp |
| --- | --- | --- | --- |
| video-codec-1 | video-surface-1 | video-1 | time-1 |
| video-codec-2 | video-surface-2 | video-2 | time-2 |

S707: The coding control module sends an encoder initialization request to the encoder. The encoder initialization request includes an encoding parameter of the first encoder and an encoding parameter of the second encoder.

It may be understood that the encoding parameter of the encoder may include a format and a resolution. For example, the format may be H.264. The resolution may be 1920px*1080px. It should be noted that specific content of the encoding parameter of the encoder may be set according to industry regulations and actual requirements, which is not limited in this application.

In some embodiments of this application, the encoding parameter of the first encoder may be the same as or different from the encoding parameter of the second encoder. A specific parameter thereof may be set according to an actual requirement and a related technical document.

Correspondingly, the encoder may receive the encoder initialization request sent by the coding control module.

S708: The flow management module sends flow identifier parameter information to a camera HAL.

Specifically, the flow management module may send the flow identifier parameter information to a camera FWK, and then the camera FWK sends the flow identifier parameter information to the camera HAL. For related descriptions of the flow identifier parameter information, refer to the foregoing description. Details are not described herein again.

Correspondingly, the camera HAL may receive the flow identifier parameter information sent by the flow management module.

S709: The camera HAL parses the flow identifier parameter information to obtain the first flow identifier and the second flow identifier, and respectively matches the first flow identifier and the second flow identifier with a first image effect and a second image effect. The first image effect is an image effect corresponding to an image displayed in the large preview window, and the second image effect is an image effect corresponding to an image displayed in the small preview window.

It may be understood that the image effect may include a clipping range, an image size, a filter effect, a facial beautification effect, and the like. The first image effect and the second image effect may be preset and stored in the electronic device. The camera HAL in the electronic device may invoke the stored first image effect and second image effect.

For example, the first image effect includes: 1920px*1080px, adding a filter effect, and adding a facial beautification effect.

For example, the flow identifier parameter information may be video-surface-1-video-surface-2. The camera HAL parses the flow identifier parameter information to determine that the flow management module configures two data flows. The flow identifiers of the two data flows are video-surface-1 and video-surface-2 respectively. The camera HAL may match a data flow whose flow identifier is video-surface-1 (that is, the large-window data flow) with the first image effect, and match a data flow whose flow identifier is video-surface-2 (that is, the small-window data flow) with the second image effect.

It may be understood that a sequence of step S702 and step S704 is not limited in this application. A sequence of step S703 and step S705 is not limited in this application.

Figure 8A:
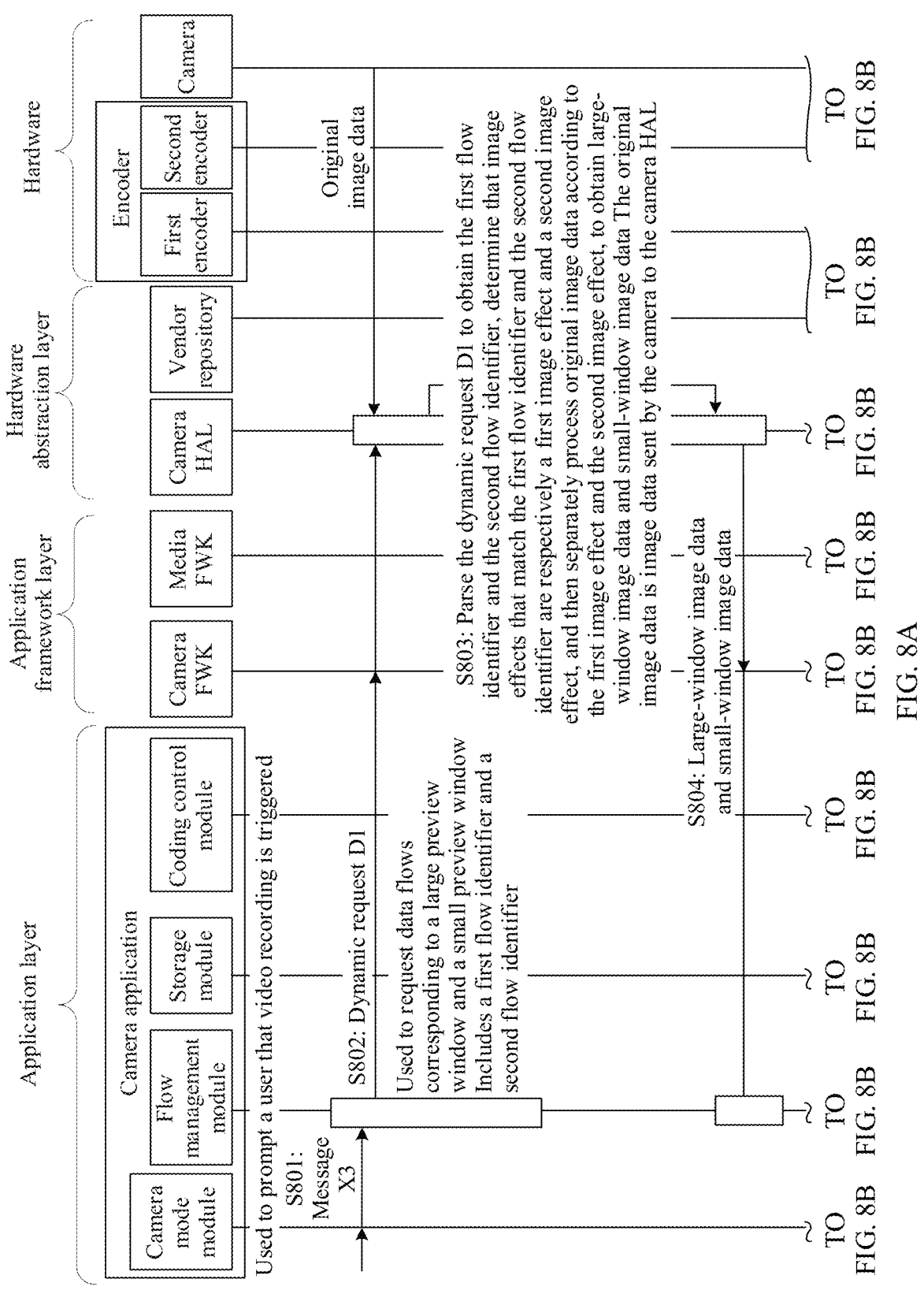
FIG. 8A and FIG. 8B are a flowchart of another shooting method according to an embodiment of this application.
Figure 8B:
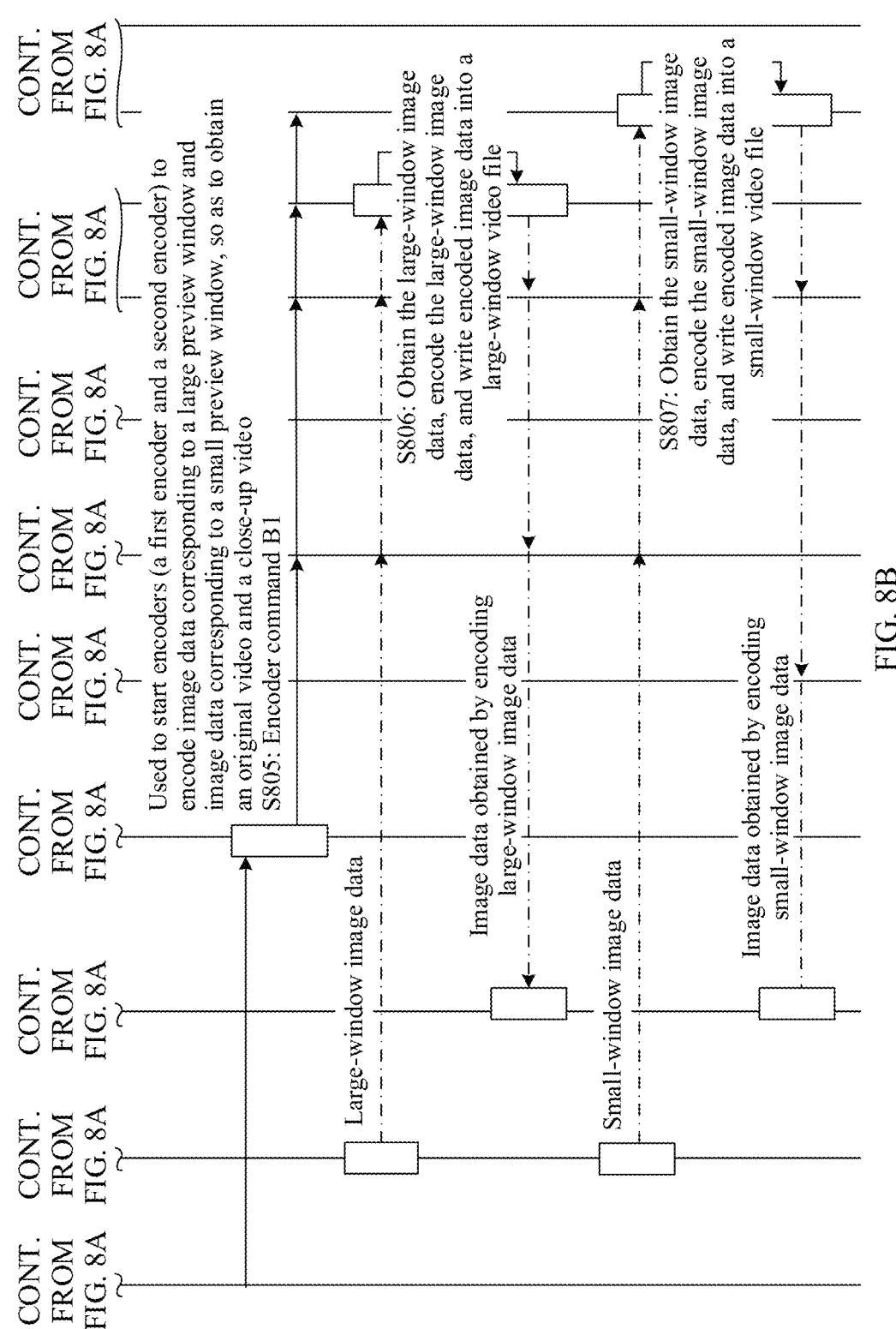

II. Start Video Recording in a Case of Successful Focus Tracking (as Shown in FIG. 8A and FIG. 8B)

When focus tracking succeeds and a large preview window and a small preview window are displayed, a user may trigger large- and small-window video recording (for example, as shown in a in FIG. 3A, the user may trigger, by tapping a recording button 303, an electronic device to start large- and small-window video recording). It may be understood that a camera mode module may monitor a corresponding triggering operation of the user, and notify another module in a camera application.

S801: The camera mode module sends a message X3 to a flow management module and a coding control module.

It may be understood that the message X3 is used to notify another module in the camera application of a mode change of the camera application. The mode change mentioned herein may specifically mean that the camera application is going to change from the large- and small-window preview mode to a large- and small-window video mode. The large- and small-window preview mode means that a camera displays both a large preview window and a small preview window and is in a preview state. The large- and small-window video mode means that the camera displays both a large preview window and a small preview window, and both the large preview window and the small preview window are in a video recording state.

Correspondingly, the flow management module and the coding control module may receive the message X3 sent by the camera mode module.

S802: The flow management module sends a dynamic request D1 to a camera HAL. The dynamic request D1 is used to request to return a large-window data flow and a small-window data flow.

It may be understood that the flow management module may send the dynamic request D1 to a camera FWK, and then the camera FWK sends the dynamic request D1 to the camera HAL.

It should be noted that the flow management module may continuously deliver a dynamic request to the camera HAL. In this application, the flow management module may modify content of the dynamic request. In some embodiments of this application, the flow management module sends a dynamic request to the camera HAL at specific frequency (or a time interval). For example, the flow management module sends a dynamic request to the camera HAL at an interval of 33 ms.

It may be understood that the dynamic request D1 may include a first flow identifier and a second flow identifier.

Correspondingly, the camera HAL may receive the dynamic request D1 sent by the flow management module.

S803: The camera HAL parses the dynamic request D1 to obtain the first flow identifier and the second flow identifier, determines that image effects that match the first flow identifier and the second flow identifier are respectively a first image effect and a second image effect, and then separately processes original image data according to the first image effect and the second image effect, to obtain large-window image data and small-window image data. The original image data is image data sent by the camera to the camera HAL.

It may be understood that, after receiving the dynamic request D1, the camera HAL may parse the dynamic request D1, and obtain the first flow identifier and the second flow identifier. The camera HAL may determine, according to a foregoing matching situation of the flow identifiers and the image effects, the image effects that match the first flow identifier and the second flow identifier. Specifically, the camera HAL may determine that the image effect that matches the first flow identifier is the first image effect, and process the original data according to the first image effect to obtain the large-window image data. A flow identifier of the large-window image data is the first flow identifier. Similarly, the camera HAL may determine that the image effect that matches the second flow identifier is the second image effect, and process the original data according to the second image effect to obtain the small-window image data. A flow identifier of the small-window image data is the second flow identifier.

S804: The camera HAL sends the large-window image data and the small-window image data to the flow management module.

It may be understood that the camera HAL may return the large-window image data to the flow management module, and return the small-window image data to the flow management module.

Correspondingly, the flow management module may receive the large-window image data and the small-window image data that are sent by the camera HAL, and place the large-window image data and the small-window image data into corresponding cache regions according to the flow identifiers of the large-window image data and the small-window image data.

For example, because the flow identifier of the large-window image data is consistent with a flow identifier of a large-window image cache region, the flow management module may store the large-window image data in the large-window image cache region. Similarly, because the flow identifier of the small-window image data is consistent with a flow identifier of a small-window image cache region, the flow management module may store the small-window image data in the small-window image cache region.

S805: The coding control module sends an encoding command B1 to a first encoder and a second encoder. The encoding command B1 is used to start the first encoder and the second encoder.

It may be understood that after the coding control module receives the message X3 sent by the camera mode module, the coding control module may start the first encoder and the second encoder. Specifically, the coding control module may send the encoder command B1 to a media FWK, and then the media FWK sends the encoder command B1 to an encoder by using a vendor repository. After receiving the encoder command B1, the encoder may start corresponding encoders (that is, the first encoder and the second encoder) according to the encoder command.

For example, the encoder command B1 may include: codec-1.start and codec-2.start.

S806: The first encoder obtains the large-window image data, encodes the large-window image data, and writes encoded image data into a large-window video file.

It may be understood that after being started, the first encoder may obtain the large-window image data from a corresponding cache region (for example, the large-window image cache region) of the flow management module, then encode the large-window image data, and write the encoded image data into the large-window video file in the storage module.

It may be understood that the encoded image data obtained by the first encoder may constitute an image in an original video. For example, frequency at which the first encoder writes the encoded image data into the large-window video file may be 30 times per second. Correspondingly, a frame rate of the original video may be 30 fps. The English full name of fps is frames per second, which means a quantity of frames displayed per second. Certainly, the frequency at which the first encoder writes the encoded image data into the large-window video file may be another value, which is not limited in this application.

S807: The second encoder obtains the small-window image data, encodes the small-window image data, and writes encoded image data into a small-window video file.

It may be understood that after being started, the second encoder may obtain the small-window image data from a corresponding storage region (for example, the small-window image cache region) of the flow management module, then encode the small-window image data, and write the encoded image data into the small-window video file in the storage module.

It may be understood that the encoded image data obtained by the second encoder may constitute an image in a close-up video. Similar to the first encoder, for example, frequency at which the second encoder writes the encoded image data into the small-window video file may be 30 times per second. Correspondingly, a frame rate of the close-up video may be 30 fps. Certainly, the frequency at which the second encoder writes the encoded image data into the small-window video file may be another value, which is not limited in this application.

It may be understood that a sequence of step S802 and step S805 is not limited in this application. A sequence of step S806 and step S807 is not limited in this application.

Figure 9A:
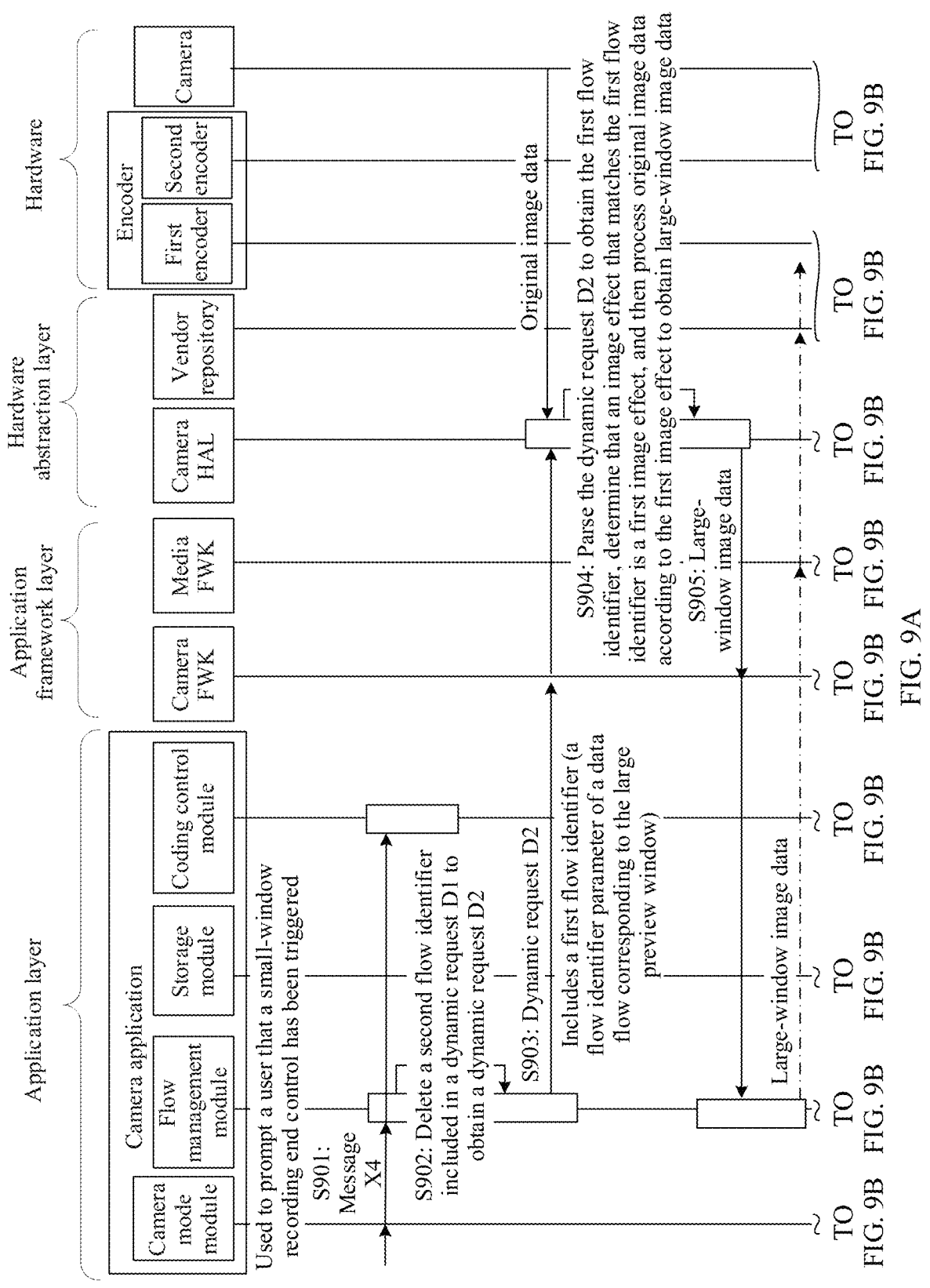
FIG. 9A and FIG. 9B are a flowchart of another shooting method according to an embodiment of this application.
Figure 9B:
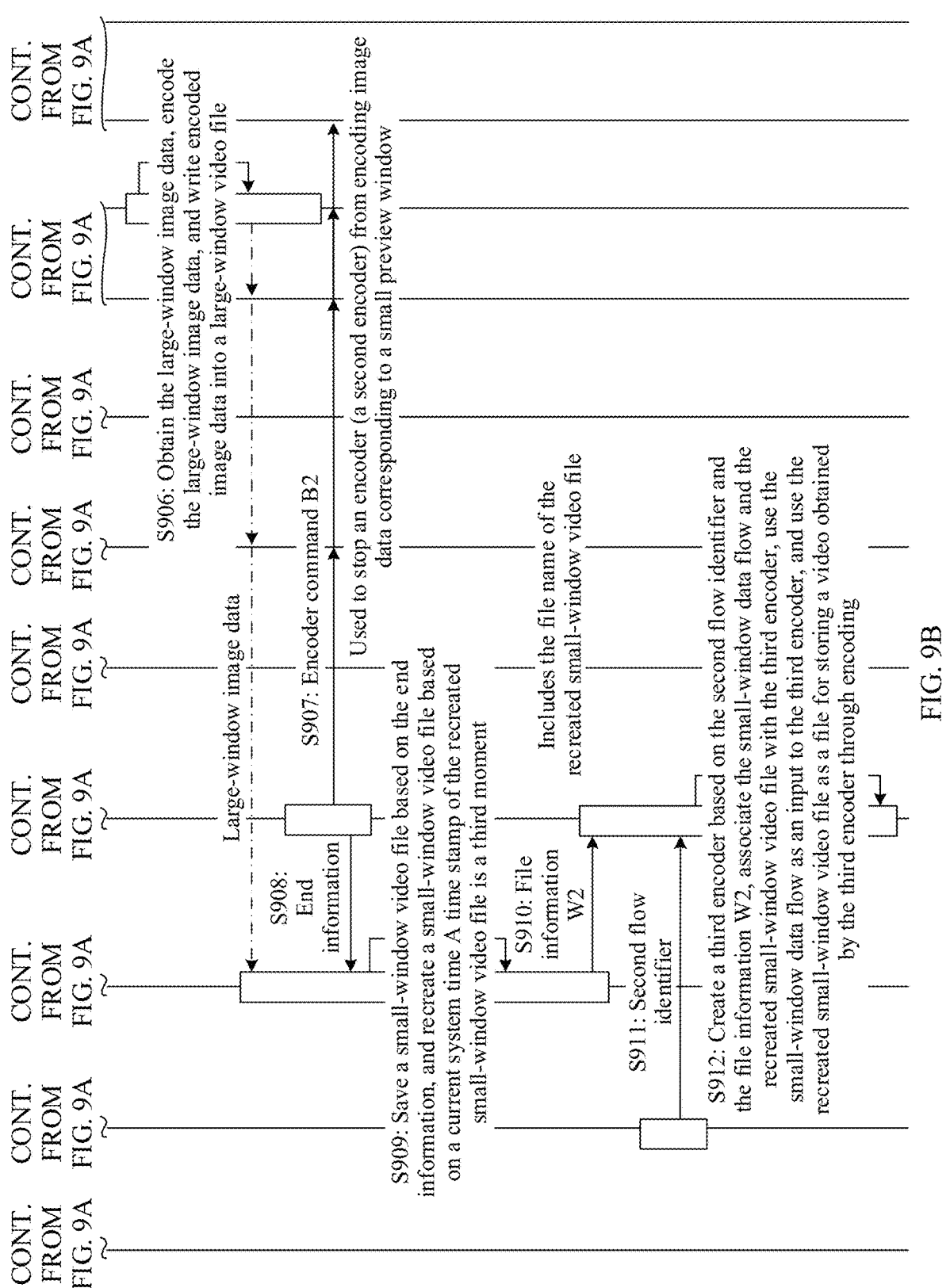

III. A Small Preview Window Ends Recording, and a Large Preview Window Continues Recording (as Shown in FIG. 9A and FIG. 9B)

When both the small preview window and the large preview window perform normal recording, a user may trigger ending of small-window video recording (for example, as shown in a in FIG. 3E, the user may trigger, by tapping the end small-window recording button 315, an electronic device to end small-window video recording). It may be understood that a camera mode module may monitor a corresponding triggering operation of the user, and notify another module in a camera application.

S901: The camera mode module sends a message X4 to a flow management module and a coding control module.

It may be understood that the message X4 is used to notify another module in the camera application of a mode change of the camera application. The mode change mentioned herein may specifically mean that the camera application is going to change from a large- and small-window video mode to a large-window video mode.

Correspondingly, the flow management module and the coding control module may receive the message X4 sent by the camera mode module.

S902: The flow management module deletes a second flow identifier included in a dynamic request D1 to generate a dynamic request D2.

After receiving the message X4 sent by the camera mode module, the flow management module may delete the second flow identifier from the original dynamic request (that is, the dynamic request D1) to generate the dynamic request D2.

S903: The flow management module sends the dynamic request D2 to a camera HAL. The dynamic request D2 is used to request to return a large-window data flow.

It may be understood that the flow management module may send the dynamic request D2 to a camera FWK, and then the camera FWK sends the dynamic request D2 to the camera HAL.

It may be understood that the dynamic request D2 may include a first flow identifier.

Correspondingly, the camera HAL may receive the dynamic request D2 sent by the flow management module.

S904: The camera HAL parses the dynamic request D2 to obtain the first flow identifier, determines that an image effect that matches the first flow identifier is a first image effect, and then processes original image data according to the first image effect to obtain large-window image data.

It may be understood that, after receiving the dynamic request D2, the camera HAL may parse the dynamic request D2, and obtain the first flow identifier. The camera HAL may determine, according to a foregoing matching situation of the flow identifier and the image effect, the image effect that matches the first flow identifier. Specifically, the camera HAL may determine that the image effect that matches the first flow identifier is the first image effect, and process the original data according to the first image effect to obtain the large-window image data. A flow identifier of the large-window image data is the first flow identifier.

S905: The camera HAL sends the large-window image data to the flow management module.

Correspondingly, the flow management module may receive the large-window image data and small-window image data that are sent by the camera HAL, and place the large-window image data into a corresponding cache region according to the flow identifier of the large-window image data.

It may be understood that for related descriptions of step S905, refer to step S804. Details are not described herein again.

S906: Obtain the large-window image data, encode the large-window image data, and write encoded image data into a large-window video file.

It may be understood that for related descriptions of step S906, refer to step S806. Details are not described herein again.

S907: The coding control module sends an encoding command B2 to a second encoder. The encoding command B2 is used to stop the second encoder.

It may be understood that after the coding control module receives the message X4 sent by the camera mode module, the coding control module may stop the second encoder. Specifically, the coding control module may send the encoder command B2 to a media FWK, and then the media FWK sends the encoder command B2 to an encoder by using a vendor repository. After receiving the encoder command B2, the encoder may stop a corresponding encoder (that is, the second encoder) according to the encoder command.

For example, the encoder command B2 may include: codec-2.stop.

S908: The coding control module sends end information to a storage module. The end information includes a file name of a small-window video file.

In some embodiments of this application, the end information may be an end mark.

Certainly, the end information may alternatively be represented in another form, for example, a word, a character, a number, or the like. This is not limited in this application.

Correspondingly, the storage module may receive the end information from the coding control module.

S909: The storage module saves a small-window video file based on the end information, and recreates a small-window video file based on a current system time. A time stamp of the recreated small-window video file is a third moment.

It may be understood that after receiving the end information, the storage module may recreate the small-window video file based on the current system time. It should be noted that an initial state of the recreated small-window video file generated separately based on the current system time is null (that is, no data exists).

In some embodiments of this application, after receiving the end information, the storage module may parse the end information to obtain the file name of the small-window video file, correspondingly save the small-window video file, and recreate the small-window video file based on the current system time.

In some embodiments of this application, the recreated small-window video file may be video-3. The third moment is time-3.

S910: The flow management module sends file information W2 to the coding control module. The file information W2 includes the file name of the recreated small-window video file.

It may be understood that for related descriptions of the file information W2, refer to related descriptions of the file information W1 in step S705. Details are not described herein again.

S911: The flow management module sends the second flow identifier to the coding control module.

Correspondingly, the coding control module may receive the second flow identifier sent by the flow management module.

S912: Create a third encoder based on the second flow identifier and the file information W2, associate the small-window data flow and the recreated small-window video file with the third encoder, use the small-window data flow as an input to the third encoder, and use the recreated small-window video file as a file for storing a video obtained by the second encoder through encoding.

In some embodiments of this application, the third encoder is video-codec-3.

For example, in the foregoing case, a correspondence among an encoder, a data flow, and a file may be shown in the following Table 3:

TABLE 3

| Encoder | Flow identifier | File name | Time stamp |
|---|---|---|---|
| video-codec-1 | video-surface-1 | video-1 | time-1 |
| video-codec-3 | video-surface-2 | video-3 | time-3 |

It may be understood that a sequence of step S903 and step S907 is not limited in this application.

Figure 10A:
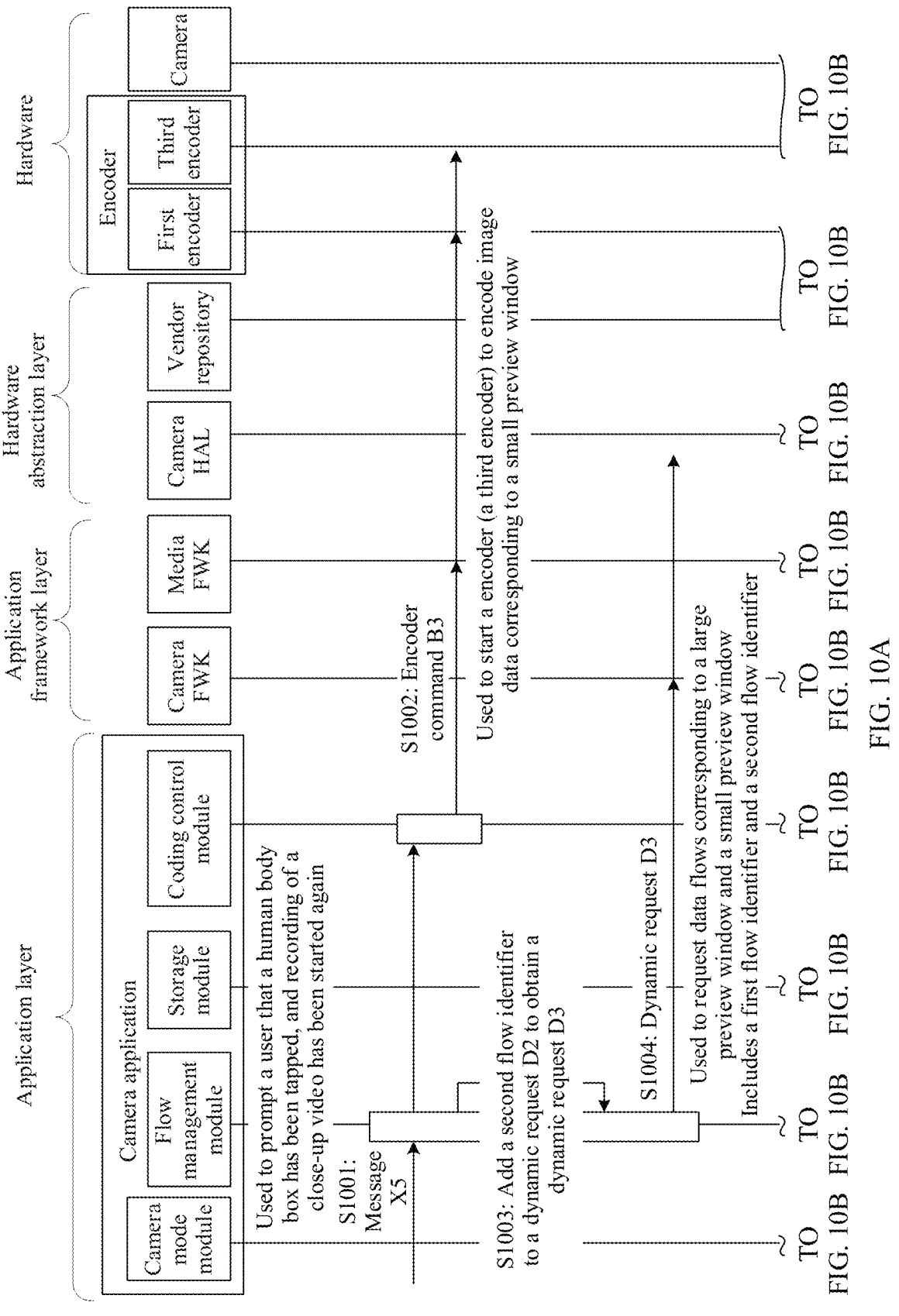
Figure 10C:
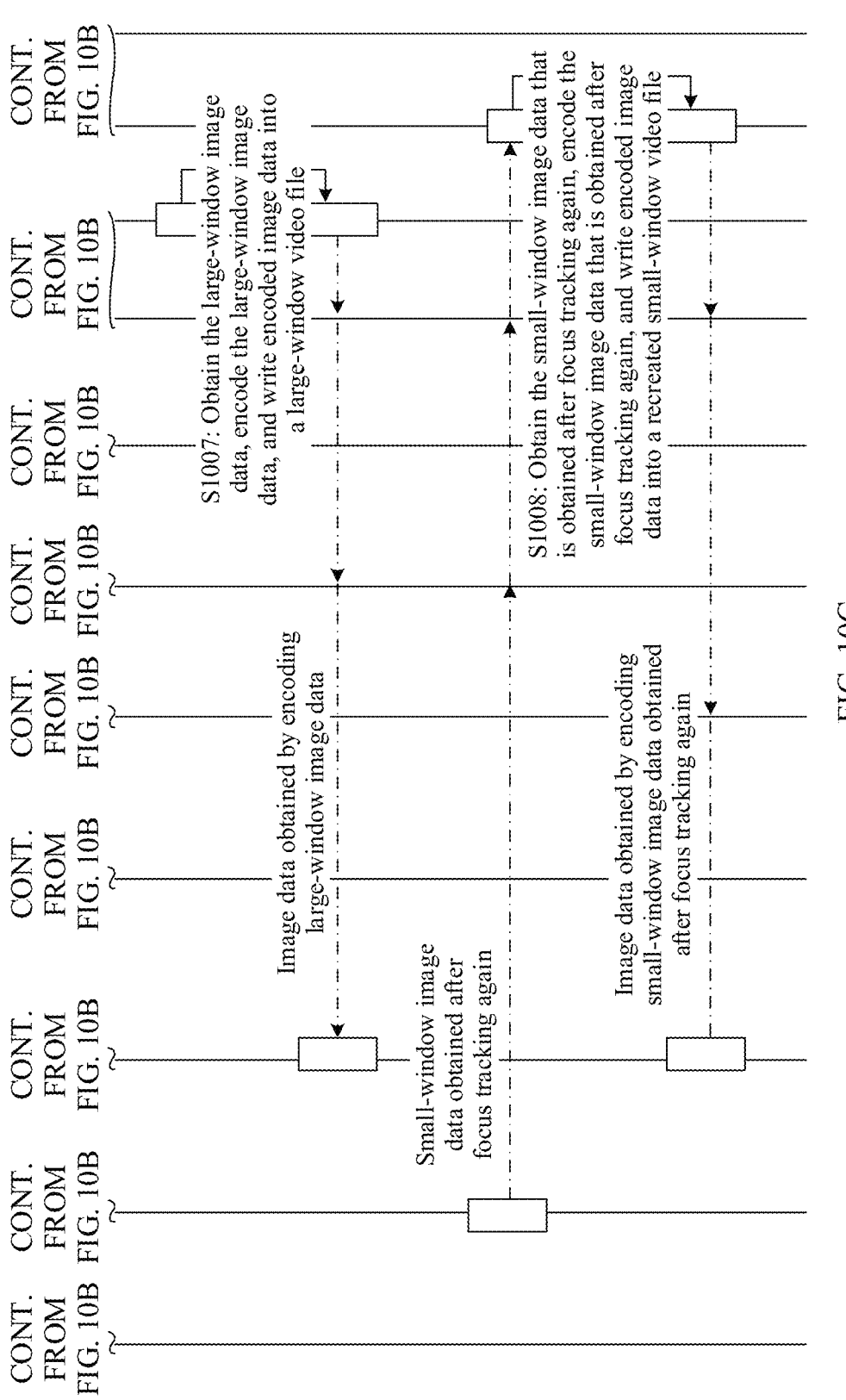

IV. A Small Preview Window Starts Recording Again, and a Large Preview Window Continues Recording (as Shown in FIG. 10A to FIG. 10C)

When the small preview window ends recording but the large preview window continues recording, a user may trigger the small preview window to start recording again (for example, as shown in c and d in FIG. 3E, the user may trigger, by tapping the tracking box 311, an electronic device to start recording of the small preview window again). It may be understood that a camera mode module may monitor a corresponding triggering operation of the user, and notify another module in a camera application.

S1001: The camera mode module sends a message X5 to a flow management module and a coding control module.

It may be understood that the message X5 is used to notify another module in the camera application of a mode change of the camera application. The mode change mentioned herein may specifically mean that the camera application is going to change from a large-window video mode to a large- and small-window video mode.

Correspondingly, the flow management module and the coding control module may receive the message X4 sent by the camera mode module.

S1002: The coding control module sends an encoding command B3 to a third encoder. The encoding command B3 is used to start the third encoder.

It may be understood that after the coding control module receives the message X5 sent by the camera mode module, the coding control module may start the third encoder. Specifically, the coding control module may send the encoder command B3 to a media FWK, and then the media FWK sends the encoder command B3 to an encoder by using a vendor repository. After receiving the encoder command B3, the encoder may stop a corresponding encoder (that is, the third encoder) according to the encoder command.

For example, the encoder command B3 may include: codec-3.start.

S1003: The flow management module adds a second flow identifier to a dynamic request D2 to obtain a dynamic request D3.

After receiving the message X5 sent by the camera mode module, the flow management module may add the second flow identifier to the original dynamic request (that is, the dynamic request D2) to generate the dynamic request D3.

S1004: The flow management module sends the dynamic request D3 to a camera HAL. The dynamic request D3 is used to request to return a large-window data flow and a small-window data flow.

It may be understood that the flow management module may send the dynamic request D3 to a camera FWK, and then the camera FWK sends the dynamic request D3 to the camera HAL.

It may be understood that the dynamic request D3 may include a first flow identifier and the second flow identifier.

Correspondingly, the camera HAL may receive the dynamic request D3 sent by the flow management module.

S1005: The camera HAL parses the dynamic request D3 to obtain the first flow identifier and the second flow identifier, determines that image effects that match the first flow identifier and the second flow identifier are respectively a first image effect and a second image effect, and then separately processes original image data according to the first image effect and the second image effect, to obtain large-window image data and small-window image data that is obtained after focus tracking again. The original image data is image data sent by the camera to the camera HAL.

S1006: The camera HAL sends the large-window image data and the small-window image data that is obtained after focus tracking again to the flow management module.

It may be understood that for related descriptions of step S1004 and step S1005, refer to step S802 and step S803. Details are not described herein again.

S1007: A first encoder obtains the large-window image data, encodes the large-window image data, and writes encoded image data into a large-window video file.

It may be understood that after being started, the first encoder may obtain the large-window image data from a corresponding cache region (for example, the large-window image cache region) of the flow management module, then encode the large-window image data, and write the encoded image data into the large-window video file in the storage module.

It may be understood that the encoded image data obtained by the first encoder may constitute an image in an original video.

S1008: The third encoder obtains the small-window image data that is obtained after focus tracking again, encodes the small-window image data that is obtained after focus tracking again, and writes encoded image data into a recreated small-window video file.

It may be understood that after starting, the third encoder may obtain the small-window image data that is obtained after focus tracking again from a corresponding cache region (for example, a small-window image cache region) of the flow management module, encode the small-window image data that is obtained after focus tracking again, and write the encoded image data into the recreated small-window video file in the storage module.

It may be understood that the encoded image data obtained by the third encoder may constitute an image in a close-up video.

It should be noted that the small-window image data and the small-window image data that is obtained after focus tracking again may be close-up images of a same shooting object, or may be close-up images of different shooting objects.

It may be understood that a sequence of step S1002 and step S1003 is not limited in this application, and a sequence of step S1007 and step S1008 is not limited.

Figure 11:
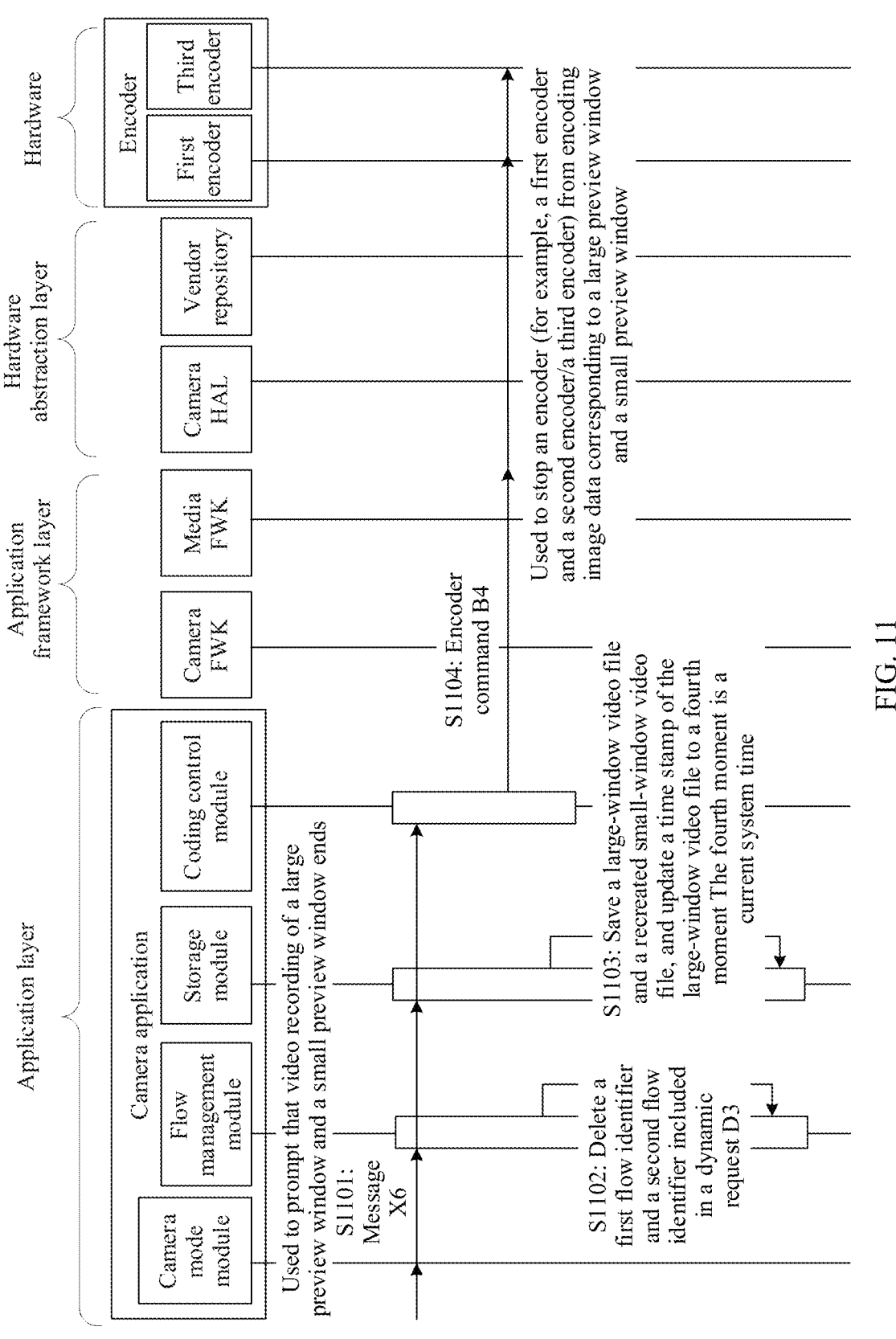
FIG. 11 is a flowchart of another shooting method according to an embodiment of this application.

V. Both a Small Preview Window and a Large Preview Window End Recording (as Shown in FIG. 11)

When both the small preview window and the large preview window perform normal recording, a user may trigger ending of recording of the large preview window and the small preview window (for example, as shown in a in FIG. 3M, the user may trigger, by tapping the end recording button 314, an electronic device to end recording of the large preview window and the small preview window). It may be understood that a camera mode module may monitor a corresponding triggering operation of the user, and notify another module in a camera application.

S1101: The camera mode module sends a message X6 to a flow management module, a storage module, and a coding control module.

It may be understood that the message X6 is used to notify another module in the camera application of a mode change of the camera application. The mode change mentioned herein may specifically mean that the camera application is going to change from a large- and small-window video mode to a preview mode.

Correspondingly, the flow management module, the storage module, and the coding control module may receive the message X6 sent by the camera mode module.

S1102: The flow management module deletes a first flow identifier and a second flow identifier included in a dynamic request D3, to generate a dynamic request D4.

After receiving the message X6 sent by the camera mode module, the flow management module may delete the first flow identifier and the second flow identifier in the original dynamic request (that is, the dynamic request D3) to generate the dynamic request D4.

It may be understood that after generating the new dynamic request, the flow management module may continuously deliver the new dynamic request.

S1103: The storage module saves a large-window video file and a recreated small-window video file, and updates a time stamp of the large-window video file to a fourth moment. The fourth moment is a current system time.

It may be understood that the fourth moment is later than a third moment.

In some embodiments of this application, the fourth moment is time-4.

For example, according to the foregoing, after the large-window video file and the recreated small-window video file are saved, a correspondence between file names and time stamps thereof is shown in Table 4.

TABLE 4

| File name | Time stamp |
| --- | --- |
| video-1 | time-4 |
| video-3 | time-3 |

In some embodiments of this application, after receiving the message X6, the flow management module may delete the first flow identifier and the second flow identifier included in the dynamic request D3. After receiving the message X6, the storage module may save the large-window video file and the small-window video file, and update the time stamp of the large-window video file from a first moment to the fourth moment. The fourth moment is a current system time.

S1104: The coding control module sends an encoding command B4 to an encoder. The encoding command B4 is used to stop the encoder.

In some embodiments of this application, after the coding control module receives the message X6 sent by the camera mode module, the coding control module may stop a first encoder and a second encoder.

For example, the encoder command B4 may include: codec-1. stop and codec-2. stop.

In some embodiments of this application, after the coding control module receives the message X6 sent by the camera mode module, the coding control module may stop the first encoder and a third encoder.

For example, the encoder command B4 may include: codec-1. stop and codec-3. stop.

Specifically, the coding control module may send the encoder command B4 to a media FWK, and then the media FWK sends the encoder command B4 to an encoder by using a vendor repository. After receiving the encoder command B4, the encoder may stop a corresponding encoder according to the encoder command.

It may be understood that a sequence of step S1102 to step S1104 is not limited in this application.

It should be noted that the electronic device may perform shooting in the foregoing different scenarios, and a combination of different shooting methods in the foregoing shooting scenes also falls within the scope of this application.

The foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the scope of the technical solutions of the embodiments of this application.

The invention claimed is:

1. A shooting method, applied to an electronic device disposed with a camera, wherein the method comprises:

displaying a first interface, wherein the first interface comprises a first window and a first control, and the first window displays a first image collected by the camera;

detecting a first operation acting on the first control;

configuring a first data flow corresponding to the first window and a second data flow corresponding to a second window and displaying a second interface, in response to the first operation, wherein the second interface comprises the first window and a second control, the first window displays the first image collected by the camera and a mark displayed on a subject in the first image, the first data flow is corresponding to a first flow identifier, and the second data flow is corresponding to a second flow identifier;

detecting a second operation acting on a mark;

displaying the second window in response to the second operation, wherein the second window is smaller than the first window, the second window displays a close-up image of a first subject, and the first subject is a subject corresponding to the mark on which the second operation acts; and separately recording a picture in the first window and a picture in the second window in response to an operation acting on the second control;

wherein an encoder in the electronic device obtains image data in the first data flow based on the first flow identifier, and encodes the image data in the first data flow to obtain a first video; and the encoder in the electronic device obtains image data in the second data flow based on the second flow identifier, and encodes the image data in the second data flow to obtain a second video;

separately generating a first-window video file and a second-window video file based on a current system time in response to the first operation;

associating a first encoder with the first data flow based on the first flow identifier, and associating a second encoder with the second data flow based on the second flow identifier;

associating the first encoder with the first-window video file based on a file identifier of the first-window video file; and associating the second encoder with the second-window video file based on a file identifier of the second-window video file; and respectively matching the first flow identifier and the second flow identifier with a first image effect and a second image effect;

wherein the first encoder is configured to encode the image data in the first data flow; the second encoder is configured to encode the image data in the second data flow; the first-window video file is used to store a video obtained by encoding the image data in the first data flow; the second-window video file is used to store a video obtained by encoding the image data in the second data flow; the first image effect is an image effect corresponding to the image data in the first data flow; and the second image effect is an image effect corresponding to the image data in the second data flow.

2. The method according to claim 1, wherein the method further comprises: displaying a third interface in response to an operation acting on the second control, wherein the third interface comprises the first window, the second window, and a third control; and after the separately recording a picture in the first window and a picture in the second window, the method further comprises:

saving the first video and the second video in response to an operation acting on the third control.

3. The method according to claim 2, wherein before the saving the first video and the second video, the method further comprises:

detecting a fourth operation acting on a mark; and displaying, by the second window, a close-up image of a second subject in response to the fourth operation, wherein the second subject is a subject corresponding to the mark on which the fourth operation acts.

4. The method according to claim 1, wherein the second window comprises a fourth control; and after the separately recording a picture in the first window and a picture in the second window, the method further comprises:

stopping recording the picture in the second window and saving the second video, in response to an operation acting on the fourth control.

5. The method according to claim 4, wherein after saving the second video, the method further comprises:

detecting a fifth operation acting on a mark; and re-displaying the second window and recording the picture in the second window, in response to the fifth operation, wherein the second window displays a close-up image of a third subject, and the third subject is a subject corresponding to the mark on which the fifth operation acts on;

wherein the encoder in the electronic device obtains the image data in the second data flow based on the second flow identifier, and encodes the image data in the second data flow to obtain a third video.

6. The method according to claim 5, wherein the method further comprises: displaying a fourth interface in response to the fifth operation, wherein the fourth interface comprises the first window, the second window, and a third control; and after the re-displaying the second window and recording the picture in the second window, the method further comprises:

saving the first video and the third video in response to an operation acting on the third control.

7. The method according to claim 5, wherein after detecting a fifth operation acting on a mark, the method further comprises:

adding, by a flow management module in the electronic device, the second flow identifier to a second dynamic request in response to the fifth operation to obtain a third dynamic request, and sending the third dynamic request to a camera HAL in the electronic device, wherein the third dynamic request comprises the first flow identifier and the second flow identifier;

parsing, by the camera HAL, the third dynamic request to obtain the first flow identifier and the second flow identifier;

determining, by the camera HAL, that image effects corresponding to the first flow identifier and the second flow identifier are respectively a first image effect and a second image effect, and processing original image data separately based on the first image effect and the second image effect, to obtain first-window image data and second-window image data; and controlling, by a coding control module in the electronic device, a first encoder and a third encoder to respectively encode the first-window image data and the second-window image data, and respectively writing encoded image data into a first-window video file and a recreated second-window video file.

8. The method according to claim 4, wherein the stopping recording the picture in the second window and saving the second video, in response to an operation acting on the fourth control specifically comprises:

stopping, by the encoder in the electronic device, encoding the image data of the second data flow in response to the operation acting on the fourth control;

deleting, by a flow management module in the electronic device, the second flow identifier in a first dynamic request to obtain a second dynamic request, and sending the second dynamic request to a camera HAL in the electronic device, wherein the second dynamic request comprises the first flow identifier; and saving, by a storage module in the electronic device, the second video in a second-window video file.

9. The method according to claim 8, wherein after the stopping recording the picture in the second window, the method further comprises:

sending, by the flow management module, second flow identifier parameter information to a coding control module in the electronic device, wherein the second flow identifier parameter information comprises the second flow identifier;

recreating, by the storage module, a second-window video file based on a current system time, and sending second file information to the coding control module, wherein the second file information comprises a file identifier of the recreated second-window video file; and creating, by the coding control module, a third encoder based on the second flow identifier parameter information and the second file information, and associating the second data flow and the recreated second-window video file with the third encoder.

10. The method according to claim 1, wherein after the configuring a first data flow corresponding to the first window and a second data flow corresponding to a second window, the method further comprises:

sending, by a flow management module in the electronic device, first flow identifier parameter information to a coding control module in the electronic device and a camera HAL in the electronic device, wherein the first flow identifier parameter information comprises the first flow identifier and the second flow identifier;

after the separately generating a first-window video file and a second-window video file based on a current system time, the method further comprises:

sending, by a storage module in the electronic device, first file information to the coding control module, wherein the first file information comprises the file identifier of the first-window video file and the file identifier of the second-window video file; and the associating a first encoder with the first data flow based on the first flow identifier, and associating a second encoder with the second data flow based on the second flow identifier; associating the first encoder with the first-window video file based on a file identifier of the first-window video file; and associating the second encoder with the second-window video file based on a file identifier of the second-window video file specifically comprises:

parsing, by the coding control module, the first flow identifier parameter information and the first file information to obtain the first flow identifier and the second flow identifier, the file identifier of the first-window video file, and the file identifier of the second-window video file;

creating, by the coding control module, the first encoder and the second encoder;

determining, by the coding control module based on the first flow identifier and the file identifier of the first-window video file, that an input to the first encoder is the image data in the first data flow, and determining that a storage region of image data encoded by the first encoder is the first-window video file; and determining, by the coding control module based on the second flow identifier and the file identifier of the second-window video file, that an input to the second encoder is the image data in the second data flow, and determining that a storage region of image data encoded by the second encoder is the second-window video file; and the respectively matching the first flow identifier and the second flow identifier with a first image effect and a second image effect specifically comprises:

parsing, by the camera HAL, the first flow identifier parameter information to obtain the first flow identifier and the second flow identifier; and determining, by the camera HAL based on the first flow identifier, that a data flow that matches the first image effect is the first data flow, and determining, based on the second flow identifier, that a data flow that matches the second image effect is the second data flow.

11. The method according to claim 1, wherein the method further comprises:

sending, by the coding control module in the electronic device, a first encoder command to the encoder in the electronic device in response to an operation acting on the second control, wherein the first encoder command is used to start the first encoder and a second encoder; and sending, by the flow management module in the electronic device, a first dynamic request to the camera HAL in the electronic device, wherein the first dynamic request comprises the first flow identifier and the second flow identifier; and the separately recording a picture in the first window and a picture in the second window specifically comprises:

parsing, by the camera HAL, the first dynamic request to obtain the first flow identifier and the second flow identifier;

processing, by the camera HAL, original image data separately based on the first image effect that matches the first flow identifier and the second image effect that matches the second flow identifier, to obtain first-window image data and second-window image data;

obtaining, by the first encoder, the first-window image data, encoding the first-window image data, and writing encoded image data into the first-window video file; and obtaining, by the second encoder, the second-window image data, encoding the second-window image data, and writing encoded image data into the second-window video file.

12. An electronic device, comprising:

one or more processors;

one or more memories; and a module at which a plurality of applications are installed, wherein the memory stores one or more programs, and when the one or more programs are executed by the processor, the electronic device is enabled to perform the following steps:

displaying a first interface, wherein the first interface comprises a first window and a first control, and the first window displays a first image collected by a camera;

detecting a first operation acting on the first control;

configuring a first data flow corresponding to the first window and a second data flow corresponding to a second window and displaying a second interface, in response to the first operation, wherein the second interface comprises the first window and a second control, the first window displays the first image collected by the camera and a mark displayed on a subject in the first image, the first data flow is corresponding to a first flow identifier, and the second data flow is corresponding to a second flow identifier;

detecting a second operation acting on a mark;

displaying the second window in response to the second operation, wherein the second window is smaller than the first window, the second window displays a close-up image of a first subject, and the first subject is a subject corresponding to the mark on which the second operation acts; and separately recording a picture in the first window and a picture in the second window in response to an operation acting on the second control;

wherein an encoder in the electronic device obtains image data in the first data flow based on the first flow identifier, and encodes the image data in the first data flow to obtain a first video; and the encoder in the electronic device obtains image data in the second data flow based on the second flow identifier, and encodes the image data in the second data flow to obtain a second video;

separately generating a first-window video file and a second-window video file based on a current system time in response to the first operation;

associating a first encoder with the first data flow based on the first flow identifier, and associating a second encoder with the second data flow based on the second flow identifier;

associating the first encoder with the first-window video file based on a file identifier of the first-window video file; and associating the second encoder with the second-window video file based on a file identifier of the second-window video file; and respectively matching the first flow identifier and the second flow identifier with a first image effect and a second image effect;

wherein the first encoder is configured to encode the image data in the first data flow; the second encoder is configured to encode the image data in the second data flow; the first-window video file is used to store a video obtained by encoding the image data in the first data flow; the second-window video file is used to store a video obtained by encoding the image data in the second data flow; the first image effect is an image effect corresponding to the image data in the first data flow; and the second image effect is an image effect corresponding to the image data in the second data flow.

13. The electronic device according to claim 12, wherein the electronic device is further enabled to perform the following steps:

displaying a third interface in response to an operation acting on the second control, wherein the third interface comprises the first window, the second window, and a third control; and after the separately recording a picture in the first window and a picture in the second window, the electronic device is further enabled to perform the following steps:

saving the first video and the second video in response to an operation acting on the third control.

14. A non-transitory computer storage medium, comprising a computer program, which when executed by a processor, cause the processor to perform operations comprising:

displaying a first interface, wherein the first interface comprises a first window and a first control, and the first window displays a first image collected by the camera;

detecting a first operation acting on the first control;

configuring a first data flow corresponding to the first window and a second data flow corresponding to a second window and displaying a second interface, in response to the first operation, wherein the second interface comprises the first window and a second control, the first window displays the first image collected by the camera and a mark displayed on a subject in the first image, the first data flow is corresponding to a first flow identifier, and the second data flow is corresponding to a second flow identifier;

detecting a second operation acting on a mark;

displaying the second window in response to the second operation, wherein the second window is smaller than the first window, the second window displays a close-up image of a first subject, and the first subject is a subject corresponding to the mark on which the second operation acts; and separately recording a picture in the first window and a picture in the second window in response to an operation acting on the second control;

wherein an encoder in the electronic device obtains image data in the first data flow based on the first flow identifier, and encodes the image data in the first data flow to obtain a first video; and the encoder in the electronic device obtains image data in the second data flow based on the second flow identifier, and encodes the image data in the second data flow to obtain a second video;

separately generating a first-window video file and a second-window video file based on a current system time in response to the first operation;

associating a first encoder with the first data flow based on the first flow identifier, and associating a second encoder with the second data flow based on the second flow identifier;

associating the first encoder with the first-window video file based on a file identifier of the first-window video file; and associating the second encoder with the second-window video file based on a file identifier of the second-window video file; and respectively matching the first flow identifier and the second flow identifier with a first image effect and a second image effect;

wherein the first encoder is configured to encode the image data in the first data flow; the second encoder is configured to encode the image data in the second data flow; the first-window video file is used to store a video obtained by encoding the image data in the first data flow; the second-window video file is used to store a video obtained by encoding the image data in the second data flow; the first image effect is an image effect corresponding to the image data in the first data flow; and the second image effect is an image effect corresponding to the image data in the second data flow.

15. The non-transitory computer storage medium according to claim 14, the computer program, wherein when executed by a processor, cause the processor to perform operations further comprising:

displaying a third interface in response to an operation acting on the second control, wherein the third interface comprises the first window, the second window, and a third control; and after the separately recording a picture in the first window and a picture in the second window, the computer program, when executed by a processor, cause the processor to perform operations further comprising:

saving the first video and the second video in response to an operation acting on the third control.

* * * * *